United States Patent
Mizushima et al.

(10) Patent No.: US 8,287,131 B2
(45) Date of Patent: Oct. 16, 2012

(54) WAVELENGTH CONVERSION LASER

(75) Inventors: Tetsuro Mizushima, Hyogo (JP);
Toshifumi Yokoyama, Osaka (JP);
Tatsuo Itoh, Osaka (JP); Kenji Nakayama, Osaka (JP); Kiminori Mizuuchi, Ehime (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 316 days.

(21) Appl. No.: 12/744,769

(22) PCT Filed: Nov. 25, 2008

(86) PCT No.: PCT/JP2008/003465
§ 371 (c)(1),
(2), (4) Date: May 26, 2010

(87) PCT Pub. No.: WO2009/069282
PCT Pub. Date: Jun. 4, 2009

(65) Prior Publication Data
US 2010/0309438 A1    Dec. 9, 2010

(30) Foreign Application Priority Data

Nov. 27, 2007 (JP) ................. 2007-305404
Nov. 27, 2007 (JP) ................. 2007-305405

(51) Int. Cl.
*G03B 21/00* (2006.01)
*H01S 3/093* (2006.01)
*H01S 3/10* (2006.01)
*H01S 3/04* (2006.01)

(52) U.S. Cl. ............... 353/31; 372/72; 372/22; 372/34
(58) Field of Classification Search ............ 353/31; 372/70, 72, 22, 34
See application file for complete search history.

(56) References Cited

U.S. PATENT DOCUMENTS

| 4,914,658 | A | 4/1990 | Stankov et al. |
| 5,278,851 | A * | 1/1994 | Goto ............... 372/19 |
| 5,870,415 | A | 2/1999 | Tsunekane |
| 5,943,351 | A * | 8/1999 | Zhou et al. ............ 372/22 |
| 7,187,703 | B2 | 3/2007 | Kadoya |
| 2006/0045161 | A1 | 3/2006 | Kadoya |

FOREIGN PATENT DOCUMENTS

JP    1-147881    6/1989
(Continued)

OTHER PUBLICATIONS

International Search Report issued Feb. 24, 2009 in International (PCT) Application No. PCT/JP2008/003465.
Emilie Herault et al., "491 nm generation by sum-frequency mixing of diode pumped neodymium lasers", Optics Express, Jul. 25, 2005, vol. 13, No. 15, pp. 5653-5661.

(Continued)

*Primary Examiner* — Georgia Y Epps
*Assistant Examiner* — Magda Cruz
(74) *Attorney, Agent, or Firm* — Wenderoth, Lind & Ponack, L.L.P.

(57) ABSTRACT

A wavelength conversion laser is provided with a solid-state laser having a cavity, and a wavelength converting element arranged within the cavity. The solid-state laser includes two or more types of laser crystals and oscillates solid-state laser light of multiple wavelengths. The wavelength converting element converts the solid-state laser light of multiple wavelengths into light of second harmonic waves and sum-frequency wave of multiple wavelengths and simultaneously generates the second harmonic waves and sum-frequency wave of multiple wavelengths. The wavelength conversion laser outputs converted wavelength light having a broad spectral width and low coherency, thereby enabling it to carry out highly efficient and stable high-output oscillation.

31 Claims, 17 Drawing Sheets

FOREIGN PATENT DOCUMENTS

| | | |
|---|---|---|
| JP | 10-65254 | 3/1998 |
| JP | 2004-279739 | 10/2004 |
| JP | 2006-66436 | 3/2006 |
| JP | 2007-73552 | 3/2007 |
| JP | 2007-266537 | 10/2007 |

OTHER PUBLICATIONS

Seiji Nogiwa et al., "Highly sensitive and time-resolving optical sampling system using PPLN crystal", Technical Report of IEICE, OPE, Feb. 16, 2001, vol. 100, No. 639, pp. 25-30 (along with English Abstract).

* cited by examiner

WAVELENGTH CONVERSION LASER

TECHNICAL FIELD

The present invention relates to an internal cavity type wavelength conversion laser in which a wavelength converting element is inserted into a cavity of a solid-state laser.

BACKGROUND ART

Wavelength conversion lasers have been developed that convert the wavelength of a fundamental wave laser to converted waves such as second harmonic wave (second harmonic generation: SHG), sum-frequency wave (sum frequency generation: SFG) or difference frequency wave (difference frequency generation: DFG) and the like. Internal cavity type wavelength conversion lasers, in which a wavelength converting element is inserted into a cavity of a solid-state laser, are characterized by enabling highly efficient wavelength conversion as a result of utilizing a cavity structure.

Since solid-state lasers, and particularly microchip solid-state lasers using laser crystals on the sub-millimeter order to the order of several millimeters, are compact and allow the obtaining of W class output, they are expected to be used in various applications. Combinations of microchip solid-state lasers and internal cavity type wavelength conversion lasers have been attempted to be applied in wavelength ranges in which semiconductor lasers are unable to oscillate directly and fields requiring giant pulses or high frequencies. They are expected to be applied in the fields of imaging and analysis in particular.

However, in the case of applying to imaging or illumination fields and the like, internal cavity type wavelength conversion lasers have the problems of having a narrow spectral width and the generation of dotted pattern interference noise referred to as speckle noise. In addition, internal cavity type wavelength conversion lasers also required the solid-state laser to have a single mode and narrow band in order to enable highly efficient wavelength conversion.

Internal cavity type sum frequency generation has been previously proposed that uses two types of solid-state laser crystals. For example, Patent Document 1 proposes combining the resonance optics of laser beams oscillating at different wavelengths from two types of solid-state laser media, and generating sum-frequency wave of the combined two-wavelength beam with a frequency converting element. In addition, Patent Document 2 proposes configuring a dual-wavelength cavity that shares a single reflecting mirror using two types of solid-state laser crystals and three reflecting mirrors, and carrying out sum-frequency mixing with a non-linear optical crystal.

In addition, since wavelength conversion lasers that carry out multi-longitudinal mode oscillation have reduced speckle noise and other interference noise in comparison with single longitudinal mode lasers, they can be applied in imaging and illumination fields. In internal cavity type wavelength conversion lasers, in the case of carrying out multi-mode oscillation with a solid-state laser, there is the problem of a decrease in conversion efficiency. During high output of a solid-state laser in particular, multi-mode oscillation progresses resulting in a decrease in conversion efficiency. In addition, in internal cavity type wavelength conversion lasers, wavelength conversion efficiency cannot be freely set to a high level in the manner of the transmittance of a laser exit window since wavelength conversion efficiency is typically low. Consequently, in order to increase the efficiency of internal cavity type wavelength conversion lasers, it is necessary to reduce internal loss of materials within the cavity, thereby also resulting in the problem of increased material costs.

In addition, in the case of microchip solid-state lasers, since the laser crystals are pumped on the sub-millimeter order, pumping light of the semiconductor laser focuses on the laser crystal. Since microchip solid-state lasers have a short absorption length for the laser crystal pumping light, those locations of the laser crystals that generate heat become concentrated, thereby decreasing efficiency at high output and causing the problem of instability. Consequently, temperature regulation is required for stable operation thereby resulting in handling difficulties. In addition, internal cavity type wavelength conversion lasers generate extremely high levels of mode competition noise referred to as a green problem that occurs due to insertion of a non-linear optical crystal into a laser cavity that carries out multi-mode oscillation, thereby resulting in the problem of unstable output.

Patent Document 3 proposes a configuration for realizing a stable, multi-mode, internal cavity type wavelength conversion laser in which divided pumping light is radiated onto a laser crystal, and laser light having multiple optical axes is oscillated with a single cavity to generate second harmonic waves of each optical axis of the laser light. This configuration is described to be resistant to external disturbances and demonstrate stability as a result of having laser light of multiple independent optical axes.

However, although the configurations of internal cavity type sum-frequency wave generation using two types of solid-state laser crystals as proposed in the prior art described above allow sum-frequency generation, they are not able to carry out other waveform conversion. Consequently, waveform converted light of multiple wavelengths cannot be obtained. In addition, mode competition noise, which is thought to occur during high output and during multiple wavelength oscillation, is not taken into consideration. Moreover, since the waveform conversion efficiency of internal cavity type waveform conversion lasers it typically low, high waveform conversion efficiency cannot be freely set in the manner of the transmittance of a laser exit window. Consequently, in order to increase the efficiency of internal cavity type wavelength conversion lasers, it is necessary to reduce internal loss generated from materials within the cavity, thereby resulting in the problem of increased material costs.

In addition, since conventional multi-mode internal cavity type wavelength conversion lasers as described above carry out wavelength conversion independently with each optical axis by oscillating laser light having multiple optical axes, there is the problem of decreased conversion efficiency as compared with wavelength conversion with a single optical axis. In addition, since it is necessary to have numerous optical axes in order to obtain stability, handling of the outgoing beams becomes difficult. In addition, it is also necessary to control temperature.

Patent Document 1: Japanese Patent Application Laid-open No. 2004-279739
Patent Document 2: Japanese Patent Application Laid-open No. 2006-66436
Patent Document 3: Japanese Patent Application Laid-open No. 2007-73552

DISCLOSURE OF THE INVENTION

An object of the present invention is to provide a compact wavelength conversion laser that has high wavelength conversion efficiency and low coherency over a broad spectral width.

A wavelength conversion laser according to one aspect of the present invention is provided with a solid-state laser having a cavity and a wavelength converting element arranged within the cavity; wherein, the solid-state laser includes two or more types of laser crystals and oscillates solid-state laser light of multiple wavelengths, and the wavelength converting element converts the solid-state laser light of multiple wavelengths into light of second harmonic waves and sum-frequency wave of multiple wavelengths, and generates the second harmonic waves and sum-frequency wave of multiple wavelengths simultaneously.

In this waveform conversion laser, since the solid-state laser includes two or more types of laser crystals and oscillates solid-state laser light of multiple wavelengths, while the wavelength converting element converts the solid-state laser light of multiple wavelengths into light of second harmonic waves and sum-frequency wave of multiple wavelengths and simultaneously generates second harmonic waves and sum-frequency wave of multiple wavelengths, a compact waveform conversion laser can be realized that has high waveform conversion efficiency and low coherency over a broad spectral range.

BEST MODE FOR CARRYING OUT THE INVENTION

The following provides an explanation of each of the embodiments of the present invention with reference to the drawings.

Embodiment 1

Figure 1:
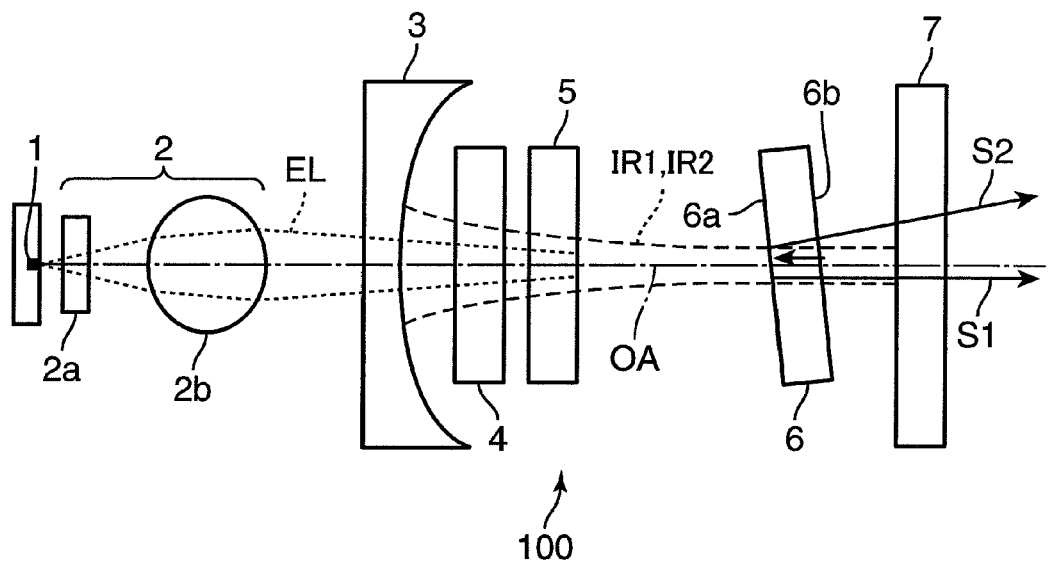
FIG. 1 is a schematic block diagram of a wavelength conversion laser in an Embodiment 1 of the present invention.

FIG. 1 is a schematic block diagram of a wavelength conversion laser in Embodiment 1 of the present invention. A wavelength conversion laser 100 shown in FIG. 1 is provided with a pumping laser diode (LD) 1, a focusing optics 2, a concave mirror 3, two laser crystals 4 and 5, a wavelength converting element 6 and a flat mirror 7. Here, a cavity is composed from the concave mirror 3 and the flat mirror 7, a solid-state laser is composed from the concave mirror 3, the two laser crystals 4 and 5 and the flat mirror 7, and the wavelength converting element 6 is arranged within the cavity (between the concave mirror 3 and the flat mirror 7).

A semiconductor laser in the form of the pumping LD 1 oscillates pumping light EL that pumps the two laser crystals 4 and 5. The focusing optics 2 is composed of a lens 2a, which controls the beam diameter of pumping light EL in the direction of thickness of an active layer of the pumping LD 1, and a lens 2b, which controls the beam diameter of pumping light EL in the direction of width of the active layer. The pumping light EL emitted by the pumping LD 1 is focused with the focusing optics 2 so as to overlap with solid-state laser light IR1 and IR2 within the cavity in the laser crystals 4 and 5. Furthermore, the focusing optics 2 control the beam diameter of pumping light so as to have overlapping between the pumping light EL and the solid-state laser light IR1 and IR2 within the laser crystals 4 and 5.

The pumping light EL passes through the concave mirror 3, enters the laser crystal 4 and the laser crystal 5 and is absorbed by each of the laser crystals. The laser crystal 4 and the laser crystal 5 are two different types of laser crystals, and oscillate different laser wavelengths. In the present embodiment, for example, the laser crystal 4 is composed of Nd:GdVO$_4$ (Nd concentration: 0.3%, thickness: 0.5 mm), while the laser crystal 5 is composed of Nd:YVO$_4$ (Nd concentration: 3%, thickness: 0.5 mm).

The cavity of the solid-state laser that resonates at two types of wavelengths is composed of the concave mirror 3 and the flat mirror 7, and the concave mirror 3 and the flat mirror 7 reflect the solid-state laser light IR1 and IR2 of two types of wavelengths. For example, the concave mirror 3 and the flat mirror 7 have reflectance of 99% or more with respect to laser light having a wavelength of 1060 to 1068 nm, while the reflectance thereof with respect to other oscillation lines is low.

As a result of employing the above-mentioned configuration, the solid-state laser light IR1 having a central wavelength of 1062.9 nm is oscillated in the laser crystal 4 (Nd:GdVO$_4$), the solid-state laser light IR2 having a central wavelength of 1064.3 nm is oscillated in the laser crystal 5 (Nd:YVO$_4$), and the solid-state laser light IR1 and IR2 of two different wavelengths is oscillated within the cavity. The laser crystal 4 and the laser crystal 5 have an anti-reflective (AR) coating for the two types of solid state laser light IR1 and IR2 and an AR coating for the pumping light EL on both sides thereof.

The wavelength converting element 6 inserted into the cavity converts the two types of solid-state laser light IR1 and IR2 within the cavity to a second harmonic wave SHG1 of the solid-state laser light IR1, a second harmonic wave SHG2 of the solid-state laser light IR2, and a sum-frequency wave SFG1 of the solid-state laser light IR1 and the solid-state laser light IR2.

Figure 2:
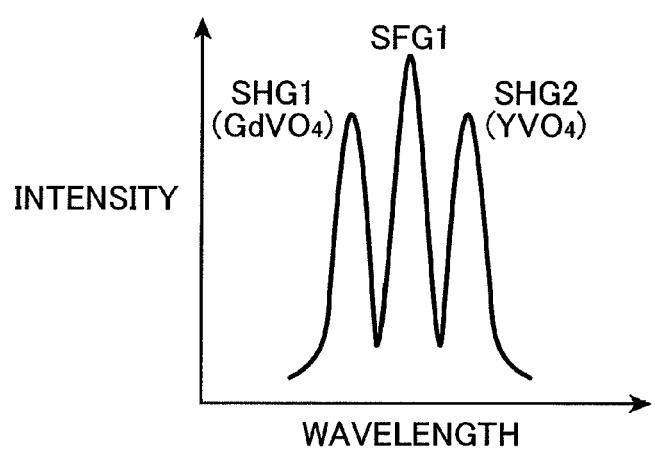
FIG. 2 is a graph showing the spectral distribution of converted wavelength light output from the wavelength conversion laser shown in FIG. 1.

FIG. 2 is a graph showing the spectral distribution of converted wavelength light output from the wavelength converting element 6. In FIG. 2, the second harmonic wave SHG1 indicates a second harmonic wave from the solid-state laser light IR1 (central wavelength: 531.5 nm), the second harmonic wave SHG2 indicates a second harmonic wave from the solid-state laser light IR2 (central wavelength: 532.2 nm), and the sum-frequency wave SFG1 indicates a sum-frequency wave of the solid-state laser light IR1 and the solid-state laser light IR2 (central wavelength: 531.8 nm). In the case each of the solid-state laser light IR1 and the solid-state laser light IR2 oscillates by multi-longitudinal mode oscillation, the spectral distribution of the wavelength-converted second harmonic wave SHG1, the second harmonic wave SHG2 and the sum-frequency wave SFG1 becomes broader and overlapping occurs.

The wavelength converting element 6 carries out phase matching on the second harmonic wave SHG1, the second harmonic wave SHG2 and the sum-frequency wave SFG1 of the two solid-state laser light beams IR1 and IR2, and simultaneously outputs converted wavelength light S1 and S2 composed of the second harmonic wave SHG1, the second harmonic wave SHG2 and the sum-frequency wave SFG1. The wavelength converting element 6 uses MgO:LiNbO$_3$ (PPLN) having a polarization inversion periodic structure and is in the form of an extremely thin microchip element with a thickness of 0.5 mm. The polarization inversion periodic structure is formed at 7 μm. The wavelength converting element used in the present invention is characterized by having an extremely broad phase matching tolerance. In Embodiment 1, the wavelength converting element 6 is used in the form of an extremely thin microchip having a thickness of 0.5 mm due to this broad phase matching tolerance.

In addition, the wavelength converting element 6 has an AR coating for the solid-state laser light IR1 and IR2 and a highly reflective (HR) coating for the converted wavelength light S1 and S2 on an end surface 6a on the side of the laser crystal 5, and an AR coating for the solid-state laser light IR1 and IR2 and an AR coating for the converted wavelength light on an end surface 6b on the side of the flat mirror 7. The flat mirror 7 has an HR coating for the solid-state laser light IR1 and IR2 and an AR coating for the converted wavelength light S1 and S2.

The converted wavelength light S1 of the solid-state laser light that passes through the wavelength converting element 6 in the direction to the right in FIG. 1 is output outside the cavity from the flat mirror 7 without re-entering the wavelength converting element 6. The wavelength converting element end surface 6a is arranged by being inclined by a prescribed angle with respect to the optical axis OA of the solid-state laser light IR1 and IR2. In addition, the converted wavelength light S2 of the solid-state laser light that passes through the wavelength converting element 6 in the direction to the left in FIG. 1 is reflected on an angle at the end surface 6a of the wavelength converting element 6, re-enters the wavelength converting element 6 shifted from the optical axis OA of the solid-state laser light IR1 and IR2, and is output to the outside from the flat mirror 7.

Due to the coating (HR coating) and inclined arrangement of the end surface 6a of the wavelength converting element 6 as described above, the converted wavelength light S2 is output outside the cavity (to the outside of the flat mirror 7) without re-entering the wavelength converting element 6 coincidentally with the optical axis of the solid-state laser light IR1 and IR2. In addition, the converted wavelength light S1 and S2 does not enter the laser crystals 4 and 5 coincidentally with the optical axes of the solid-state laser light.

In the wavelength conversion laser 100, the laser media of the solid-state laser are composed of two or more types of laser crystals 4 and 5, and together with the solid-state laser oscillating at multiple wavelengths, the wavelength converting element 6 matches the phases of the multiple wavelengths of solid-state laser light IR1 and IR2 to the second harmonic waves SHG1 and SHG2 and the sum-frequency wave SFG1, thereby simultaneously generating the second harmonic waves SHG1 and SHG2 and the sum-frequency wave SFG1 of multiple wavelengths.

As a result of employing such a configuration, second harmonic waves and sum-frequency wave are generated from solid-state laser light IR1 and IR2 having different wavelengths that oscillate in the cavity of the solid-state laser, thereby enabling stable output of converted wavelength laser light of low coherency composed of multiple wavelengths.

As has been described above, in the present embodiment, together with generating sum-frequency wave from solid-state laser light having different central wavelengths, second harmonic waves are respectively generated simultaneously, thereby achieving high wavelength conversion efficiency and allowing the obtaining a highly efficiency laser as compared with the case of generating sum-frequency wave only or generating each second harmonic wave separately. In this manner, as a result of enhancing wavelength conversion efficiency by simultaneously generating second harmonic waves and sum-frequency wave, the degree of contribution of internal loss by each member within the cavity of the solid-state laser can be reduced. As a result, the loss specifications of members within the cavity can be relaxed thereby making it possible to lower member costs.

In addition, in the present embodiment, by using the laser crystal 4 and the laser crystal 5 composed of microchip solid-state lasers, and the wavelength converting element 6 composed of a microchip wavelength converting element having a broad phase matching tolerance and capable of converting multiple wavelengths, the wavelength conversion laser 100 can be made more compact. As a result, in the configuration of the present embodiment, the size of the wavelength conversion laser 100 can be reduced to about several cc.

Moreover, the low coherency wavelength conversion laser obtained in the present embodiment, which simultaneously generates multiple wavelengths, enables the removal of various interference noise due to the coherency of the laser. In particular, speckle noise can be removed that causes problems in the fields of imaging and illumination.

Here, simultaneous generation of sum-frequency wave and second harmonic waves from a solid-state laser having multiple central wavelengths has the problem of inducing mode competition noise that causes instability in the form of solid-state laser oscillation noise due to reverse-conversion of converted wavelength light within the wavelength converting element. However, in the wavelength conversion laser 100 of the present embodiment, converted wavelength light composed of second harmonic waves and sum-frequency wave is output outside the cavity without re-entering the wavelength converting element 6 coincidentally with the optical axes of the solid-state laser light IR1 and IR2.

Thus, in the present embodiment, by removing the path by which the converted wavelength light S2 that re-enters the wavelength converting element 6 resonates with the solid-state laser light IR1 and IR2 within the wavelength converting element 6, reverse conversion of the converted wavelength light S2 and the phenomenon of oscillation noise of the solid-state laser can be prevented, thereby allowing the obtaining of a stable output.

As has been described above, a configuration in which an HR coating for converted wavelength light is provided on the end surface 6a on the opposite side from the end surface 6b that serves as an output surface of the wavelength converting element 6 of the present embodiment, and the two surfaces are inclined relative to the optical axes of the solid-state laser light IR1 and IR2, is a preferable configuration that does not allow converted wavelength light S2 to re-enter the wavelength converting element 6 coincidentally with the solid-state laser light IR1 and IR2. In this case, mode competition noise that occurs in simultaneous generation of second harmonic waves can be avoided without using additional optical components and the like.

In this manner, in the simultaneous generation of second harmonic waves and sum-frequency wave from a solid-state laser having multiple central wavelengths, since there is susceptibility to the occurrence of mode competition noise, a configuration is extremely important that does not allow converted wavelength light and solid-state laser light to coincide when they both re-enter the wavelength converting element. In addition, the configuration of the present embodiment in which converted wavelength light is shifted from the solid-state laser light when re-entering the wavelength converting element 6 also makes it possible to simultaneously avoid the green problem that occurred in conventional internal cavity type wavelength conversion lasers. Moreover, the present embodiment is able to prevent loss attributable to absorption of converted wavelength light by the laser crystals 4 and 5 since the converted wavelength light does not enter the laser crystals 4 and 5.

In addition, although a plurality of types of the laser crystals 4 and 5 are used in the present embodiment, the number of pumping LD can be decreased and both the cost and size of the apparatus can be reduced by pumping the laser crystals 4 and 5 with the same pumping LD 1. At this time, the plurality of types of laser crystals used in the present invention preferably have overlapping absorption bands. Overlapping of absorption bands enables the laser crystals to be pumped with the same pumping LD.

In addition, in the present embodiment, by converting pumping light EL to focused light with the focusing optics 2 and allowing to enter the laser crystal 4 and the laser crystal 5 when pumping the laser crystals 4 and 5 with the same pumping LD 1, the spot diameter of the pumping light of the laser crystal having a long oscillation wavelength in the form of the laser crystal 5 ($Nd:YVO_4$) is preferably smaller than that of the laser crystal 4.

The oscillation wavelength of solid-state laser crystals becomes longer the higher the temperature of the laser crystals. By making the spot diameter of the pumping light EL of the laser crystal 5 smaller than that of the laser crystal 4, the light absorption density of the laser crystal 5 is increased, the temperature of a site where the laser crystal 5 oscillates becomes higher than the temperature of a site where the laser crystal 4 oscillates, and the oscillation wavelength of the laser crystal 5 is preferentially increased. By shifting the wavelength of the laser crystal 5 having a long oscillation wavelength in the direction of increasing length with respect to the laser crystal 4 having a short oscillation wavelength, the spectral width of the wavelength conversion laser 100 of the present embodiment can be made even broader.

Moreover, if the oscillation wavelengths of different laser crystals become excessively close, mode competition occurs in the solid-state laser during high output, and although there are cases in which this results in instability, in the present embodiment, by adjusting the spot diameter of the pumping light EL as described above to separate the oscillation wavelengths of the laser crystal 4 and the laser crystal 5, overlapping of gain between the laser crystal 4 and the laser crystal 5 is reduced, thereby enabling stable oscillation of the solid-state laser.

In addition, in the present embodiment, the central wavelength $\lambda s$ of the shortest oscillation wavelength of the solid-state laser is 1062.9 nm, the central wavelength $\lambda l$ of the longest oscillation wavelength is 1064.3 nm, the wavelength $\lambda sfg$ of the sum-frequency wave of two wavelengths is 531.8 nm, and the average wavelength $\lambda ave$ of $\lambda s$ and $\lambda l$ is 1063.6 nm. The refractive index nsfg at $\lambda sfg$ of the $MgO:LiNbO_3$ that composes the wavelength converting element 6 is 2.22, and the refractive index nave at $\lambda ave$ is 2.15. The thickness t of the wavelength converting element 6 is 0.5 mm.

At this time, the value obtained with the following equation that approximates the phase matching tolerance becomes 1.44 mm.

$$\lambda ave^2/(8\times(\lambda l-\lambda s)\times(nsfg-nave))$$

Thus, in the present embodiment, the thickness t of the wavelength converting element 6 that has a polarization inversion periodic structure preferably satisfies the relationship $0 \leq t \leq \lambda ave^2/(8\times(\lambda l-\lambda s)\times(nsfg-nave))$.

If the thickness of the wavelength converting element 6 is equal to or greater than $\lambda ave^2/(8\times(\lambda l-\lambda s)\times(nsfg-nave))$, the shift from phase matching conditions within the range multiple wavelengths at which the solid-state laser oscillates increases, adequate wavelength conversion efficiency is unable to be obtained with respect to second harmonic waves and sum-frequency wave, and converted wavelength light is unable to be obtained over a broad spectral width corresponding to the oscillation bandwidth of the solid-state laser.

On the other hand, wavelength conversion is obviously not possible in the absence of the wavelength converting element.

In addition, the thickness t of the wavelength converting element 6 is more preferably 0.2 mm or more. If the thickness t is less than 0.2 mm, wavelength conversion efficiency decreases considerably thereby preventing the obtaining of highly efficient converted wavelength light. In addition, handling becomes difficult leading to increased apparatus costs.

In addition, in the present embodiment, the central wavelength $\lambda s$ of the shortest oscillation wavelength and the central wavelength $\lambda l$ of the longest oscillation wavelength among multiple oscillation wavelengths of the solid-state laser preferably satisfies the relationship 0.5 nm$<\lambda l-\lambda s<$5 nm. In this case, the oscillation bandwidth of the solid-state laser (range from the shortest oscillation wavelength to the longest oscillation wavelength) falls within the above-mentioned range, thereby making it possible to obtain low coherency converted wavelength light at high efficiency.

Namely, in the case the oscillation bandwidth of the solid-state laser is 0.5 nm or less, the spectral width of the converted wavelength light becomes narrower, coherency of the converted wavelength light is not low enough, and the effect of reducing interference noise is limited. In addition, if the oscillation bandwidth of the solid-state laser is 0.5 nm or less, there is increased susceptibility to mode competition of the solid-state laser, thereby resulting in increased susceptibility to instability during high output. On the other hand, in the case the oscillation bandwidth of the solid-state laser is 5 nm or more, wavelength conversion over the entire oscillation bandwidth of the solid-state laser cannot be carried out, wavelength conversion efficiency becomes low, and efficiency of use as a wavelength conversion laser ends up decreasing.

In addition, in the present embodiment, the pumping LD 1 is a wide stripe LD for which the wavelength is locked and which emits pumping light at 808 nm. The amount of Nd ion and thickness of the laser crystal of the laser crystal 4 are designed so that about 40% of the pumping light that enters the cavity is absorbed. The amount of Nd ion added and the laser crystal thickness of the laser crystal 5 are designed so that nearly all of the pumping light that has entered is absorbed, and nearly all pumping light unable to be absorbed with the laser crystal 4 is absorbed. Thus, in the present embodiment, 98% or more of pumping light that enters the cavity is absorbed by the laser crystal 4 and the laser crystal 5.

In this manner, in the present Embodiment 1, if the number of a plurality of laser crystals is taken to be N (where N is an integer of 2 or more), the laser crystal 4 having the shortest oscillation wavelength preferably absorbs 1/2N to 1/N of pumping light that enters the cavity, and all of the plurality of laser crystals, namely both the laser crystal 4 and the laser crystal 5 (N=2 in Embodiment 1), absorb 95% or more of pumping light that enters the cavity.

By making the amount of absorption of the laser crystal 4 having the shortest oscillation wavelength to 1/N or less, heat generation by laser crystals having an oscillation wavelength shorter than other crystals can be inhibited, thereby making it possible to prevent the oscillation wavelength from shifting towards a longer wavelength. As a result, the oscillation wavelength width of the solid-state laser can be prevented from narrowing, thereby preventing narrowing of the spectral width of converted wavelength light. In addition, mode competition caused by close proximity of the oscillation wavelengths of the solid-state laser can also be avoided.

In addition, by making the amount of absorption of the laser crystal having the shortest oscillation wavelength 1/2N or more, the intensity of the oscillation wavelength having the shortest wavelength of the solid-state laser can be maintained, thereby making it possible to prevent the occurrence of spectral bias in converted wavelength light. Namely, in the case of being less than 1/2N, short wavelength components of converted wavelength light decrease and the effect of reducing coherency is limited. Moreover, by making the absorption rate of pumping light for the total of the plurality of laser crystals to be 95% or more, pumping efficiency of the solid-state laser is enhanced, thereby enabling highly efficient generation of converted wavelength light.

In addition, in the present embodiment, the plurality of laser crystals 4 and 5 are crystals in which the same active ion material has been added to different host materials, and the amount of active ion added in the laser crystal 5 having a long oscillation wavelength is preferably greater than the amount of active ion added in the laser crystal 4 having a short oscillation wavelength. In the case of using crystals in which the same active ion material has been added to different host materials, the crystals can be pumped with a single semiconductor laser since the absorption bands are close. In addition, as a result of having close oscillation wavelengths, the crystals are able to oscillate at wavelengths of a band in which second harmonic waves and sum-frequency wave can be simultaneously generated as required in the present invention. However, since mode competition of the solid-state laser and narrowing of the spectral width of the converted wavelength light may occur if the oscillation wavelengths are excessively close, in the present embodiment, the amount of active ion added in the laser crystal 5 having a long oscillation wavelength is made to be greater than the amount of active ion added in the laser crystal 4 having a short oscillation wavelength, thereby preventing the oscillation wavelengths from being excessively close.

In addition, in the present embodiment, the laser crystals are preferably composed of two types of Nd:GdVO$_4$ and Nd:YVO$_4$. Nd:GdVO$_4$ and Nd:YVO$_4$ can be pumped by a single pumping LD, and since the oscillation wavelength of Nd:GdVO$_4$ is about 1 to 3 nm shorter, this results in the optimum combination of laser crystals for the low coherency wavelength conversion laser of the present invention. In addition, since vanadate crystals have a large induced emission surface area and can be used in the form of microchips, they enable the focusing optics and cavity to be reduced in size, thereby making it possible to make the wavelength conversion laser more compact.

In addition, in the present embodiment, the two laser crystals 4 and 5 and the wavelength converting element 6 are preferably composed of microchip crystals having a thickness of 1 mm or less, and are preferably spatially arranged apart from each other on an optical path. Although microchip laser crystals tend to become unstable due to temperature rises during high output, in the present embodiment, by spatially separating heat generating bodies in the form of the laser crystals 4 and 5 on an optical path, mutual thermal interference is eliminated, thereby enabling the crystals to cool. In addition, with respect to configurations using a single laser crystal as well, since heat generating sites can be divided among multiple locations in the configuration of the present embodiment that uses a plurality of laser crystals, thermally superior oscillation that is stable during high output can be carried out. Moreover, by separating the wavelength converting element 6 from the laser crystals 4 and 5 on the optical path of the solid-state laser light, thermal interference from the laser crystals 4 and 5 with respect to the wavelength converting element 6 can be prevented.

Figure 3:
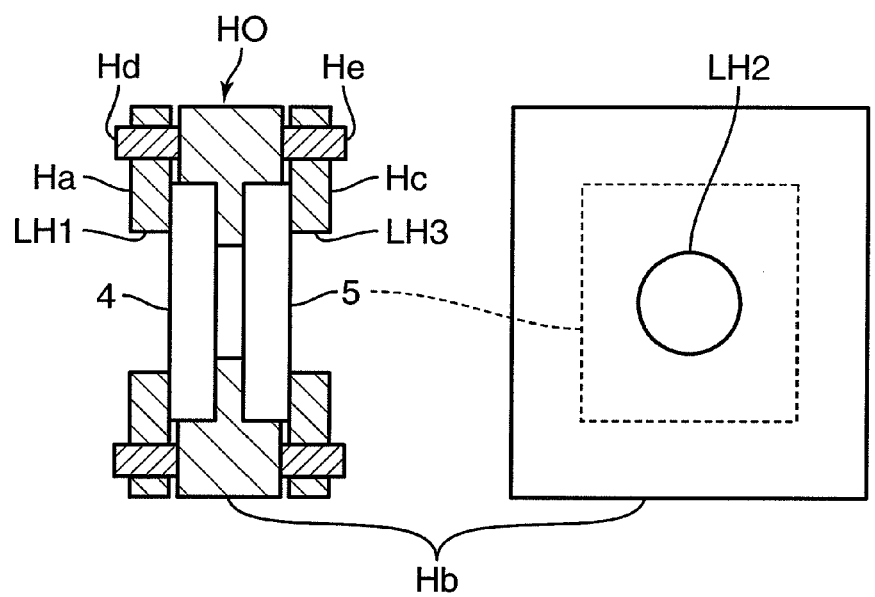
FIG. 3 is a schematic diagram of laser crystals and a holder of laser crystals shown in FIG. 1.

Next, a detailed explanation of an example of a configuration in which the two laser crystals 4 and 5 are arranged spatially apart from each other on an optical path as described above. FIG. 3 is a schematic drawing of a holder of the laser crystals 4 and 5 shown in FIG. 1. The holder HO shown in FIG. 3 is composed of a crystal holder Ha, a common crystal holder portion Hb, a crystal holder Hc and fixing portions Hd and He, the crystal holder Ha, the common crystal holder portion Hb and the crystal holder Hc have a rectangular shape, and laser light passage openings LH1, LH2 and LH3 are formed in the center thereof. The crystal holder Ha is fixed to the common crystal holder portion Hb by the fixing portion Hd, and the laser crystal 4 is clamped between the crystal holder Ha and the common crystal holder portion Hb. The crystal holder Hc is fixed to the common crystal holder portion Hb by the fixing portion He, and the laser crystal 5 is clamped by the crystal holder Hc and the common crystal holder portion Hb. Furthermore, an interface between the holder HO and the laser crystals 4 and 5 may be mediated by solder or indium corresponding to contactability.

In the configuration example of FIG. 3, the microchip laser crystals 4 and 5 are spatially apart from each other on the optical path of the solid-state laser light, and share a heat dissipating mechanism in the form of the holder HO. The holder HO is composed of copper and the like having high thermal conductivity. In this case, since the thermal conductivity of the holder HO is 10 times or more higher than that of the laser crystals 4 and 5, even though they share the holder HO, thermal interference between the laser crystal 4 and the laser crystal 5 can be ignored.

In the configuration example of FIG. 3, the two laser crystals are preferably held with a common holder. Although there is the problem of adjustment mechanisms, such as that for aligning the axes of the laser light, becoming complex in the case of using a plurality of laser crystals, by connecting the laser crystals 4 and 5 through a single holder HO as in the present configuration example, the bother of having to make adjustments can be eliminated.

Embodiment 2

Figure 4:
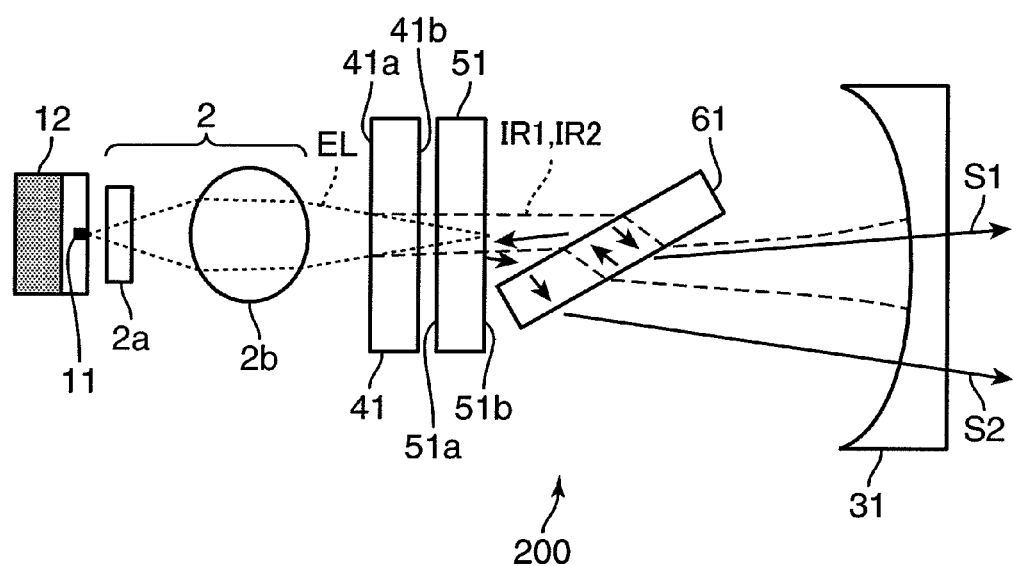
FIG. 4 is a schematic block diagram of a wavelength conversion laser in an Embodiment 2 of the present invention.

FIG. 4 is a schematic block diagram of a wavelength conversion laser 200 in an Embodiment 2 of the present invention. Furthermore, in FIG. 4, the same reference symbols are used to indicate those components that are the same as those of Embodiment 1, and detailed explanations thereof are omitted.

In the wavelength conversion laser 200, the solid-state laser that oscillates at multiple wavelengths is composed of a laser crystal 41, a laser crystal 51 and a concave mirror 31, and the cavity of the solid-state laser is composed of the laser crystal 41 and the concave mirror 31.

The laser crystal 41 is composed of Nd:GdVO$_4$ (Nd concentration: 0.5%, thickness: 0.6 mm), and oscillates at wavelengths having a central wavelength of 1062.9 nm. The laser crystal 51 is composed of Nd:YVO$_4$ (Nd concentration: 2%, thickness: 1 mm), and oscillates at wavelengths having a central wavelength of 1064.3 nm. Pumping light EL emitted by a pumping LD 11 is focused by the focusing optics 2 so as to overlap with the solid-state laser light IR1 and IR2 in the laser crystal 41 and the laser crystal 51. Thus, the pumping light EL is focused so that the spot diameter thereof is smaller in the laser crystal 51 having a long oscillation wavelength than in the laser crystal 41.

An AR coating for pumping light (808 nm) and a HR coating for the wavelength of the laser light (1060 to 1068 nm) are provided on a pumping light EL incident surface 41*a* of the laser crystal 41. AR coatings for the solid-state laser light wavelength and pumping light are provided on the other surface 41*b* of the laser crystal 41. AR coatings for pumping light and the solid-state laser wavelength are provided on an end surface 51*a* of the laser crystal 51 on the side of the pumping LD 11, while an AR coating for the solid-state laser wavelength and an HR coating for converted wavelength light are provided on the other end surface 51*b*.

A wavelength converting element 61 is composed of MgO:LiTaO$_3$ (PPLT) having a polarization inversion periodic structure, and has a thickness of 1 mm in the direction of the optical path of the solid-state laser. The wavelength converting element 61 is arranged on an incline of about 65 degrees relative to the optical axes of the solid-state laser light IR1 and IR2 so as to form Brewster's angle with respect to the wavelength of the solid-state laser. The wavelength converting element 61 is able to carry out phase matching that generates second harmonic waves and sum-frequency wave of the wavelength oscillated by the two laser crystals 41 and 51, and outputs converted wavelength light S1 and S2 by simultaneously converting the solid-state laser light IR1 and IR2 to second harmonic waves and sum-frequency wave.

The concave mirror 31 is provided with an HR coating for the wavelength of the solid-state laser and an AR coating for the converted wavelength light (530 to 534 nm), and the concave mirror 31 serves as an output mirror of the converted wavelength light.

According to the above-mentioned configuration, converted wavelength light S1 of the solid-state laser light that passes through the wavelength converting element 61 in the direction to the right in FIG. 4 is led outside the cavity by the concave mirror 31. On the other hand, the converted wavelength light S2 of the solid-state laser light that passes through the wavelength converting element 61 to the left in FIG. 4 is emitted from the wavelength converting element 61 at an angle that is greater than the optical path of the solid-state laser by color dispersion of the wavelength converting element 61, and is excluded from the solid-state laser light IR1 and IR2. Subsequently, the converted wavelength light S2 is reflected at the end surface 51*b* of the laser crystal 51 and re-enters the wavelength converting element 61. Since the converted wavelength light S2 that re-enters the wavelength converting element 61 is excluded from the solid-state laser light, mode competition noise caused by reverse conversion, which becomes a problem in the simultaneous generation of second harmonic waves and sum-frequency wave, can be avoided.

In this manner, the present embodiment preferably avoids mode competition noise by inclining at Brewster's angle and color dispersion of the wavelength converting element 61. In this case, even it is difficult to coat the wavelength converting element with an AR coating, HR coating and the like, converted wavelength light can be shifted from the solid-state laser light with a compact configuration based only on the arrangement of the wavelength converting element 61. In addition, as a result of reflecting converted wavelength light with the laser crystal 51, converted wavelength light can be prevented from entering the laser crystals 41 and 51, thereby preventing converted wavelength light from being absorbed by the laser crystals.

In addition, in the present embodiment, the thickness t of the wavelength converting element 61 is a thickness of 1 mm relative to the optical path of the solid-state laser, and the thickness t satisfies the relationship $0 < t < \lambda_{ave}^2/(8 \times (\lambda l - \lambda s) \times (n_{sfg} - n_{ave}))$. Thus, the wavelength converting element 61 has an adequately broad phase matching tolerance with respect to the multiple wavelengths of the solid-state laser in the same manner as in Embodiment 1.

In addition, in the present embodiment, the pumping LD 11 is an 808 nm band wide-stripe semiconductor laser, and temperature is controlled by an LD temperature controller 12.

The LD temperature controller 12 is able to shift the oscillation wavelength by changing the temperature of the pumping LD 11.

Here, the amount of pumping light absorbed by the laser crystal 41 varies according to the wavelength of the pumping light. The laser crystal 51 absorbs nearly all of the pumping light that has passed through the laser crystal 41. In the present embodiment, the absorption rate of pumping light that enters the cavity by the laser crystal 41 can be varied from 20% to 60% depending on the control temperature of the pumping LD 11.

For example, when the absorption rate of pumping light of the laser crystal 41 is low, the power of the solid-state laser light oscillated by the laser crystal 41 is less than the power of the solid-state laser light oscillated by the laser crystal 51, and the wavelength component originating in the oscillation wavelength of the laser crystal 41 included in the converted wavelength light output outside the cavity becomes smaller.

In the present embodiment, the LD temperature controller 12 controls the wavelength distribution of converted wavelength light by controlling the temperature of the pumping LD 11 and controlling the wavelength of the pumping LD. Namely, since the laser crystal 41 oscillates a portion having a short oscillation wavelength, if the absorption rate of the pumping light is low, the short wavelength component of the converted wavelength light becomes smaller, and the wavelength distribution of the converted wavelength light shifts toward a higher wavelength. Similarly, in the case the absorption rate of pumping light of the laser crystal 41 is high, the wavelength distribution of the converted wavelength light shifts toward a lower wavelength.

In this manner, the present embodiment preferably controls wavelength distribution of converted wavelength light according to the wavelength of the semiconductor laser that pumps the solid-state laser (pumping light source) in the form of the pumping LD 11. Although conventional internal cavity type wavelength conversion lasers were unable to control the wavelength of converted wavelength light by varying the wavelength of an pumping LD, in the present embodiment, the wavelength of converted wavelength light is able to be controlled by using a plurality of types of laser crystals 41 and 51 and varying the wavelength of the pumping LD 11. This control of the wavelength of converted wavelength light makes it possible to expand the application range to include applications in the field of analysis and the like.

Embodiment 3

Figure 5:
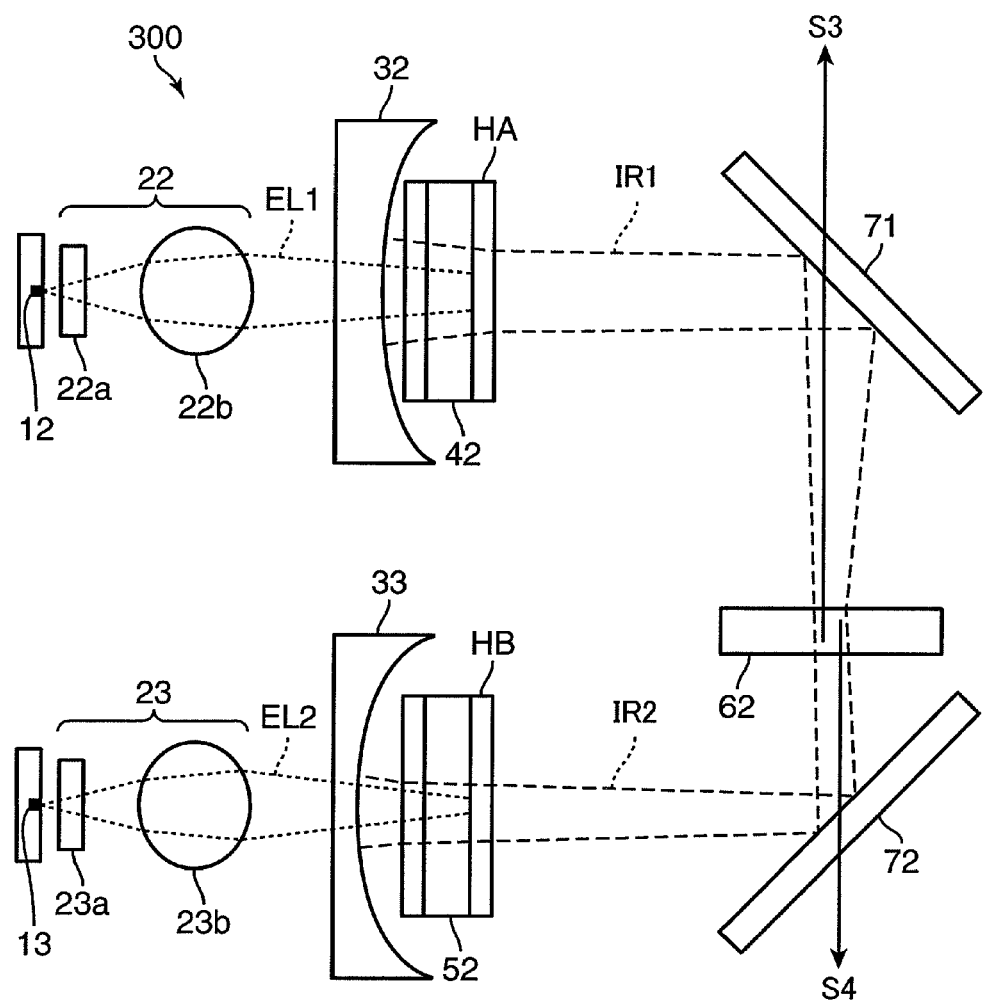
FIG. 5 is a schematic block diagram of a wavelength conversion laser in an Embodiment 3 of the present invention.

FIG. 5 is a schematic block diagram of a wavelength conversion laser 300 in an Embodiment 3 of the present invention. Furthermore, in FIG. 5, the same reference symbols are used to indicate those components that are the same as those of previously described embodiments, and detailed explanations thereof are omitted.

In the wavelength conversion laser 300, a solid-state laser that oscillates at multiple wavelengths is composed of a concave mirror 32, a concave mirror 33, a laser crystal 42, a laser crystal 52, a flat mirror 71 and a flat mirror 72, and a cavity of the solid-state laser is composed of the concave mirror 32 and the concave mirror 33. The laser crystal 42, the laser crystal 52 and a wavelength converting element 62 are arranged within the cavity, while the flat mirrors 71 and 72 serve as output mirrors of converted wavelength light S3 and S4.

Focusing optics 22 and 23 are composed of lenses 22a and 23a, which control the beam diameter of pumping light EL1 and EL2 in the direction of thickness of active layers of pumping LD 12 and 13, and lenses 22b and 23b, which control beam diameter of pumping light EL1 and EL2 in the direction of width of the active layers, in the same manner as the focusing optics 2. The pumping light EL1 emitted by the pumping LD 12 is focused by the focusing optics 22 so as to overlap with the solid-state laser light IR1 in the laser crystal 42. The pumping light EL2 emitted by the pumping LD 13 is focused by the focusing optics 23 so as to overlap with the solid-state laser light IR2 in the laser crystal 52.

The laser crystal 42 is composed of Nd:GdYVO$_4$ (Nd concentration: 1%, thickness: 2 mm), and oscillates at wavelengths having a central wavelength of 1062.9 nm. The laser crystal 52 is composed of Nd:YVO$_4$ (Nd concentration: 1%, thickness: 2 mm), and oscillates at wavelengths having a central wavelength of 1064.3 nm. In addition, the laser crystal 42 is fixed by a crystal holder HA and is cooled by the crystal holder HA. The laser crystal 52 is fixed by a crystal holder HB and is cooled by the crystal holder HB.

An HR coating for the solid-state laser wavelength (1060 to 1068 nm) and an AR coating for the pumping light (808 nm) are formed on the concave mirrors 32 and 33, and AR coatings for pumping light are formed on the surfaces of the concave mirrors 32 and 33 on the side of the pumping LD 12 and 13. AR coatings for the solid-state laser wavelength are formed on the laser crystals 42 and 52, and AR coatings for pumping light are formed on the laser crystals 42 and 52 on the side of the pumping LD 12 and 13. AR coatings for the solid-state laser wavelength and converted wavelength light (530 to 534 nm) are formed on the wavelength converting element 62. HR coatings for the solid-state laser wavelength and AR coatings for converted wavelength light are formed on the flat mirrors 71 and 72.

The wavelength converting element 62 is able to carrying out phase matching that allows the generation of second harmonic waves and sum-frequency wave of a wavelength at which the two laser crystals 42 and 52 oscillate, and converted wavelength light S3 and S4 are simultaneously output by converting the solid-state laser light IR1 and IR2 to second harmonic waves and sum-frequency wave. The wavelength converting element 62 is composed of MgO:LiNbO$_3$ (PPLN) having a polarization inversion periodic structure, and has a thickness of 0.5 mm in the direction of the optical path of the solid-state laser.

According to the configuration described above, the converted wavelength light S3 of the solid-state laser that passes through the wavelength converting element 62 in the upward direction in FIG. 5 is output outside the cavity by the flat mirror 71. On the other hand, the converted wavelength light S4 of the solid-state laser that passes through the wavelength converting element 62 in the downward direction in FIG. 5 is output outside the cavity by the flat mirror 72. The wavelength conversion laser 300 prevents the converted wavelength light S3 and S4 from re-entering the wavelength converting element 62 coincidentally with the solid-state laser light IR1 and IR2 by having the two output mirrors 71 and 72 for the converted wavelength light S3 and S4. As a result, the present embodiment avoids mode competition noise that occurs during simultaneous generation of second harmonic waves and sum-frequency wave by using the two output mirrors 71 and 72.

In addition, in the present embodiment, the laser crystal 52 having a long oscillation wavelength is controlled to be at a higher temperature in the region in which solid-state laser light of the laser crystals is oscillated than the laser crystal 42 having a short oscillation wavelength.

More specifically, in the present embodiment, by changing the radius of curvature of the concave mirror 32 and the concave mirror 33 to make the radius of curvature of the concave mirror 33 smaller than the radius of curvature of the concave mirror 32, the beam diameter of solid-state laser light is smaller in the laser crystal 52 than in the laser crystal 42. In addition, the focusing optics 23 is configured to make the beam diameter of pumping light smaller than that of the focusing optics 22 so that the pumping light EL2 overlaps with the solid-state laser light IR2 that has become smaller in the laser crystal 52. Consequently, the temperature of the region in which the solid-state laser light IR2 of the laser crystal 52 oscillates is higher than the region in which the solid-state laser light IR1 of the laser crystal 42 oscillation even in the case the crystal holders HA and HB are controlled at the same temperature.

As a result of employing such a configuration, the temperature of the region in which the solid-state laser light of the laser crystal 52 having a long oscillation wavelength oscillates can be made to be higher than that of the laser crystal 42 having a short oscillation wavelength. Furthermore, in the case the diameter of solid-state laser light in the laser crystals is the same for both the laser crystals, the temperature of the region in which the solid-state laser light of the laser crystals oscillates can be controlled by making the temperatures of the crystal holders HA and HB different. For example, various methods can be used, such as changing the amount of heat dissipated between the crystal holders or providing a temperature controller and the like in the crystal holders in the same manner as Embodiment 2.

Here, the oscillation wavelength of solid-state lasers shifts toward a longer wavelength as the temperature of the laser crystal increases. In the present embodiment, the temperature of the region in which the laser crystal 52 oscillates, namely the region in which solid-state laser light oscillates within the laser crystal 52, is made to be higher than the temperature of the region in which the laser crystal 42 oscillates, namely the region in which solid-state laser light oscillates within the laser crystal 42, thereby preferentially increasing the oscillation wavelength of the laser crystal 52. As a result, the spectral width of the wavelength conversion laser is able be made even broader by shifting the wavelength of the laser crystal 52 having a long oscillation wavelength in the direction of a longer wavelength relative to the laser crystal 42 having a short oscillation wavelength.

In addition, if the oscillation wavelengths of different laser crystals become excessively close, mode competition occurs in the solid-state laser during high output, and although there are cases in which this results in instability, in the present embodiment, by separating the oscillation wavelengths of the laser crystal 42 and the laser crystal 52 by shifting the wavelength of the laser crystal 52 in the direction of a longer wavelength as previously described, overlapping of gain between the laser crystal 42 and the laser crystal 52 is reduced, thereby enabling stable oscillation of the solid-state laser.

Embodiment 4

Figure 6:
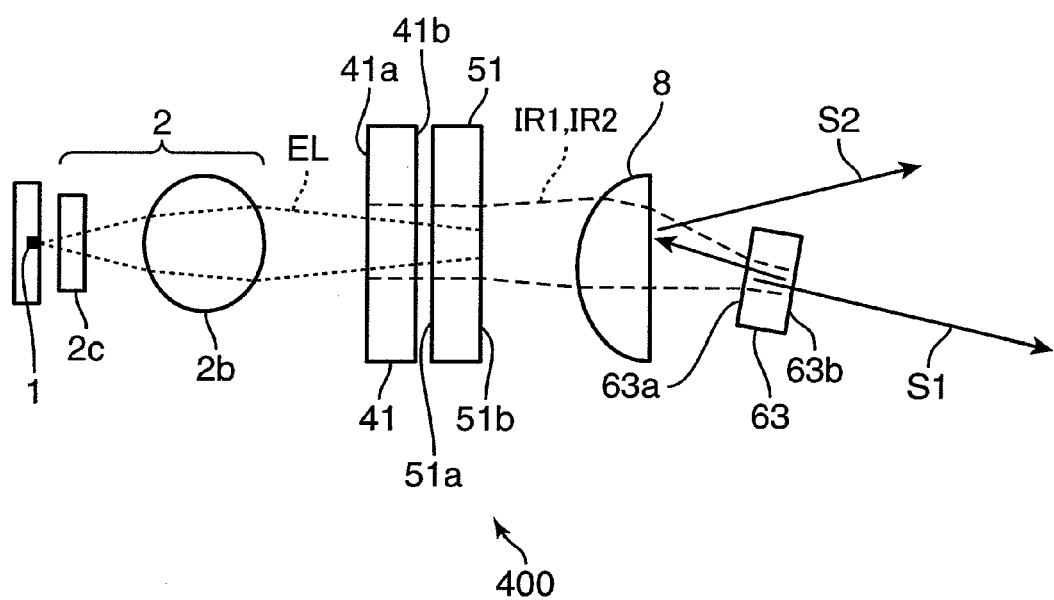
FIG. 6 is a schematic block diagram of a wavelength conversion laser in an Embodiment 4 of the present invention.

FIG. 6 is a schematic block diagram of a wavelength conversion laser 400 in an Embodiment 4 of the present invention. Furthermore, in FIG. 6, the same reference symbols are used to indicate those components that are the same as those of previously described embodiments, and detailed explanations thereof are omitted.

In the wavelength conversion laser 400, a solid-state laser that oscillates at multiple wavelengths is composed of the laser crystal 41, the laser crystal 51 and a wavelength converting element 63, and the cavity of the solid-state laser is composed of the laser crystal 41 and the wavelength converting element 63.

An AR coating for pumping light (808 nm) and an HR coating for the wavelength of the laser light (1060 to 1068 nm) are provided on the incident surface 41a for the pumping light EL of the laser crystal 41. AR coatings for the solid-state laser light wavelength and pumping light are provided on the other surface 41b of the laser crystal 41. AR coatings for pumping light and the solid-state laser wavelength are provided on an end surface 51a of the laser crystal 51 on the side of the pumping LD, while an AR coating for the solid-state laser wavelength is provided on the other end surface 51b.

AR coatings for the solid-state laser wavelength and converted wavelength light (530 to 534 nm) are provided on an end surface 63a of the wavelength converting element 63 on the side of the laser crystals. An HR coating for the solid-state laser wavelength and an AR coating for converted wavelength light are provided on the other end surface 63b of the wavelength converting element 63, and the surface 63b serves as an output mirror of the converted wavelength light S1.

An AR coating for the solid-state laser wavelength and an HR coating for the converted wavelength light are provided on a lens 8. The lens 8 is a plano-convex spherical lens, is arranged at a location off center from the solid-state laser light IR1 and IR2, and employs a configuration that inclines the solid-state laser light IR1 and IR2. The wavelength converting element 63, which serves as a cavity mirror, is also arranged on an angle with respect to this angle of inclination. As a result of being arranged on an angle in this manner, the converted wavelength light S2 is prevented from re-entering the wavelength converting element 63 coincidentally with the solid-state laser light IR1 and IR2.

In addition, the present embodiment employs a configuration in which the beam diameters of the solid-state laser light IR1 and IR2 in the wavelength converting element 63 are made smaller, by the lens 8, than the beam diameters of the solid-state laser light IR1 and IR2 of the laser crystals 41 and 51. By making the solid-state laser beam diameters in the wavelength converting element 63 smaller in this manner, light intensity of the solid-state laser light within the wavelength converting element 63 is increased and wavelength conversion efficiency is enhanced, thereby making it possible to improve the efficiency of the wavelength conversion laser 400. In addition, enhancing wavelength conversion efficiency makes it possible to reduce the degree of contribution of internal loss by optical members within the cavity relative to output. As a result, the loss specifications of members within the cavity can be relaxed thereby making it possible to lower member costs.

In addition, increasing the beam diameters of the solid-state laser light in the laser crystals 41 and 51 makes it possible to increase the beam diameters of pumping light in the laser crystals 41 and 51, thereby reducing the light intensity of the pumping light and inhibiting generation of heat in the laser crystals 41 and 51. Inhibiting generation of heat in the laser crystals makes it possible to improve high output characteristics of the wavelength conversion laser 400.

Moreover, since a coating that reflects converted wavelength light is formed on the lens 8, the lens 8 reflects the converted wavelength light S2 and the converted wavelength light S2 is prevented from re-entering the wavelength converting element 63 coincidentally with the solid-state laser light IR1 and IR2, thereby eliminating mode competition noise. By inserting a lens within the cavity of the solid-state laser that reflects converted wavelength light and controls the beam diameter of the solid-state laser light in this manner, high efficiency and stability during high output can be obtained.

As has been described above, the present embodiment preferably uses the end surface 63b of the wavelength converting element 63 as an output mirror to enable the converted wavelength light S2 to be output outside the cavity by the lens 8 without re-entering the wavelength converting element 63 coincidentally with the solid-state laser light.

In addition, in the case of using the lens 8, the end surface 63b of the wavelength converting element 63 is preferably used as a cavity mirror to narrow beam diameter within the wavelength converting element 63. By using the end surface 63b of the wavelength converting element 63 as a cavity mirror, a beam focal point of the solid-state laser light is formed within the wavelength converting element 63, enabling beam diameter to be ideally focused and allowing the realization of a compact configuration.

Furthermore, since the lens that is inserted is only required to demonstrate lens power by means of refraction, a bi-convex lens or aspheric lens can also be used. In addition, although the lens 8 is arranged off-center, the arrangement thereof is not limited to this example, but rather by arranging any of the lens surfaces on an angle with respect to the solid-state laser light, the converted wavelength light S2 can be prevented from re-entering the wavelength converting element 62 coincidentally with the solid-state laser light.

Embodiment 5

Figure 7:
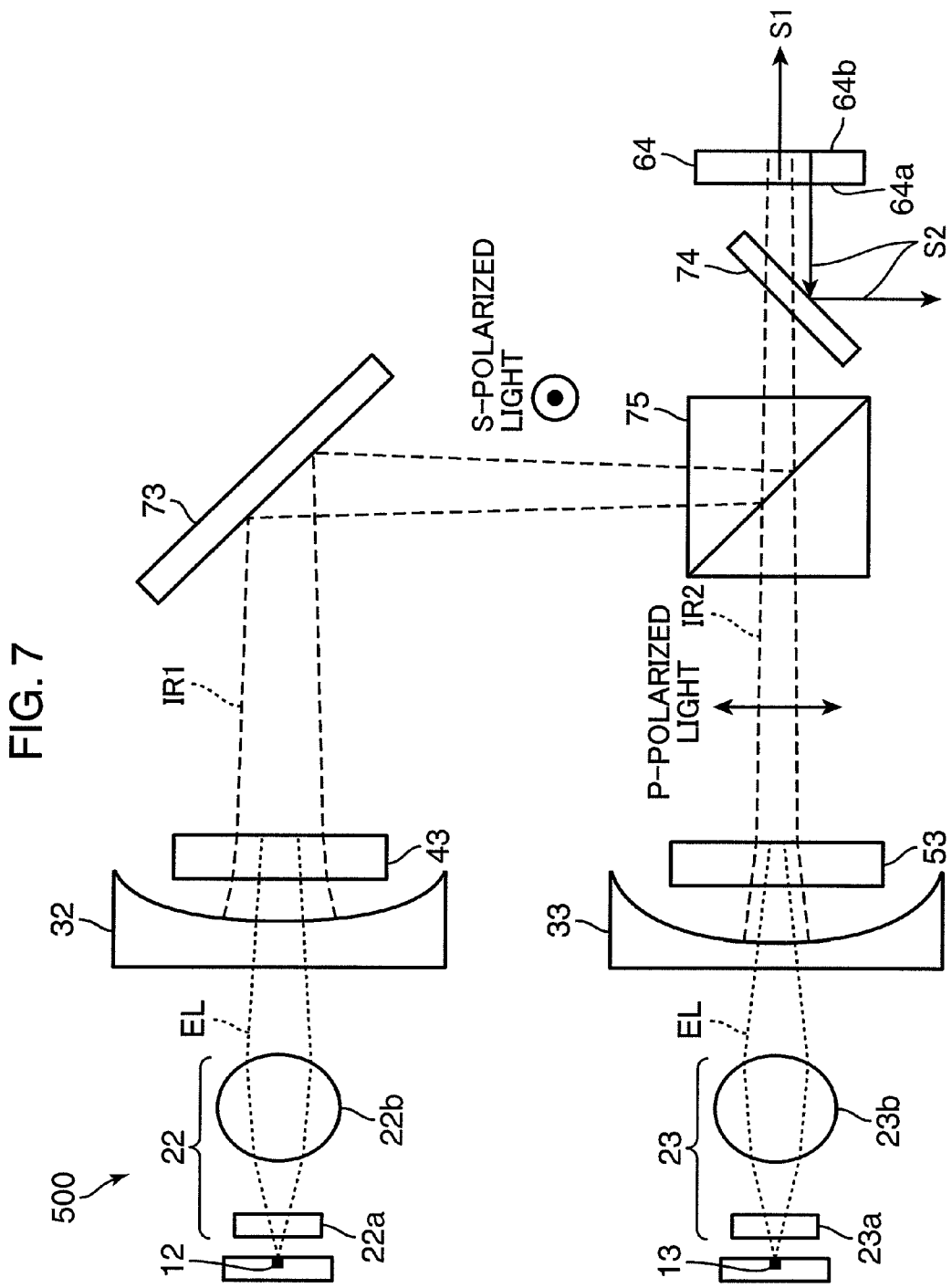
FIG. 7 is a schematic block diagram of a wavelength conversion laser in an Embodiment 5 of the present invention.

FIG. 7 is a schematic block diagram of a wavelength conversion laser 500 in an Embodiment 5 of the present invention. Furthermore, in FIG. 7, the same reference symbols are used to indicate those components that are the same as those of previously described embodiments, and detailed explanations thereof are omitted.

The wavelength conversion laser 500 has a configuration in which an S-polarized solid state laser cavity and a P-polarized solid state laser cavity are coupled by a polarizing beam splitter (PBS) 75. A laser crystal 43 and a laser crystal 53 are arranged such that the optical axes of the crystals are rotated by 90 degrees, and although both carry out laser oscillation by π-polarization of the laser crystals, the 90 degree direction of polarization differs as viewed from the cavities. The S-polarized cavity mirror is composed of the concave mirror 32 and a wavelength converting element 64, while the P-polarized cavity mirror is composed of the concave mirror 33 and the wavelength converting element 64. The PBS 75 couples the cavities by reflecting S-polarized light and allowing P-polarized light to pass there through.

The laser crystal 43 is composed of Nd:GdYVO$_4$ (Nd concentration: 1%, thickness: 2 mm), and oscillates at wavelengths having a central wavelength of 1062.9 nm. The laser crystal 53 is composed of Nd:YVO$_4$ (Nd concentration: 1%, thickness: 2 mm), and oscillates at wavelengths having a central wavelength of 1064.3 nm. As described above, the laser crystal 43 and the laser crystal 53 are arranged such that the optical axes of the crystals are rotated by 90 degrees with respect to the solid-state laser cavities.

The wavelength converting element 64 uses MgO:LiNbO$_3$ (PPLN) having a polarization inversion periodic structure, and the polarization inversion periodic structure is formed in the ±directions of the z axis. This z axis is arranged to be laying in the direction of 45 degrees with respect to the S-polarized light and the P-polarized light of the cavities. Although the thickness of the wavelength converting element 64 is about 0.5 mm, it is polished to a thickness at which it acts on the resonant wavelength of the solid-state laser in the form of a λ/2 plate. As a result of the solid-state laser light IR1 and IR2 passing back and forth through the wavelength converting element 64, the direction of polarization coincides with the resonating laser light causing it to return to the laser crystals 43 and 53, respectively. An AR coating for the solid-state laser wavelength (1062 to 1066 nm) and an AR coating for converted wavelength light (531 to 533 nm) are formed on a surface 64a of the wavelength converting element 64 shown on the left side thereof in the drawing, while an HR coating for the solid-state laser wavelength and an AR coating for converted wavelength light are formed on a surface 64b shown on the right side of the wavelength converting element 64 in the drawing.

In addition, the radii of curvature of the concave mirrors 32 and 33 are determined and other optical components are adjusted so that the S-polarized and P-polarized solid-state laser light overlap in the wavelength converting element 64. In the wavelength converting element 64, respective second harmonic waves and sum-frequency wave at the two resonant wavelengths of the solid-state laser undergo phase matching, resulting in the simultaneous generation of converted wavelength light of the second harmonic waves and sum-frequency wave.

In the present embodiment, by using the z axis of the wavelength converting element 64 as an optical axis that is inclined in the direction of 45 degrees with respect to the direction of polarization of the solid-state laser, second harmonic waves and sum-frequency wave at wavelengths having different polarization can be generated simultaneously. In addition, the thickness of the wavelength converting element 64 is reduced to broaden the wavelength tolerance at which wavelength conversion can be carried out. Moreover, by making the thickness of the wavelength converting element 64 to be a thickness that acts in the form of a λ/2 plate, a configuration results that enables the solid-state laser to resonate stably.

The converted wavelength light S1 of solid-state laser light that passes through the wavelength converting element 64 in the direction to the right in FIG. 7 is output outside the cavity from the end surface 64b of the wavelength converting element 64. The converted wavelength light S2 of the solid-state laser light that passes through the wavelength converting element 64 in the direction to the left in FIG. 7 is output outside the cavity by being reflected by a dichroic mirror 74, and does not re-enter the wavelength converting element 64 coincidentally with the solid-state laser light. In the present embodiment, by not allowing converted wavelength light to re-enter the wavelength converting element 64 coincidentally with solid-state laser light in this manner, model competition noise caused by simultaneous generation of second harmonic waves and sum-frequency wave is prevented.

Namely, the present embodiment preferably simultaneously generates second harmonic waves and sum-frequency wave of multiple wavelengths in the wavelength conversion laser 500 having the wavelength converting element 64 in the cavity, by resonating, within the cavity, different wavelengths having polarizations perpendicular to each other, providing the wavelength converting element 64 with an optical axis that is inclined with respect to the perpendicular polarization components of the wavelengths, and phase-matching oscillation wavelengths having different wavelengths and polarization to the second harmonic waves and sum-frequency wave.

As described above, mode competition occurring between multiple wavelengths resonating within the cavities can be avoided by resonating wavelengths having perpendicular polarization, thereby enabling stable resonance of multiple wavelengths. In addition, as a result of the wavelength converting element 64 having an optical axis that is inclined with respect to the oscillation wavelengths, both wavelengths can be converted with respect to polarization components perpendicular to each other, thereby making it possible to simultaneously generate second harmonic waves and sum-frequency wave of each oscillation wavelength. Moreover, since the wavelength converting element 64 has a phase matching range that allows generation or each second harmonic waves and sum-frequency wave, converted wavelength light output following wavelength conversion is composed of multiple spectra, thereby increasing spectral width and reducing interference.

Embodiment 6

Figure 8:
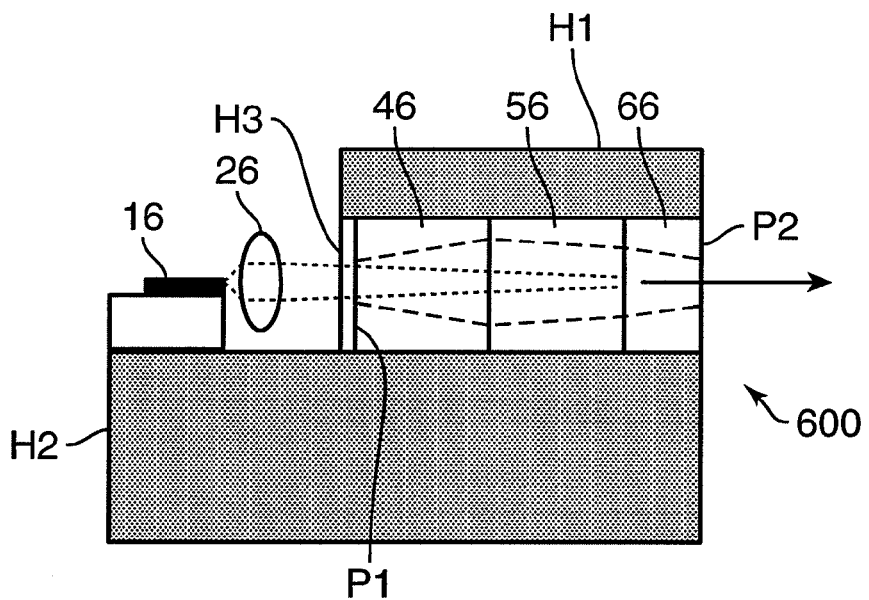
FIG. 8 is a side view showing the schematic configuration of a wavelength conversion laser in an Embodiment 6 of the present invention.
Figure 9:
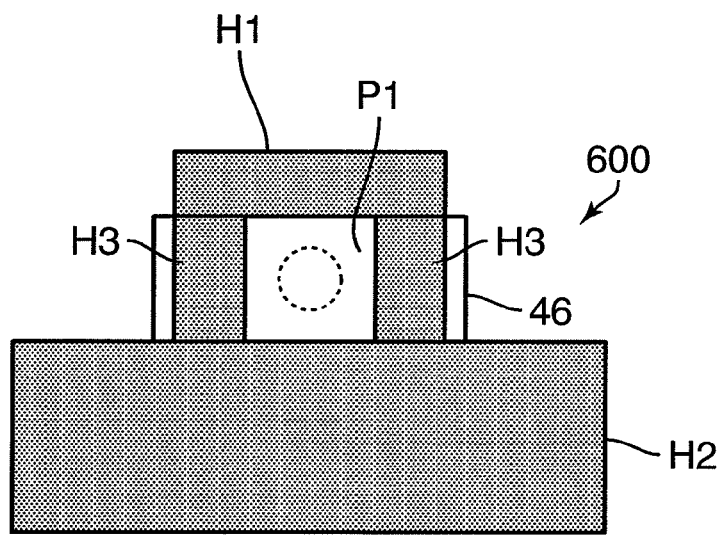
FIG. 9 is a front view showing the schematic configuration of the wavelength conversion laser shown in FIG. 8.

FIG. 8 is a side view showing the schematic configuration of a wavelength conversion laser 600 in an Embodiment 6 of the present invention, while FIG. 9 is a front view showing the schematic configuration of the wavelength conversion laser 600 shown in FIG. 8. Furthermore, in FIGS. 8 and 9, the same reference symbols are used to indicate those components that are the same as those of previously described embodiments, and detailed explanations thereof are omitted.

In FIG. 8, a pumping LD 16 is a wide stripe semiconductor laser that has an internal wavelength locking mechanism that emits pumping light at a wavelength of 880 nm. Pumping light emitted by the pumping LD 16 enters a laser crystal 46 after passing through a focusing optics 26. The focusing optics 26 is composed of a simple lens.

In the wavelength conversion laser 600, the end surfaces of two types of laser crystals 46 and 56 are laminated. The laser crystal 46 and the laser crystal 56 are bonded directly and are in an optically bonded state. The laser crystal 46 is composed of Nd 0.5%:GdVO$_4$ measuring 3×1×1 mm, and the thickness in the lengthwise direction of the cavity is 1 mm. The laser crystal 56 is composed of Nd 2%:YVO$_4$ measuring 3×1×1 mm, and the thickness in the lengthwise direction of the cavity is 1 mm.

The pumping LD 16 and the focusing optics 26 are omitted from the front view of FIG. 9, and this drawing shows the laser crystal 46 and the like as viewed from the side of a surface P1 on the side of the pumping LD of the laser crystal 46, and the width of the laser crystal 46 in the horizontal direction of the drawing is 3 mm. The absorption coefficients of pumping light of the laser crystal 46 and the laser crystal 56 are adjusted by the amount of doping of active ion (Nd), and the absorption coefficient of the laser crystal 46 on the side of the pumping LD is lower than the absorption coefficient of the laser crystal 56.

In the wavelength conversion laser 600, a wavelength converting element 66 is also bonded directly to the laser crystal 56 and is in an optically bonded state. The wavelength converting element 66 is composed of MgO:LiNbO$_3$ in which is formed a polarization inversion periodic structure, the thickness in the lengthwise direction of the cavity is 0.5 mm, and the external dimensions are 3×1×0.5 mm.

The two bonded laser crystals 46 and 56 and the wavelength converting element 66 compose a cavity of a solid-state laser, and a surface P1 of the laser crystal 46 and a surface P2 of the wavelength converting element 66 serve as cavity mirrors. The surface P1 has an AR coating for pumping light and an HR coating for the resonating solid-state laser light and generated converted wavelength light. The surface P2 has an HR coating for solid-state laser light and an AR coating for converted wavelength light, and serves as an output mirror.

Wavelengths having a central wavelength of 1063.0 nm are oscillated from the laser crystal 46, wavelengths having a central wavelength of 1064.4 nm are oscillated from the laser crystal 56, and the solid-state laser light resonates between the surface P1 and the surface P2. Converted wavelength light having for central wavelengths thereof each of the second harmonic waves of the solid-state laser light at 531.5 nm and 532.2 nm, and converted wavelength light having for the central wavelength thereof the sum-frequency wave of the wavelengths of two solid-laser light beams at 531.9 nm, are generated in the wavelength converting element 66 and output.

A composite crystal composed of the two bonded laser crystals 46 and 56 and the wavelength converting element 66 is interposed between an upper heat sink H1 and a lower heat sink H2 by means of Ag paste, and the upper heat sink H1 and the lower heat sink H2 are composed of a material consisting mainly of Cu. In addition, a portion of the lower heat sink H2 protrudes at two locations from the composite crystal on the side of the surface P1, this portion is an incident surface side heat sink H3, and is adhered to the composite crystal by means of Ag paste. The incident surface side heat sink H3 is arranged at two locations to the sides of a pumping light spot so as not to block the pumping light. The incident surface side heat sink H3 is a cooling member and functions to position the composite crystal and lower the temperature of the laser crystal 46 on the side of the incident surface. Furthermore, the configuration of the heat sinks is not particularly limited to the above-mentioned example, but rather the heat sinks may be arranged on other lateral surfaces or can be altered in various ways corresponding to the shape of the composite crystal and the like.

In the composite crystal, heat is generated as a result of absorbing the pumping light, and the temperature in the central portion of the composite crystal becomes higher than the lateral surfaces thereof, thereby demonstrating a thermal lens effect. As a result of this thermal lens effect, the solid-state laser light beams converge at the surfaces P1 and P2, and the solid-state laser light resonates between the surfaces P1 and P2.

In the wavelength conversion laser 600, two or more types of laser crystals are preferably pumped by a single pumping LD by laminating the laser crystals so that the laser crystal having the smallest pumping light absorption coefficient is located on the side of the pumping LD.

As described above, as a result of laminating the laser crystals 46 and 56, a coating conventionally required between the laser crystals is no longer required, thereby making it possible to reduce loss within the cavity. In addition, by making the pumping light absorption coefficient of the laser crystal 46 on the side of the pumping LD smaller, the laser crystal 56, which is located farther away as viewed from the pumping LD 16, is made to oscillate by absorbing pumping light while inhibiting generation of heat by the laser crystal 46 on the side of the pumping LD. As a result, oscillation at different wavelengths can be obtained from a plurality of solid-state laser light beams.

In the present embodiment, although the number of adjustment components may increase since a plurality of laser crystals 46 and 56 are required, since the laser crystals 46 and 56 are laminated enabling the use of a single pumping LD 16, together with being able to reduced the number of adjustment components, the configuration can be made more compact. In the wavelength conversion laser 600 in particular, lamination of the wavelength converting element 66 as well makes it possible to further reduce the number of adjustment components, thereby realizing an extremely compact configuration.

In addition, the wavelength conversion laser 600 preferably makes the temperature of the laser crystal 46 on the pumping light incident side lower than the temperature of the other laser crystal 56 by bonding the lateral surfaces (upper and lower surfaces in the drawing) of the laser crystals 46 and 56 and the region of the pumping light incident surface P1 of the laminated laser crystals 46 and 56 at which pumping light does not enter with heat sinks in the form of the upper heat sink H1, the lower heat sink H2 and the incident surface side heat sink H3.

Here, although heat may concentrate in a small area due to the compact configuration of a wavelength conversion laser using laminated laser crystals, in the present embodiment, by providing heat sinks on the lateral surfaces and incident surface of the composite crystal, localized concentration of heat is diminished thereby enabling stable operation. In particular, although the amount of heat increases easily in the laser crystal 46 on the pumping light incident side as a result of being subjected to entrance of high-powered pumping light prior to being attenuated in the other crystal, by lowering the absorption coefficient of the laser crystal by providing an incident surface side heat sink H3 on the incident surface side, the temperature of the laser crystal 46 on the side of the pumping LD can be made to be lower than that of the other laser crystal 56.

As a result, a temperature difference at the pumping light incident surface, at which there is the largest temperature difference in the light path of the solid-state laser light, can be reduced thereby making it possible to diminish strain caused by heat, thereby enabling high-power operation. In particular, lowering of laser crystal temperature on the side of the pumping LD by arranging the laser crystal 46 having a short oscillation wavelength on the side of the pumping LD as in the present embodiment increases separation between oscillation wavelengths of the laser crystals by means of a temperature shift, thereby having the effect of broadening the spectral width of output converted wavelength light.

Embodiment 7

Figure 10:
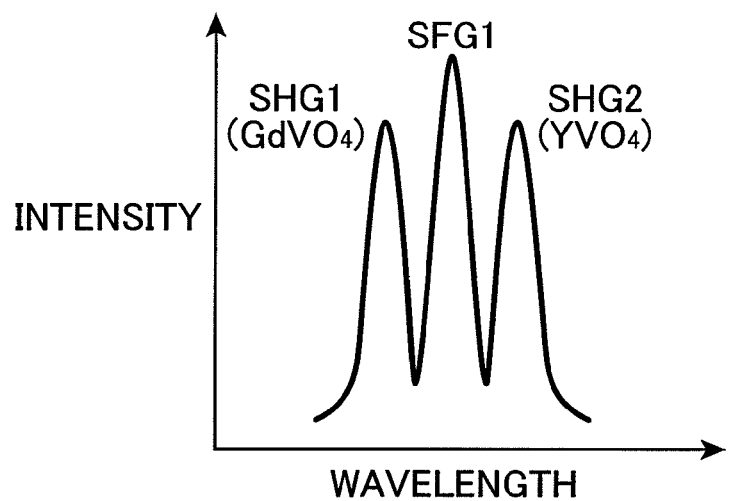
FIG. 10 is a schematic diagram of the spectral distribution of converted wavelength light output in the case of having continuously oscillated a wavelength conversion laser.

The present embodiment modulates the pumping LD 1 with a prescribed drive circuit using the wavelength conversion laser 100 of the Embodiment 1 shown in FIG. 1. FIG. 10 is a schematic diagram of the spectral distribution of converted wavelength light output in the case of continuous oscillation of the wavelength conversion laser 100, while FIG. 11 is a schematic diagram of the spectral distribution of converted wavelength light output in the case of having modulated the pumping LD 1 of the wavelength conversion laser 100.

As shown in FIG. 10, the three wavelength peaks of a second harmonic wave SHG1 of the solid-state laser light IR1 oscillated with the laser crystal 4 (Nd:GdVO$_4$), a second harmonic wave SHG2 of the solid-state laser light IR2 oscillated with the laser crystal 5 (Nd:YVO$_4$), and a sum-frequency wave SFG1 of the second harmonic wave SHG1 and the second harmonic wave SHG2 are clearly distinguished during continuous oscillation. In this manner, the wavelength conversion laser 100 is able to reduce interference noise by simultaneous output of multiple wavelengths.

Moreover, the output spectral distribution is preferably smoothened in order to reduce coherency of the wavelength conversion laser. The output during modulation of the pumping laser LD shown in FIG. 11 realizes a smoother spectral distribution. The pumping LD 1 modulates a square wave at a repetition frequency of 120 Hz and duty of 0.3. By modulating the drive current of the pumping LD 1 at a repetition cycle of the millisecond to microsecond order, the temperatures of the laser crystals 4 and 5 repeatedly rise during emission of pumping light by the pumping LD 1 and fall when the pumping LD 1 is stopped, resulting in changes in temperature over time. At this time, the wavelength of the oscillated solid-state laser light changes according to temperature status, and the spectral width broadens when integrated over time.

Figure 11:
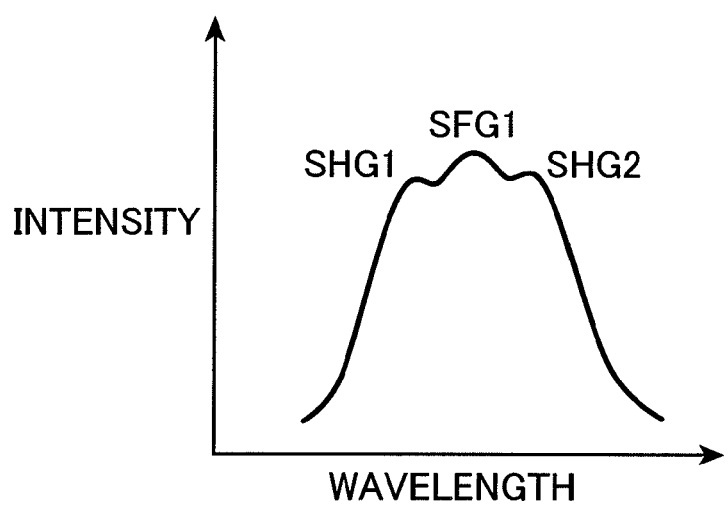
FIG. 11 is a schematic diagram of the spectral distribution of converted wavelength light output in the case of having modulated a pumping laser diode (LD) of a wavelength conversion laser.

In the wavelength conversion laser 100 of the present embodiment, by broadening the spectral widths oscillated from each laser crystal 4 and 5, the spectral width of the resulting converted wavelength light can be broadened as shown in FIG. 11. In particular, since second harmonic waves and sum-frequency wave are generated simultaneously in the present embodiment, spectral overlapping between the second harmonic waves SG1 and SG2 and the sum-frequency wave SFG1 increases when integrated over time, thereby making it possible to realize smoothing of the spectral distribution. Thus, coherency can be further decreased and interference noise such as speckle noise can be further reduced by smoothing spectral distribution in this manner.

Embodiment 8

Figure 12:
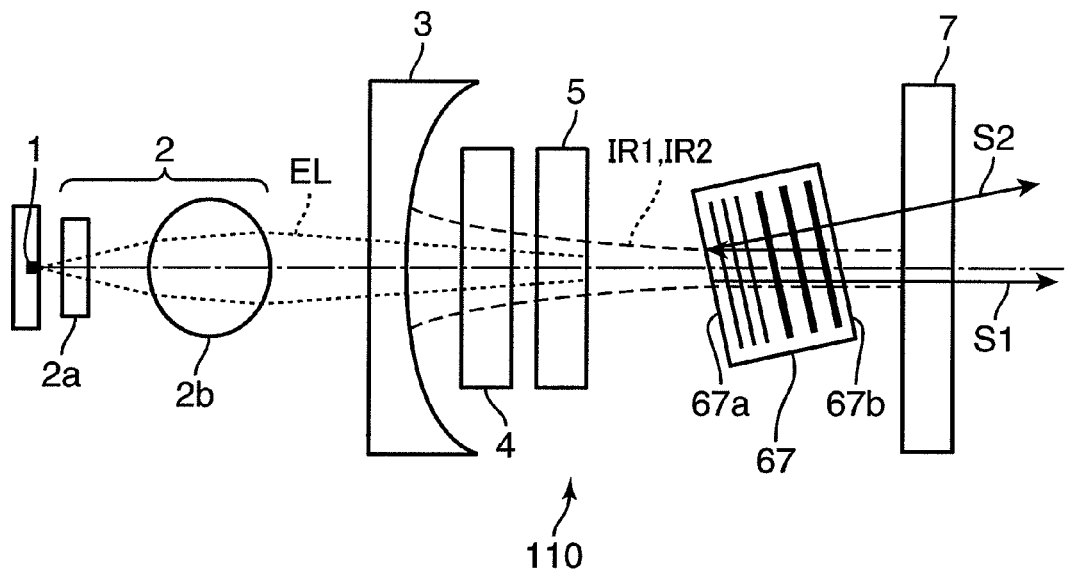
FIG. 12 is a schematic block diagram of a wavelength conversion laser in an Embodiment 8 of the present invention.
Figure 13:
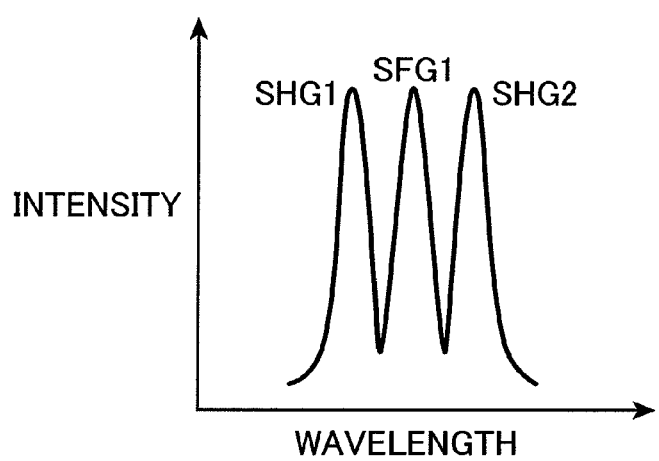
FIG. 13 is a schematic diagram of the spectral distribution of converted wavelength light in the case having been output from the wavelength conversion laser shown in FIG. 12.

FIG. 12 is a schematic block diagram of a wavelength conversion laser 110 in an Embodiment 8 of the present invention, while FIG. 13 is a schematic diagram of the spectral distribution of converted wavelength light output from the wavelength conversion laser 110 shown in FIG. 12. Furthermore, in FIG. 12, the same reference symbols are used to indicate those components that are the same as those of previously described embodiments, and detailed explanations thereof are omitted.

The wavelength conversion laser 110 shown in FIG. 12 modifies the wavelength converting element 6 of the wavelength conversion laser 100 shown in FIG. 1 to a wavelength converting element 67 having a multi periodic structure. The wavelength converting element 67 is composed of MgO: LiNbO$_3$ having two polarization inversion periodic structures. The lengths formed by the two periods are 3 mm each in the direction of the optical axis of resonating laser light, and the crystal length of the wavelength converting element 67 is 6 mm. The two periods are 6.97 µm and 7.00 µm, and each conversion efficiency of the second harmonic wave SHG1 of the laser crystal 4 (Nd:GdVO$_4$) and conversion efficiency of the second harmonic wave SHG2 of the laser crystal 5 (Nd:YVO$_4$) are designed to be high. The wavelength converting element 67 has an AR coating for solid-state laser light and an HR coating for converted wavelength light on an end surface 67a on the side of the laser crystal 5, has an AR coating for solid-state laser light and an AR coating for converted wavelength light on an end surface 67b on the side of the flat mirror 7, and is arranged on an angle with respect to the optical axis of the solid-state laser light in the same manner as the wavelength converting element 6.

The wavelength converting element 67 increases wavelength conversion efficiency to the second harmonic wave SHG1 and the second harmonic wave SHG2 and relatively decreases wavelength conversion efficiency of generation of sum-frequency wave by having periods of the oscillation wavelengths of each laser crystal 4 and 5 that corresponds to generation of second harmonic waves. Wavelength conversion efficiency is dependent on the intensity of laser light oscillated in each laser crystal and the phase matching conditions determined by the period. In the case of the present embodiment that uses a plurality of laser crystals 4 and 5, there is increased susceptibility to shifting from phase matching conditions and wavelength conversion efficiency to second harmonic waves corresponding to each wavelength decreases easily as compared with the case of using only one laser crystal due to the broad wavelength distribution of the solid-state laser light. Consequently, in the present embodiment, as a result of the wavelength converting element 67 having multiple periods and having periods corresponding to the generation of second harmonic waves of each laser crystal 4 and 5, decreases in wavelength conversion efficiency to second harmonic waves is prevented.

In addition, in the case the polarization inversion periodic structure has a single period, since a sum-frequency wave is generated by conversion from multiple solid-state laser light beams, the intensity of the sum-frequency wave tends to be greater than that of the second harmonic waves. Consequently, in the present embodiment, a shift from phase matching conditions can be made to occur in the case of generating a sum-frequency wave by making the periods correspond to the second harmonic wave of each solid-state laser light.

As a result, as shown in FIG. 13, wavelength conversion efficiency to the second harmonic wave SHG1 and the second harmonic wave SHG2 is increased, and wavelength conversion efficiency to the sum-frequency wave SFG1 is decreases, thereby making it possible to relatively lower the intensity of the sum-frequency wave SFG1 and smooth the spectral distribution of the converted wavelength light. This smoothing of the spectral distribution promotes a decrease in coherency, thereby making it possible to further reduced speckle noise and other interference noise. In addition, the use of a wavelength converting element that has a polarization inversion periodic structure having multiple periods makes it possible to freely set the temperature of the wavelength converting element that allows wavelength conversion.

Furthermore, although a wavelength converting element having two periods is used in the present embodiment, a wavelength converting element can also be used that has three or more periods. In addition, the periods are not required to be constant provided the wavelength converting element has periods corresponding to a plurality of laser crystals, and minute fluctuations may be contained in the periods.

Embodiment 9

Figure 14:
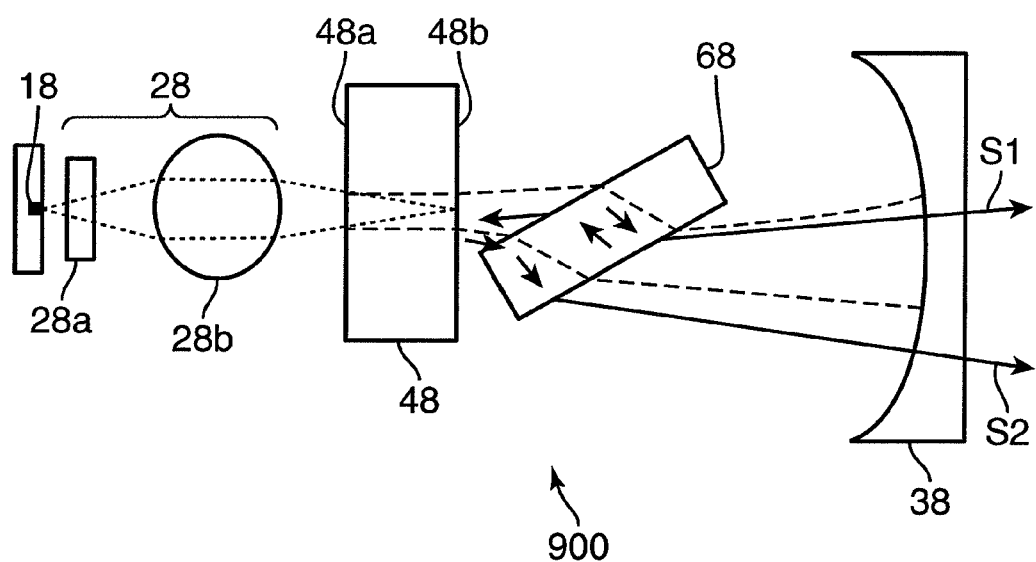
FIG. 14 is a schematic block diagram of a wavelength conversion laser in an Embodiment 9 of the present invention.

FIG. 14 is a schematic block diagram of a wavelength conversion laser 900 in an Embodiment 9 of the present invention. Furthermore, in FIG. 14, the same reference symbols are used to indicate those components that are the same as those of previously described embodiments, and detailed explanations thereof are omitted.

The wavelength conversion laser 900 has a Yb-doped laser crystal 48 capable of broadband laser oscillation and a multi-period wavelength converting element 68 within a cavity in order to obtain a wavelength conversion laser having low coherency. The laser crystal 48 is not a single crystal, but rather may be ceramics and the like. For example, the laser crystal 48 is material composed of Yb10 at %:YAG ceramics that has an extremely high Yb concentration. In this case, oscillation gain extends over an extremely wide range of 1020 to 1080 nm. The laser crystal 48 is a microchip having a thickness of 1 mm in the direction of the optical axis of the solid-state laser light, and has external dimensions of 3×3×1 mm.

The wavelength converting element 68 is composed of MgO:LiNbO$_3$ crystal having four polarization inversion periodic structures. In the wavelength converting element 68, periods corresponding to second harmonic waves of 1020 nm, 1040 nm, 1060 nm and 1080 nm in the form of four periods of 6.1 μm, 6.5 μm, 6.9 μm and 7.3 μm are respectively formed at a length of 0.2 mm, and the wavelength converting element 68 is an element having a thickness of 0.8 mm in the direction of the optical axis of the solid-state laser light. The wavelength converting element 68 is arranged so as to form Brewster's angle with respect to the solid-state laser light, has P polarization for the polarization of the resonating laser light, and carries out P-polarized wavelength conversion.

An exiting LD 18 emits pumping light at 940 nm, and the pumping light is made to enter the laser crystal 48 by the focusing optics 28 so as to overlap the resonating solid-state laser light. A concave mirror 38 has an HR coating for solid-state laser light at 1020 to 1080 nm and an AR coating for that at 510 to 540 nm, and outputs converted wavelength light. An end surface 48a of the laser crystal 48 on the side of a pumping LD has an AR coating for 940 nm and an HR coating for solid-state laser light, and the end surface 48a and the concave mirror 38 serve as cavity mirrors. An end surface 48b of the laser crystal 48 on the side of the wavelength converting element 68 has an AR coating for solid-state laser light and an HR coating for converted wavelength light, and reflects converted wavelength light S2. The reflected converted wavelength light S2 is output from the concave mirror 38 along a light path shifted from the solid-state laser light path.

As a result of having the multi-period wavelength converting element 68 having multiple periods within the cavity, the Yb-doped laser crystal 48 oscillates multiple wavelengths within a broad gain. The wavelength converting element 68 generates second harmonic waves and sum-frequency wave of a multiple resonating solid-state laser light beams, and this converted wavelength light is output from the concave mirror 38. The emitted converted wavelength light extends over an extremely broad band of 510 to 540 nm, has low coherency, and has been removed of interference noise.

The wavelength conversion laser 900 preferably simultaneously generates second harmonic waves and sum-frequency wave of multiple wavelengths by having the laser crystal 48, having broad oscillation gain, and the wavelength converting element 68, having multiple periods, within a cavity, and resonating solid-state laser light of multiple wavelengths. In addition, by employing the wavelength converting element 68 having multiple periods, cavity loss is imparted to wavelengths of the solid-state laser light corresponding to each period, resulting in multiple resonating wavelengths. Then, by generating second harmonic waves and sum-frequency wave of resonating multiple wavelengths with the wavelength converting element 68, a low coherency wavelength conversion laser is achieved.

In addition, although it was conventionally necessary to employ a mechanism that locks wavelengths for wavelength conversion of laser crystals having a broad oscillation gain, in the present embodiment, the use of the wavelength converting element 68 having multiple periods within the cavity enables wavelength conversion without having to lock the wavelengths. In addition, simultaneous generation of second harmonic waves and sum-frequency wave makes it possible to achieve highly efficient wavelength conversion.

Embodiment 10

Figure 15:
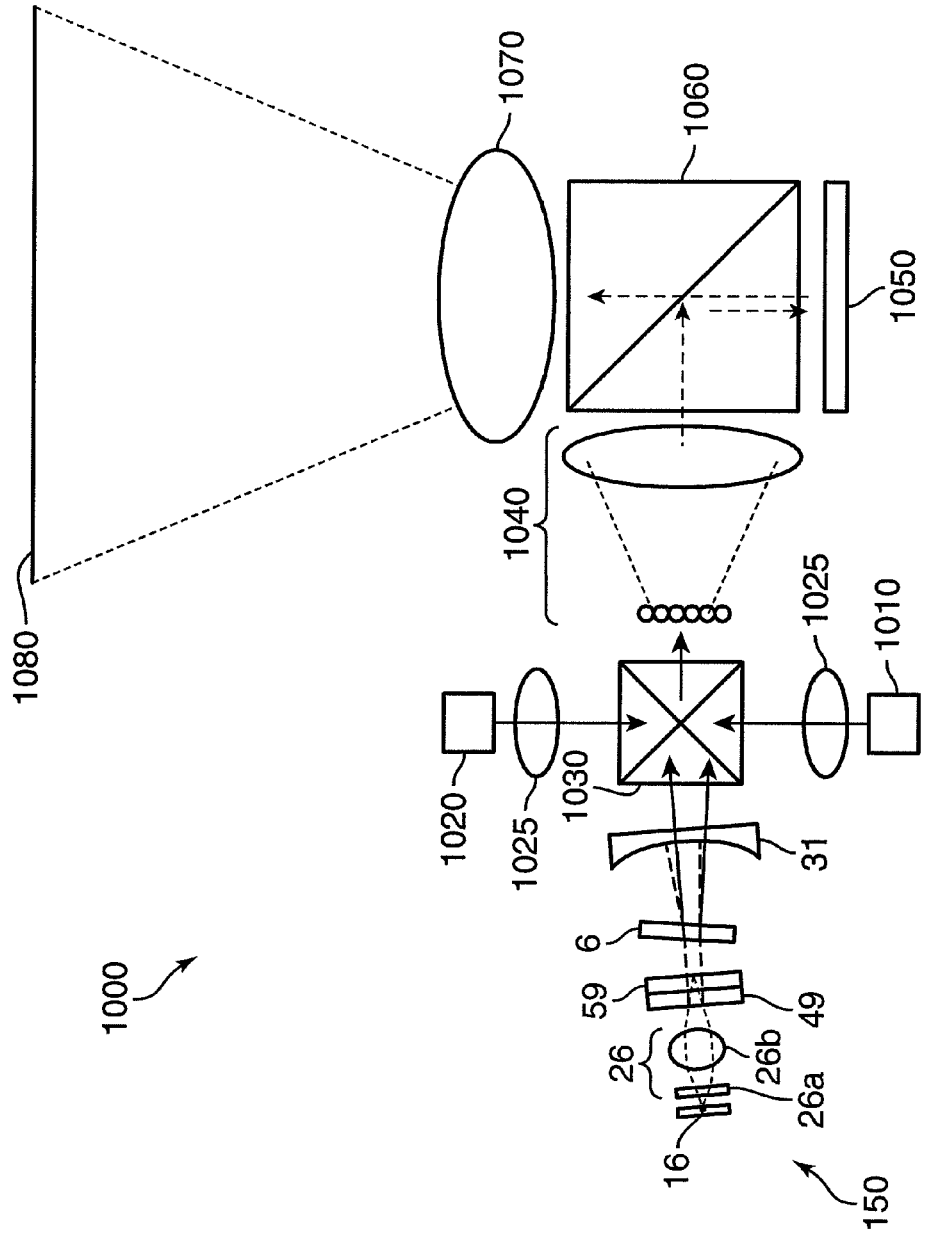
FIG. 15 is a schematic diagram of an image display apparatus that uses a green wavelength conversion laser in an Embodiment 10 of the present invention.

FIG. 15 is a schematic diagram of an image display apparatus 1000 that uses a green wavelength conversion laser 150 in an Embodiment 10 of the present invention. Furthermore, in FIG. 15, the same reference symbols are used to indicate those components that are the same as those of previously described embodiments, and detailed explanations thereof are omitted.

The image display apparatus 1000 is a laser projector that has a green wavelength conversion laser 150 that emits green laser light, a red LD 1010 that emits red laser light, and a blue LD 1020 that emits blue laser light.

The green wavelength conversion laser 150 is provided with the pumping LD 16 that emits light at a wavelength of 880 nm, the focusing optics 26, a laser crystal (Nd 0.5%: $GdVO_4$) 49, a laser crystal (Nd 3%:$YVO_4$) 59, the wavelength converting element 6, and the concave mirror 31. The laser crystal 49 and the laser crystal 59 are optically bonded by direct bonding. The laser crystal 49 and the concave mirror 31 serve as a cavity mirror of the solid-state laser.

Light emitted from the pumping LD 16 is made to enter the laser crystal 49 and the laser crystal 59 by the focusing optics 26 where it is absorbed. The laser crystal 49 and the laser crystal 59 oscillate at different wavelengths. The wavelength converting element 6 generates second harmonic waves and sum-frequency wave that resonate at multiple wavelengths, and converted wavelength light is output from the concave mirror 31.

At this time, the wavelength converting element 6 has an HR coating for converted wavelength light on the side of the laser crystal 59, and is inserted into the cavity on an angle with respect to the solid-state laser light. The converted wavelength light is output from two optical paths, and one of the output locations is shifted from the solid-state laser light. The laser crystal 49 and the laser crystal 59 each have a thickness of 1 mm, and lamination of the results in a thickness of 2 mm. The laser crystal 49 has an HR coating for the solid-state laser light and an AR coating for pumping light on the side of the pumping LD 16, while the laser crystal 59 has an AR coating for the solid-state laser light on the side of the concave mirror 31.

Light emitted from the red LD 1010 and the blue LD 1020 is collimated by a collimator 1025, and two beams emitted from the green wavelength conversion laser 150 are combined with a combining prism 1030. The combined light is shaped into a rectangular beam having a uniform intensity by illumination optics 1040.

The illumination optics 1040 is composed of a cross renticular lens and a divergence angle compensating lens. The shaped beam illuminates a spatial light modulating element 1050 after passing through a polarizing beam splitter in the form of a PBS 1060. The spatial light modulating element 1050 is composed of reflective liquid crystal on silicon (LCOS), and represents gradation by rotating polarized light. Modulated light that has been reflected by the spatial light modulating element 1050 and passed through the PBS 1060 is enlarged and projected onto a display screen 1080 by a projection lens 1070.

In addition, multi-mode LD are used for the red LD 1010 and the blue LD 1020 to broaden spectral distribution. The green wavelength conversion laser 150 broadens spectral distribution by outputting second harmonic waves and sum-frequency wave from the solid-state laser of multiple wavelengths.

The image display apparatus 1000 preferably has the green wavelength conversion laser 150 having low coherency that stably outputs second harmonic waves and sum-frequency wave from a solid-state laser having multiple different wavelengths, and the spatial light modulating element 1050 that modulates converted wavelength light. In this case, by using low coherency converted wavelength light for which the spectral distribution thereof has been broadened, image noise in the form of speckle noise is reduced thereby enabling display of high-quality images.

The wavelength conversion laser like that of the present embodiment is preferably used in a green laser having particularly high visual sensitivity. Since green color has high visual sensitivity, speckle noise is easily perceived by a viewer. The use of a green color for the wavelength conversion laser 150 makes it difficult for a viewer to perceive speckle noise.

The spatial light modulating element 1050 modulates red, green and blue laser light by time division. Red, green and blue laser light is sequentially emitted from each color of laser light source 1010, 1020 and 150, and the green wavelength conversion laser 150 also repeatedly emits converted wavelength light and interrupts the emission of converted wavelength light. At this time, as a result of the pumping LD 16 repeatedly emitting pumping light and interrupting the emission of pumping light, temperature changes occur during output in the laser crystals 49 and 59 and the wavelength converting element 6. These temperature changes cause changes in the oscillation wavelength of the wavelength conversion laser 150 during output. Due to these changes in the oscillation wavelength, the spectral distribution of the wavelength conversion laser 150 becomes even broader and coherency is further lowered when converted wavelength light is integrated over time.

As has been described above, the image display apparatus 1000 preferably broadens the spectral distribution of the wavelength conversion laser 150 by having laser light sources that oscillate at wavelengths of the red, blue and green light, sequentially emitting laser light for each color from the laser light sources by at least using the wavelength conversion laser 150 for the green light source, and having the wavelength conversion laser 150 repeatedly emit the beams and interrupt the emission of the beams, thereby causing the wavelength conversion laser 150 to be heated by pumping light during emission and cooled when emission is interrupted.

In this manner, by using sequential emission of laser light from laser light sources, easily perceived green speckle noise can be removed. At this time, semiconductor light sources are preferably used for the red and blue light. Temperature changes also occur in the laser chips during emission in the red and blue light sources as well, thereby making it possible to broaden spectral distribution when integrated over time. Thus, speckle noise can be removed from all red, green and blue laser light that are used to display color images. In addition, by using laser light sources for all the light sources, the image display apparatus 1000 can be made to be more compact, have reduced thickness and save on electrical power.

Furthermore, a spatial light modulating element such as a transmissive liquid crystal or digital micromirror device (DMD) can be used for the spatial light modulating element of converted wavelength light of the image display apparatus 1000. In addition, the transmissive liquid crystal may be of a form that uses a liquid crystal surface for the display surface without using a projection lens. In addition, the modulating element may be of a form that combines intensity modulation of converted wavelength light and scanning optics in addition to a spatial light modulating element. In addition, although a renticular lens is used for the illumination optics 1040 in the present embodiment, the illumination optics is not limited to this example in particular, but rather a rod integrator or fly eye lens can also be used. In addition, the wavelength conversion laser able to be applied to the image display apparatus is particularly limited to that of the present embodiment, but rather a wavelength conversion laser of other embodiments may also be used.

Embodiment 11

Figure 16:
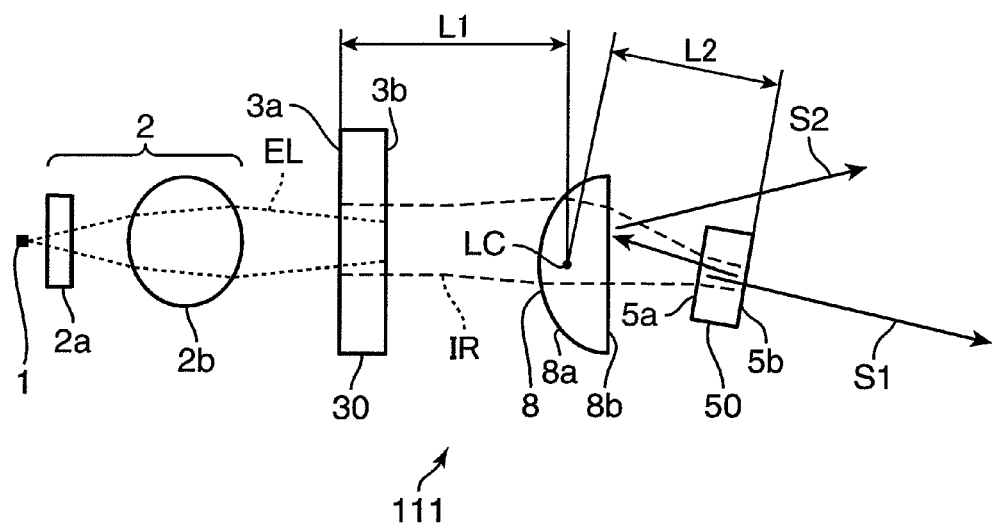
FIG. 16 is a schematic block diagram of a wavelength conversion laser in an Embodiment 11 of the present invention.

FIG. 16 is a schematic block diagram of a wavelength conversion laser 111 in an Embodiment 11 of the present invention. Furthermore, in FIG. 16, the same reference symbols are used to indicate those components that are the same as those of previously described embodiments, and detailed explanations thereof are omitted.

A semiconductor laser in the form of the pumping LD 1 oscillates the pumping light EL that pumps a laser crystal 30. The pumping LD 1 is a wavelength-locked, wide stripe semiconductor laser that oscillates the 808 nm band. Furthermore, the semiconductor laser that pumps the solid-state laser is able to oscillate at a wavelength that allows pumping of the laser crystal.

The pumping light EL emitted by the pumping LD 1 is focused by the focusing optics 2 so as to overlap with solid-state laser light that resonates within the laser crystal 30. The focusing optics 2 is composed of two lenses of a lens 2a, which controls beam diameter of the pumping light EL in the direction of thickness of the active layer of the pumping LD 1, and a lens 2b, which controls beam diameter of the pumping light EL in the direction of width of the active layer. The focusing optics 2 is required to control beam diameter of the pumping light so that there is overlapping between the pumping light EL and the solid-state laser light IR within the laser crystal 30.

The pumping light EL enters the laser crystal 30 and is absorbed. This type of semiconductor-pumped solid-state laser has a high laser coupling efficiency between the pumping light and the solid-state laser light, thereby enabling highly efficient oscillation. The solid-state laser of the present invention refers to, for example, a laser that oscillates a fundamental wave that is converted to converted wavelength light. The cavity of the solid-state laser is composed by using as reflecting surfaces an end surface 3a of the laser crystal 30 on the side of the pumping LD, and an end surface 5b of a wavelength converting element 50 on the laser emission side, and carries out multi-longitudinal mode oscillation.

The wavelength conversion laser 111 has the lens 8 between the laser crystal 30 and the wavelength converting element 50. The lens 8 shapes the solid-state laser light IR beam so that the beam diameter is smaller than the laser crystal 30 within the wavelength converting element 50 to carry out resonance. The wavelength converting element 50 converts the wavelength of the resonating, multi-longitudinal mode solid-state laser light IR to generate second harmonic waves and sum-frequency wave. The wavelength conversion laser of the present invention refers to the entire apparatus for generating converted wavelength light, including, for example, the pumping LD, solid-state laser and wavelength converting element within the cavity of the solid-state laser.

The laser crystal 30 is composed of an Nd:YVO$_4$ (Nd concentration: 2.0 at %, thickness: 1.0 mm), parallel plate microchip. The laser crystal 30 has an AR coating for pumping light (wavelength: 808 nm) and an HR coating for solid-state laser light (wavelength: 1064 nm) on the end surface 3a, and an AR coating for solid-state laser light on the other end surface 3b. Furthermore, although the laser crystal 30 uses Nd:YVO$_4$, there are no particular limitations on the material used provided it is a solid-state material that allows laser oscillation. The laser crystal is preferably a crystal in which an active ion has been added to a vanadate crystal serving as a microchip solid-state laser.

The lens 8 is a plano-convex spherical lens, and is arranged such that a convex surface 48a is on the laser crystal side and a flat surface 48b is on the side of the wavelength converting element. The lens 8 has an AR coating for solid-state laser light and an HR coating for converted wavelength light (wavelength: 532 nm). The lens 8 is arranged such that the refractive center thereof is off center from the optical axis of the solid-state laser light IR, and the optical axis of the solid-state laser IR is inclined with respect to the lens 8.

The wavelength converting element 50 is composed of an MgO:LiNbO$_3$ (PPLN) microchip having a polarization inversion periodic structure (thickness: 0.5 mm). The wavelength converting element 50 is required to be a non-linear material having a polarization inversion periodic structure, and the polarization inversion period is set so that converted wavelength light is generated. The polarization inversion period is not required to be constant, but rather may have a non-periodic portion according to the application. An LiNbO$_3$-based or LiTaO$_3$-based material having a high nonlinear constant is used preferably. The wavelength converting element 50 through which the solid-state laser light passes is composed of a microchip having an effective volume of 1 mm$^3$. The thickness of the wavelength converting element 50 in the direction through which the solid-state laser light passes is preferably 1 mm or less. As a result of making the thickness 1 mm or less, a wavelength conversion laser can be obtained that does not require temperature control.

The wavelength converting element 50 has an AR coating for solid-state laser light and converted wavelength light on the end surface 5a on the side of the pumping LD, and an HR coating for solid-state laser light and an AR coating for converted wavelength light on the other end surface 5b. The wavelength converting element 50 is in the form of a parallel plate, is arranged on an angle according to the incline of the optical axis of the solid-state laser light. The angle of inclination between the flat surface 8b of the lens 8 and the optical axis of the solid-state laser light IR is larger than the divergence angle of the solid-state laser light IR. The divergence angle of the solid-state laser light of the present embodiment refers to the angle of the half width at half maximum of the divergence of the solid-state laser light between the lens 8 and the wavelength converting element 50.

The converted wavelength light S1, which is obtained by converting the wavelength of solid-state laser light that passes through the wavelength converting element 50 in the direction to the right in the drawing, is output outside the cavity from the end surface 5b of the wavelength converting element 50. The converted wavelength light S2, which is obtained by converting the wavelength of solid-state laser light that passes through the wavelength converting element 50 to the left in the drawing, is output outside the cavity after being reflected by the flat surface 8b of the lens 8. The converted wavelength light S2 is led to the outside without entering the laser crystal 30 as a result of being reflected by the lens 8.

In this manner, in the present embodiment, the flat surface 8b serving as a reflective surface of the lens 8 is inclined with respect to the solid-state laser light. Consequently, the converted wavelength light S2 is reflected in a direction that differs from that of the solid-state laser light, and is output outside the cavity without re-entering the wavelength converting element 50 by passing along the same optical path as the solid-state laser light. As a result, in the present embodiment, the converted wavelength light S2 is output outside the cavity without re-entering the wavelength converting element 50.

A distance L1 between a principal point LC when light has entered from the side of the convex surface 8a of the lens 8 and the laser crystal 30 is 6 mm, including the thickness of the laser crystal 30 (when converted based on the length in air). A distance L2 between the principal point LC of the lens 8 and the wavelength converting element 50 is 3.3 mm, including the thickness of the wavelength converting element (when converted based on the length in air). The focal distance f of the lens 8 is 3 mm.

According to the configuration described above, the beam diameter of the solid-state laser in the laser crystal 30 is about 110 μm, the beam diameter of solid-state laser light in the wavelength converting element 50 is about 40 μm, and the beam diameter in the wavelength converting element 50 is ½ or less the beam diameter in the laser crystal 30 in the present embodiment. If the internal power within the cavity is assumed to be equal, conversion efficiency can be increased by four-fold or more by making the beam diameter ½ or less.

In addition, in the present embodiment, the cavity also has an extremely compact configuration, having a length of about 9 mm, the distance from the pumping LD 1 to the laser crystal 30 is about 6 mm, and the total length of the wavelength conversion laser 111 is about 15 mm, thereby resulting in a module having a volume of about 2 cc together with the optical material of the holder and the heat sinks. In this manner, an extremely compact wavelength conversion laser 111 is realized.

In addition, in the present embodiment, the laser crystal 30 and the wavelength converting element 50 are composed of microchips. Reducing the size of the laser crystal 30 and the wavelength converting element 50 makes it possible to make the wavelength conversion laser 111 extremely small on the order of several cc. In addition, by using the wavelength converting element 50 in the form of a microchip, the temperature tolerance of phase matching for carrying out wavelength conversion is increased, thereby enabling the wavelength converting element 50 to be used in the absence of temperature control. For example, in the present embodiment in which the thickness of the wavelength converting element is 0.5 mm, the wavelength converting element 50 has a temperature tolerance of 50 degrees or more, thereby enabling it to be used without requiring temperature control. The thickness of the wavelength converting element 50 is preferably 1 mm or less in order to eliminate the need for temperature control in this manner.

In addition, the present embodiment is characterized by being a wavelength conversion laser 111 that has the wavelength converting element 50 within the cavity of a semiconductor laser-pumped solid-state laser, wherein the solid-state laser carries out multi-longitudinal mode oscillation, the wavelength converting element 50 is composed of a microchip having a polarization inversion periodic structure, carries out wavelength conversion that generates second harmonic waves and sum-frequency wave of multi-longitudinal mode oscillation, makes the beam diameter of solid-state laser light between the laser crystal 30 of the solid-state laser and the wavelength converting element 50 smaller than that of the laser crystal 30 within the wavelength converting element 50, and has a lens 8 that reflects converted wavelength light, and the end surfaces of the laser crystal 30 and the wavelength converting element 50 also serve as reflective surfaces of the cavity of the solid-state laser.

As a result of employing the above-mentioned configuration, a highly efficient wavelength conversion laser 111 can be obtained that enhances wavelength conversion efficiency while also reducing loss. In addition, in the present embodiment, since the solid-state laser carries out multi-longitudinal mode oscillation, size can be reduced and loss can be decreased without requiring the use of an etalon or other wavelength selection element, and there is no instability at high output that occurs during single-mode oscillation. Moreover, the use of multi-longitudinal mode oscillation results in multi-longitudinal mode oscillation of second harmonic waves and sum-frequency wave for converted wavelength light as well, thereby allowing the obtaining of a laser in which interference noise is reduced that can be applied in the fields of imaging and illumination.

In addition, due to the use of multi-longitudinal mode wavelength oscillation and a broad temperature tolerance, the wavelength converting element 50 is made to be in the form of a microchip in order to eliminate the need for temperature control. Although the use of a microchip for the wavelength converting element results in the problem of decreased conversion efficiency, in order to solve this problem, the beam diameter of the wavelength converting element 50 is made smaller by the lens 8 and the optical power density within the wavelength converting element 50 is enhanced to improve conversion efficiency.

Here, since conversion efficiency is proportional to optical power density, the beam is preferably focused to a degree that does not cause damage or generation of heat in the wavelength converting element 50. In the case of focusing the beam within the wavelength converting element 50 with the lens 8 inside the cavity, by using the end surface 5b of the wavelength converting element 50 as a reflective surface of the solid-state laser cavity, both ideal beam focusing and reduced size of the cavity can be realized. In addition, by using the end surface 5b of the wavelength converting element 50 as a reflective surface of the cavity, the location of the beam waist of the solid-state laser light and the end surface 5b of the wavelength converting element 50 are aligned.

The lens 8 within the cavity enhances coupling efficiency between the solid-state laser light and pumping light while preventing excessive increases in temperature of the laser crystal 30 by increasing the solid-state laser beam diameter of the laser crystal 30. Namely, although microchip solid-state lasers have the problem of increases in output and stability being impaired by temperature rises of the laser crystal, in the present embodiment, the optical power density of the pumping light can be decreased and temperature rises of the laser crystal 30 can be prevented due to the high coupling efficiency between the pumping light and the solid-state laser light even if the optical power density of the pumping light is suppressed. In addition, by increasing the optical power density within the wavelength converting element 50 with the lens 8, conversion efficiency is enhanced, output increases relative to pumping power and the amount of heat in the cavity is decreased, thereby assisting in preventing temperature rises of the laser crystal 30.

In addition, in the present embodiment, by using the laser crystal 30 and the wavelength converting element 50 as reflective surfaces of the solid-state laser cavity, the solid-state laser and the cavity can be composed with only three members of the laser crystal 30, the lens 8 and the wavelength converting element 50, thereby eliminating increases cavity internal loss attributable to increases in the number of members while also making it possible to reduce size. In addition, reflection of converted wavelength light by the lens 8 makes it possible to eliminate loss caused by converted wavelength light entering the laser crystal 30 and being absorbed.

In addition, by reflecting converted wavelength light with the lens 8, converted wavelength light can be output while shifted from the solid-state laser light. Although mode competition noise referred to as the green problem occurs during multi-mode wavelength conversion as previously described in the case converted wavelength light and solid-state laser light re-enter the wavelength converting element while mutually coinciding, this problem can be prevented.

In addition, when converted wavelength light in the form of green light and solid-state laser light in the form of red light pass through the wavelength converting element while superimposed, an optical absorption phenomenon referred to as green induced IR absorption (GRIIRA) occurs within the wavelength converting element, and although this GRIIRA causes a decrease in the efficiency of conversion from solid-state laser light to converted wavelength light, this optical absorption phenomenon within the wavelength converting element can also be prevented in the present embodiment.

In addition, in the present embodiment, in order to alleviate reductions in conversion efficiency attributable to the wavelength converting element 50 being in the form of a microchip, a wavelength converting element is used that has a polarization inversion periodic structure that uses quasi-phase matching having high conversion efficiency per unit length. In this case, since beam diameter within the wavelength converting element 50 can be decreased and the efficiency of conversion to converted wavelength light can be enhanced, internal power of the cavity can be decreased. This decrease in internal power makes it possible to eliminate loss caused by optical members within the cavity. As a result, loss attributable to optical members is reduced, thereby making it possible to relax the specifications of optical members and reduce material costs.

In addition, in the present embodiment, at least one surface of the lens 8 in the form of the flat surface 8b is preferably inclined with respect to the solid-state laser light at an angle of inclination that is greater than the divergence angle of the solid-state laser light, and converted wavelength light reflected by the flat surface 8b of the lens 8 is preferably output outside the cavity separate from the optical path of the solid-state laser light within the cavity.

Figure 17:
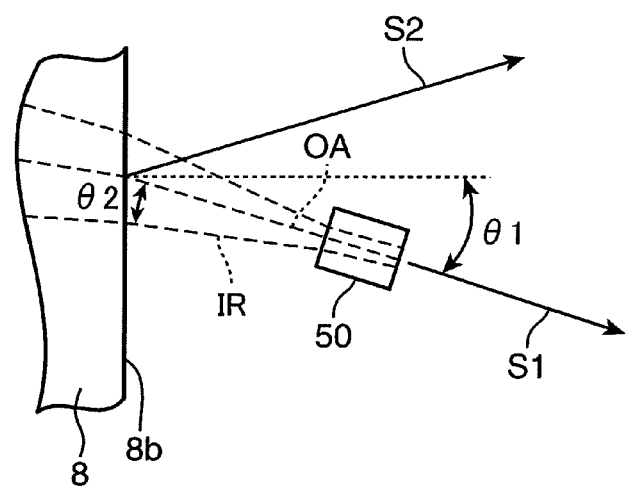
FIG. 17 is an enlarged view for explaining an angle of inclination between solid-state laser light of the wavelength conversion laser shown in FIG. 16 and the flat surface of a lens.

FIG. 17 is an enlarged view for explaining the angle of inclination between the solid-state laser light IR of the wavelength conversion laser 111 shown in FIG. 16 and the flat surface 8b of the lens 8. In FIG. 17, an angle of inclination θ1 represents the angle at which the flat surface 8b of the lens 8 serving as a lens surface is inclined with respect to an optical axis OA of the solid-state laser light IR. The converted wavelength light S1, which is output in a direction that coincides with the optical axis OA of the solid-state laser light IR, and the converted wavelength light S2, which is reflected by the flat surface 8b of the lens 8, are output separated by twice the angle of the angle of inclination θ1. In addition, a divergence angle θ2 represents the angle at which the solid-state laser light IR diverges between the lens 8 and the wavelength converting element 50. The divergence angle θ2 is equivalent to half the angle to reach half the value of the intensity of the solid-state laser light IR.

In the wavelength conversion laser 111, the flat surface 8b of the lens 8 is inclined more than the divergence angle θ2 of the solid-state laser light IR based on the relationship θ1>θ2. Since the reflected converted wavelength light S2 proceeds while inclined at a greater angle than the divergence angle θ2 of the solid-state laser light IR, it is separate from the optical path of the solid-state laser light IR within the cavity.

Here, in the case converted wavelength light enters the wavelength converting element while overlapping the solid-state laser light, reverse conversion occurs, a wavelength is generated that resembles that of the solid-state laser light and mode competition occurs, thereby causing oscillation of the solid-state laser to become unstable or preventing output of the solid-state laser light.

Consequently, in the present embodiment, the converted wavelength light is separated to remove those factors that cause unstable oscillation by using reflection and inclination of the lens 8 within the cavity. In addition, since the converted wavelength light S2 does not re-enter the wavelength converting element 50 while overlapping the solid-state laser light, GRIIRA does not occur, thereby eliminating decreases in conversion efficiency. Moreover, the configuration of the lens 8 within the cavity prevents the converted wavelength light and solid-state laser light from becoming superimposed within the wavelength converting element 50 since the divergence angle of the solid-state laser light between the lens 8 and the wavelength converting element 50 does not become large, even in the case a thermal lens effect occurs in the laser crystal 30.

In addition, in the present embodiment, the lens 8 is preferably composed of a plano-convex lens, and the surface 5b thereof on the side of the wavelength converting element 50 is preferably flat. Although the lens 8 within the cavity has a function that reflects converted wavelength light in the present embodiment, by making this reflective surface to be the surface 4b, the direction of the reflected converted wavelength light S2 can be easily adjusted. The beam divergence angle of solid-state laser light in the present embodiment between the laser crystal 30 and the lens 8 is smaller than the divergence angle between the wavelength converting element 50 and the lens 8, and solid-state laser light between the laser crystal 30 and the lens 8 approximates parallel light. In the present embodiment, by using a plano-convex lens for the lens 8 and having the convex side on the side of the laser crystal and the flat side on the side of the wavelength converting element, aberration within the cavity of the solid-state laser can be reduced.

In addition, in the present embodiment, the distance L1 between the laser crystal 30 and the principal point LC of the lens 8, the distance L2 between the wavelength converting element 50 and the principal point LC of the lens 8, and the focal distance f of the lens 8 preferably satisfy the relationships indicated below.

$$f < L2 < L1 \tag{1}$$

$$L2 < 2 \times f \tag{2}$$

$$L1 + f > 2 \times L2 \tag{3}$$

$$L1 - f < 20 \text{ mm} \tag{4}$$

In the present embodiment, the distance L1 is 6 mm, the distance L2 is 3.3 mm, and the focal distance f is 3 mm. As a result of satisfying the four relationships represented by formulas (1) to (4), the beam diameter of the solid-state laser light is focused in the wavelength converting element 50 and wavelength conversion efficiency is enhanced, thereby making it possible to sustain resonance and realize a compact configuration even in the case a thermal lens effect occurs in the laser crystal 30. Namely, by satisfying the relationships of formulas (1) to (4), resonance conditions are satisfied and the length of the cavity can be shortened even if a thermal lens effect occurs. In addition, by satisfying the relationships of formulas (1) to (4), beam diameter in the wavelength converting element 50 can be made to be less than ½ the beam diameter in the laser crystal 30 while still satisfying resonance conditions.

Furthermore, the lens inserted into the cavity is required to have a positive lens power and have a shape that allows the focal distance thereof to satisfy the above-mentioned formulas (1) to (4). A typical material such as synthetic quartz or BK7 can be used for the lens material.

Embodiment 12

Figure 18:
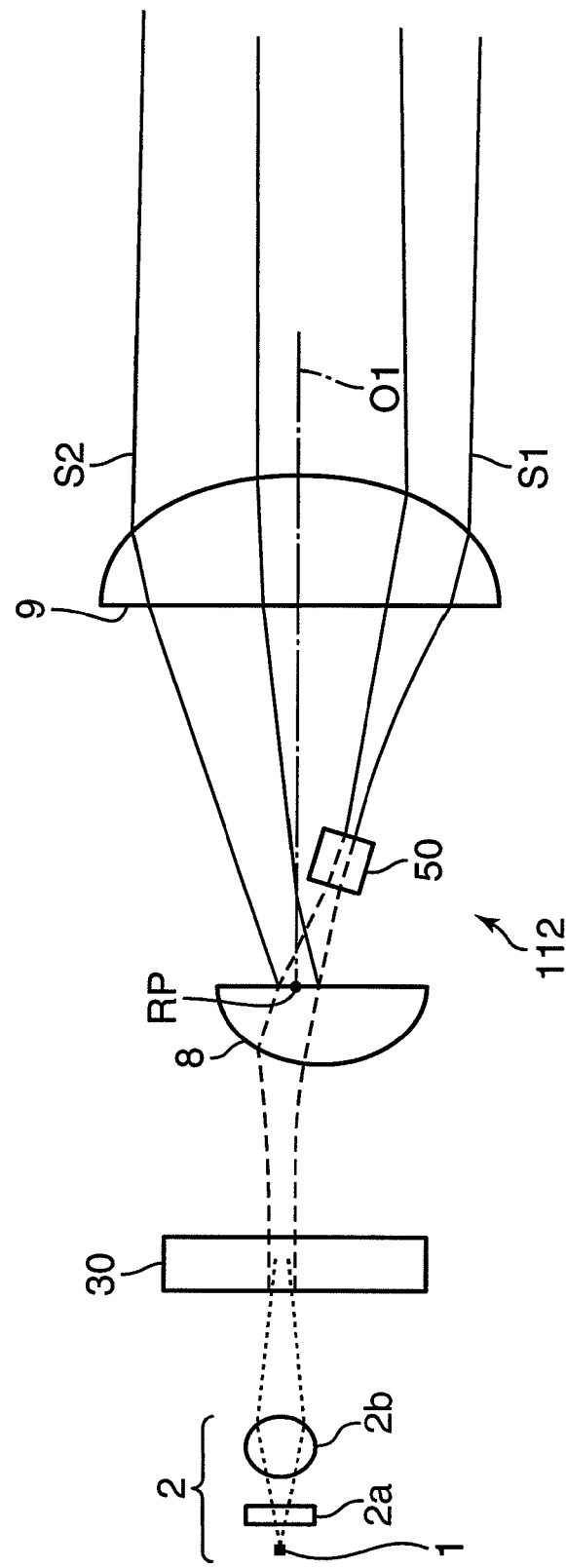
FIG. 18 is a schematic block diagram of a wavelength conversion laser in an Embodiment 12 of the present invention.

FIG. 18 is a schematic block diagram of a wavelength conversion laser 112 in an Embodiment 12 of the present invention. Furthermore, in FIG. 18, the same reference symbols are used to indicate those components that are the same as those of previously described embodiments, and detailed explanations thereof are omitted. In addition, FIG. 18 depicts the ratio of beam diameter of the laser light to sizes of the optical elements using dimensions that more closely approximate actual dimensions than in FIG. 17.

The wavelength conversion laser 112 shown in FIG. 18 is preferably provided with a synthesizing optics 9 having an optical axis aligned with the position of the lens 8 where the converted wavelength light S2 is reflected, and the synthesizing optics 9 preferably synthesizes two converted wavelength light beams, comprising the converted wavelength light S2 reflected by the lens 8 and the converted wavelength light S1 that does not enter the lens 8, so as to be treated as a single beam.

In the present embodiment, two converted wavelength light beams are generated of the converted wavelength light S1, which is emitted directly outside the cavity from the wavelength converting element 50, and the converted wavelength light S2, which is emitted outside the cavity after being reflected by the lens 8. The synthesizing optics 9, which synthesizes the two converted wavelength light beams, is provided directly behind the wavelength converting element 50, and by combining with the solid-state laser, carries out beam shaping corresponding to the application by treating the output as a single beam.

More specifically, the synthesizing optics 9 is composed of a single plano-convex spherical lens, and an optical axis O1 of the synthesizing optics 9 is aligned with a position RP of the lens 8 where the converted wavelength light S2 is reflected (for example, the center of the reflection region of the converted wavelength light S2). By aligning the optical axis O1 of the synthesizing optics 9 with the reflecting position RP of the lens 8 where the converted wavelength light S2 branches from the solid-state laser light, the two converted wavelength light beams S1 and S2 can be treated as coaxial beams. In addition, by aligning the focal point of the synthesizing optics 9 with the reflecting position RP of the lens 8, the two converted wavelength light beams S1 and S2 can be made to be roughly parallel. More precisely, although the respective beam waists of the two converted wavelength light beams S1 and S2 are different, the two converted wavelength light beams S1 and S2 can be approximately treated as coaxial parallel beams.

Furthermore, although the synthesizing optics 9 may be composed with a single lens, a configuration may also be employed that combines multiple optical components. For example, a form may be employed in which a high refractive index plate is allowed to transmit only the converted wavelength light S2 output after being reflected by the lens 8 in order to optically align the locations of the beam waists of the two converted wavelength light beams.

Embodiment 13

Figure 19:
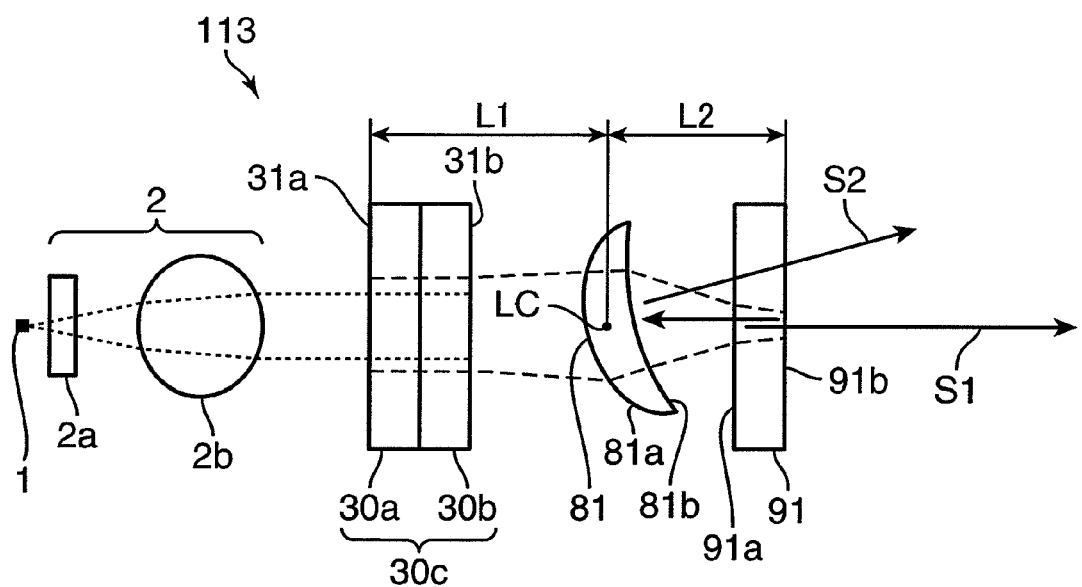
FIG. 19 is a schematic block diagram of a wavelength conversion laser in an Embodiment 13 of the present invention.

FIG. 19 is a schematic block diagram of a wavelength conversion laser 113 in an Embodiment 13 of the present invention. Furthermore, in FIG. 19, the same reference symbols are used to indicate those components that are the same as those of previously described embodiments, and detailed explanations thereof are omitted.

In FIG. 19, pumping light emitted by the pumping LD 1 is focused by the focusing optics 2 to as to overlap with solid-state laser light within the cavity in a lowly-doped laser crystal 30a and a highly-doped laser crystal 30b.

The lowly-doped laser crystal 30a is composed of Nd:YVO$_4$ (Nd concentration: 0.5 at %, thickness: 0.25 mm), while the highly-doped laser crystal 30b is composed of Nd:YVO$_4$ (Nd concentration: 3 at %, thickness: 0.25 mm). The lowly-doped laser crystal 30a has a lower pumping light absorption coefficient than the highly-doped laser crystal 30b that is roughly ⅙ that of the highly-doped laser crystal 30b. The lowly-doped laser crystal 30a and the highly-doped laser crystal 30b are integrated by optical bonding. The resulting integrated laser crystal 30c can be treated as a single laser crystal having a thickness of 0.5 mm. An AR coating for pumping light (wavelength: 808 nm) and an HR coating for solid-state laser light (wavelength: 1064 nm) are formed on an end surface 31a of the lowly-doped laser crystal 30a on the side of the pumping LD 1, while an AR coating for solid-state laser light is formed on an end surface 31b of the highly-doped laser crystal 30b on the side of a wavelength converting element 91.

The cavity of the solid-state laser oscillates in multiple longitudinal modes by being composed of reflective surfaces in the form of the end surface 31a of the lowly-doped laser crystal 30a and the end surface 91b of the wavelength converting element 91 on the side from which laser light is emitted. A lens 81 is arranged between the laser crystal 30c and the wavelength converting element 91. The lens 81 resonates by beam shaping so that the beam diameter of the solid-state laser light is smaller than that of the laser crystal 30c within the wavelength converting element 91. The wavelength converting element 91 carries out multi-longitudinal mode oscillation of resonating solid-state laser light to generate second harmonic waves and sum-frequency wave.

The lens 81 is a meniscus lens, and is arranged such that a convex surface 81a thereof is on the side of the laser crystal 30c and a concave surface 81b thereof is on the side of the wavelength converting element 91. The lens 81 has an AR coating for solid-state laser light and an HR coating for converted wavelength light (532 nm).

Figure 20:
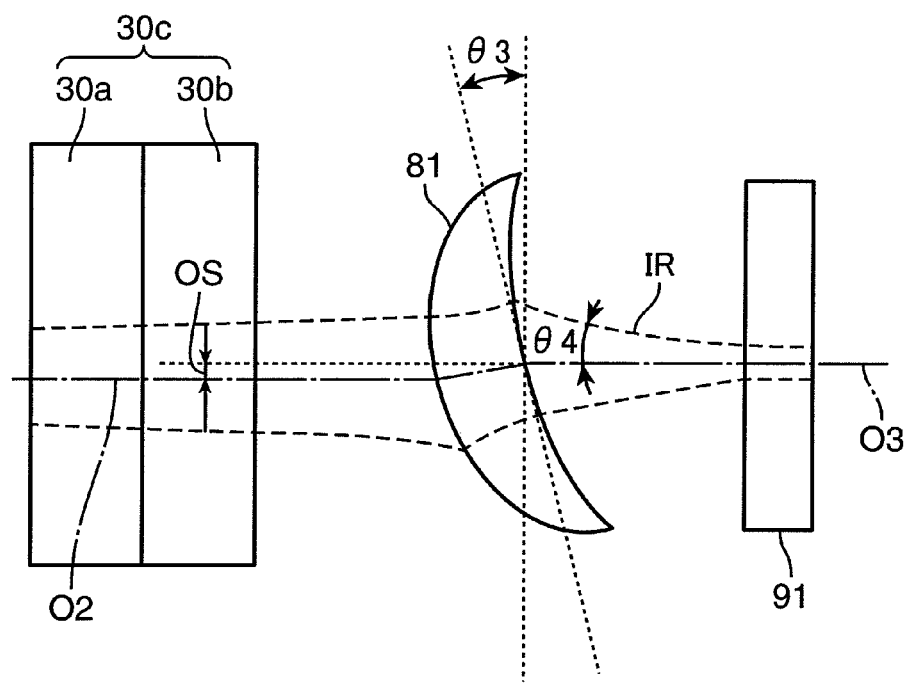
FIG. 20 is an enlarged view for explaining the state in which lenses are arranged in FIG. 19.

FIG. 20 is an enlarged view for explaining the arrangement of the lens 81 shown in FIG. 19. As shown in FIG. 20, the lens 81 is arranged on an angle with respect to optical axes O2 and O3 of solid-state laser light IR. An angle of inclination θ3 of the lens 81 is set so as to be greater than a divergence angle θ4 of the solid-state laser light IR. Although the optical axes O2 and O3 of the solid-state laser light IR are shifted by the lens 81, the optical axis O2 within the laser crystal 30c and the optical axis O3 within the wavelength converting element 91 are parallel.

Again referring to FIG. 19, the wavelength converting element 91 is composed of an MgO:LiNbO$_3$ (PPLN) microchip (thickness: 0.3 mm) having a polarization inversion periodic structure. The wavelength converting element 91 has an AR coating for solid-state laser light and converted wavelength light on an end surface 91a on the side of the pumping LD, and an HR coating for solid-state laser light and an AR coating for converted wavelength light on the other end surface 91b. The wavelength converting element 91 is in the form of a parallel plate and is arranged in parallel with the laser crystal 30c.

The converted wavelength light S1, which is the result of converting the wavelength of solid-state laser light that passes through the wavelength converting element 91 in the direction to the right in the drawing, is output outside the cavity from the end surface 91b. The converted wavelength light S2, which is the result of converting the wavelength of solid-state laser light that passes through the wavelength converting element 91 in the direction to the left in the drawing, is output outside the cavity by passing through the wavelength converting element 91 after having been reflected by the surface 81b of the lens 81. Since the concave surface 81b of the meniscus lens is located on the side of the wavelength converting element 91, the converted wavelength light S2 is output outside the cavity while having a small divergence angle. At this time, since the lens 81 is inclined at an angle larger than the divergence angle of the solid-state laser light, the converted wavelength light S2 reflected by the surface 81b is separated from the solid-state laser light so as not to overlap with the solid-state laser light during re-entry of the converted wavelength light S2 into the wavelength converting element 91.

The distance L1 between the principal point LC when light has entered the lens 81 from the side of the convex surface 81a to the laser crystal 30c is 7 mm, including the thickness of the laser crystal 30a (when converted based on the length in air). The distance L2 between the principal point LC of the lens 81 and the wavelength converting element 91 is 4.2 mm, including the thickness of the wavelength converting element 91 (when converted based on the length in air). The focal distance f of the lens 81 is 4 mm.

In the present embodiment, the beam diameter of the solid-state laser in the laser crystal 30c is about 140 μm, the beam diameter of solid-state laser light in the wavelength converting element 91 is about 40 μm, and the beam diameter in the wavelength converting element 91 is ⅓ or less the beam diameter in the laser crystal 30c. In addition, the cavity has an extremely compact configuration, having a length of about 11 mm. In addition, the distances L1 and L2 and the focal distance f of the present embodiment are within ranges that satisfy the above-mentioned formulas (1) to (4). Although the thickness of the wavelength converting element 91 is extremely thin at 0.3 mm, since the beam diameter in the wavelength converting element 91 can be made to be small as a result of employing the configuration described above, conversion efficiency is enhanced enabling the realization of both a broad temperature tolerance not requiring temperature control and high wavelength conversion efficiency.

In the present embodiment, the lens 81 of the cavity is preferably composed of a meniscus lens, and the surface 81b of the lens 81 on the side of the wavelength converting element 91 is preferably a concave surface. In the present embodiment, although the lens 81 within the cavity has a function that reflects the converted wavelength light S2, by making the surface 81b to be a concave surface, the divergence angle of the reflected converted wavelength light S2 becomes smaller, and the beam diameter of the converted wavelength light S2 reflected by the concave surface 81b can be maintained at a small diameter.

Converted wavelength light output from the wavelength conversion laser 113 is composed of converted wavelength light of the converted wavelength light S1 emitted directly from the wavelength converting element 91, and the converted wavelength light S2 emitted after being reflected by the lens 81. Since the locations of the beam waists of this converted wavelength light S1 and S2 are at the end surface 91b of the wavelength converting element 91, the beam diameter of the converted wavelength light S2 that is reflected by the lens 81 is relatively larger than the beam diameter of the converted wavelength light S1 outside the cavity.

In the present embodiment, the beam diameters of the converted wavelength light S1 and S2 outside the cavity can be aligned by decreasing the beam diameter of the converted wavelength light S2 reflected by the lens 81 using the concave surface of the meniscus lens. By making the beam diameters of the converted wavelength light S1 and S2 to be of similar size, handling of converted wavelength light emitted from the wavelength conversion laser 113 can be made easier.

In addition, in the present embodiment, the laser crystal 30c is preferably composed of two or more crystals having different pumping light absorption rates (for example, the lowly doped laser crystal 30a and the highly doped laser crystal 30b), and the laser crystals are preferably arranged in series in order from the crystal having the lowest absorption rate to the crystal having the highest absorption rate starting from the side of the pumping LD. In a solid-state laser, a thermal lens effect and heat strain occur due to generation of heat in portions of the laser crystal where pumping light is absorbed, thereby causing output instability and output saturation during high output. In addition, microchip lasers tend to have the portion where pumping light is absorbed concentrated in an extremely small volume.

In the present embodiment, the range over which pumping light is absorbed is broadened in the direction of the optical axis of the solid-state laser light by arranging laser crystals in series in the order of the laser crystal having the lower pumping light absorbance to the laser crystal having the higher pumping light absorbance starting on the side of the pumping LD using two crystals having different pumping light absorption rates for the laser crystals (the lowly doped laser crystal 30a and the highly doped laser crystal 30b). Broadening the range over which pumping light is absorbed in the direction of the optical axis of the solid-state laser light makes it possible to inhibit the thermal lens effect and heat strain and enables high-output oscillation.

In addition, the beam diameter of the solid-state laser light in the laser crystal 30c is large, and the beam diameter of the solid-state laser light in the laser crystal 30c becomes larger in order starting from the side of the pumping LD. Although it is necessary to superimpose pumping light and solid-state laser light in order to oscillate a solid-state laser at high efficiency, in the present embodiment, since the beam diameter of the solid-state laser light is large within the laser crystal 30c, the beam diameter of the pumping light can also be increased, thereby making it possible to also broaden the absorption range in the direction of beam diameter. In addition, oscillation can be carried out at high efficiency even if the beam diameter of the pumping light is increased starting from the side of the pumping LD in the same manner as the beam diameter of the solid-state laser light.

In addition, in the present embodiment, in order to broaden the range of absorption in the laser crystal 30c in the direction of the optical axis of the solid-state laser light, a laser crystal having a high absorption rate for pumping light in the form of the highly doped laser crystal 30b is arranged at a remote location as viewed from the pumping LD 1. At this time, as a result of the beam diameter of the pumping light becoming larger the farther away from the pumping LD 1, the amount of heat generated can be reduced even if the range over which pumping light is absorbed in a direction perpendicular to the direction of the optical axis in the highly doped laser crystal 30b having a high absorption rate for pumping light. In addition, by making the beam diameter of the solid-state laser light small in the wavelength converting element 91, wavelength conversion is carried out at high efficiency, and heat is prevented from accumulating in the laser crystals by emitting the converted wavelength light outside the cavity.

Embodiment 14

Figure 21:
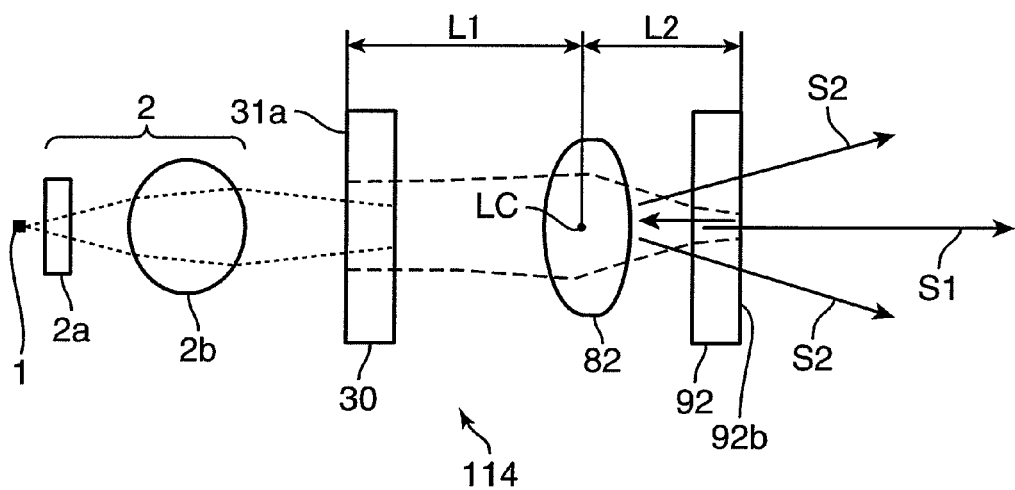
FIG. 21 is a schematic block diagram of a wavelength conversion laser in an Embodiment 14 of the present invention.

FIG. 21 is a schematic block diagram of a wavelength conversion laser 114 in an Embodiment 14 of the present invention. Furthermore, in FIG. 21, the same reference symbols are used to indicate those components that are the same as those of previously described embodiments, and detailed explanations thereof are omitted.

In FIG. 21, a cavity of the a solid-state laser of the wavelength conversion laser 114 is composed of reflective surfaces in the form of the end surface 31a of the laser crystal 30 on the side of the pumping LD 1 and an end surface 92b of a wavelength converting element 92 on the laser emission side, and carries out multi-longitudinal mode oscillation. A lens 82 is present between the laser crystal 30 and the wavelength converting element 92. Oscillation is carried out after the lens 82 shapes the beam of solid-state laser light so that the beam diameter of the solid-state laser light is smaller in the wavelength converting element 92 than in the laser crystal 30. Since the beam diameter is small in the wavelength converting element 92, the wavelength converting element 92 generates second harmonic waves and sum-frequency wave by efficiently carrying out wavelength conversion of resonating multi-longitudinal mode solid-state laser light.

The lens 82 is a bi-convex lens that has an AR coating for the solid-state laser light and an HR coating for converted wavelength light. The wavelength converting element 92 is composed of an MgO:LiTaO$_3$ (PPLT) microchip (thickness: 1.0 mm) having a polarization inversion periodic structure. The wavelength converting element 92 has an AR coating for solid-state laser light and converted wavelength light on the side of the pumping LD 1, and an HR coating for the solid-state laser light and an AR coating for the converted wavelength light on the other side thereof.

The converted wavelength light S1, which is the result of converting the wavelength of solid-state laser light that passes through the wavelength converting element 92 in the direction to the right in the drawing, is output outside the cavity from the end surface 92b of the wavelength converting element 92. The converted wavelength light S2, which is the result of converting the wavelength of solid-state laser light that passes through the wavelength converting element 92 in the direction to the left in the drawing, is output outside the cavity after having been reflected by the lens 82. At this time, the divergence angle of the converted wavelength light S2 is increased due to the shape of the convex surfaces of the lens 82, and the converted wavelength light S2 is output outside the cavity after having re-entered the wavelength converting element 92. In addition, since the converted wavelength light S2 reflected by the lens 82 diverges considerably within the wavelength converting element 92, although it overlaps with the solid-state laser light in the wavelength converting element 92, since the amount of the converted wavelength light S2 of the overlapping portion is small, there is hardly any occurrence of mode competition noise that causes output instability.

The distance L1 between the principal point LC of the lens 82 when light has entered from the side of the laser crystal 30 to the laser crystal 30 is 5 mm, including the thickness of the laser crystal 30 (when converted based on the length in air). The distance L2 between the principal point LC of the lens 82 and the wavelength converting element 92 is 2.2 mm, including the thickness of the wavelength converting element 92 (when converted based on the length in air). The focal distance f of the lens 82 is 2 mm.

As a result of employing the above-mentioned configuration, the beam diameter of the solid-state laser in the laser crystal 30 is about 100 μm, the beam diameter of solid-state laser light in the wavelength converting element 92 is about 30 μm, and the beam diameter in the wavelength converting element 92 is ⅓ or less the beam diameter in the laser crystal 30 in the present embodiment. In addition, the cavity has an extremely compact configuration, having a length of about 7 mm. Moreover, the distances L1 and L2 and the focal distance f of the present embodiment are within ranges that satisfy the above-mentioned formulas (1) to (4). As a result, the wavelength conversion laser 114 has a compact size, demonstrates high conversion efficiency, and carries out multi-mode wavelength conversion that allows the obtaining of a stable output without the need for temperature control.

Embodiment 15

Figure 22:
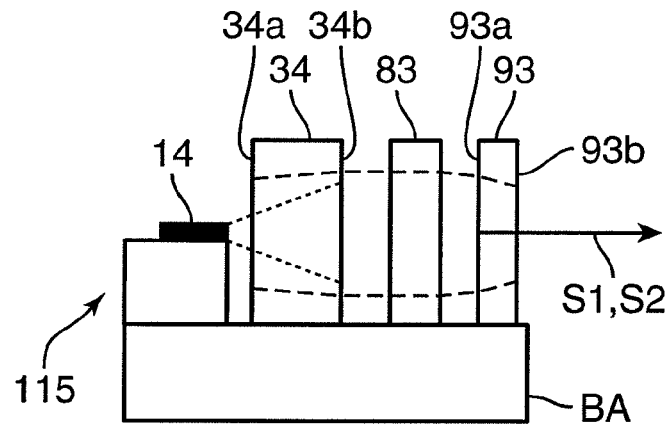
FIG. 22 is a side view showing the schematic configuration of a wavelength conversion laser in an Embodiment 15 of the present invention.
Figure 23:
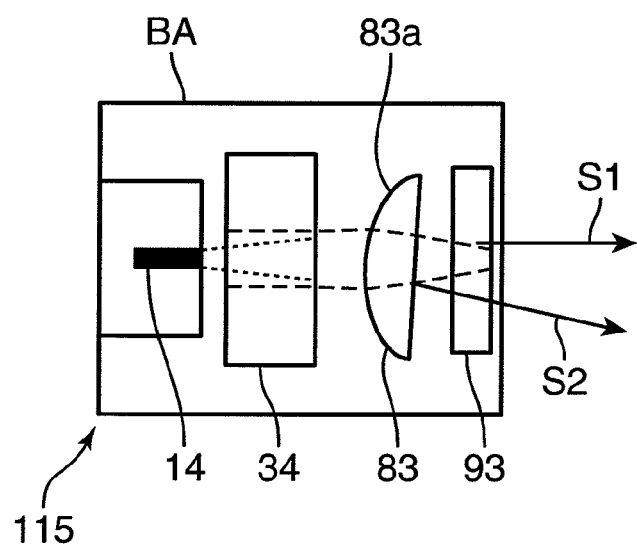
FIG. 23 is an overhead view showing the schematic configuration of the wavelength conversion laser shown in FIG. 22.

FIG. 22 is a side view showing the schematic configuration of a wavelength conversion laser 115 in an Embodiment 15 of the present invention, while FIG. 23 is an overhead view showing the schematic configuration of the wavelength conversion laser 115 shown in FIG. 22. Furthermore, in FIGS. 22 and 23, the same reference symbols are used to indicate those components that are the same as those of previously described embodiments, and detailed explanations thereof are omitted.

A pumping LD 14 is a wide-stripe semiconductor laser that emits light at a wavelength in the 808 nm band. Pumping light emitted by the pumping LD 14 directly enters a laser crystal 34.

The laser crystal 34 is composed of Nd1%:Gd$_{0.6}$Y$_{0.4}$VO$_4$, has external dimensions of 3×3×2 mm, and has a thickness of 2 mm in the direction of the cavity. The laser crystal 34 is a mixed crystal material of GdVO$_4$ and YVO$_4$. The use of a mixed crystal of GdVO$_4$ and YVO$_4$ broadens the oscillation gain spectral width and absorption band. The laser crystal 34 has an HR coating for the 1064 nm band and an AR coating for the 808 nm band on an end surface 34a on the side of the pumping LD 14, and an AR coating for the 1064 nm band on an end surface 34b on the side of a wavelength converting element 93. The use of Nd for ion addition element makes it possible to obtain highly efficient laser conversion and use the laser crystal in the form of a microchip.

The wavelength converting element 93 is composed of an MgO:LiNbO$_3$ (PPLN) microchip (thickness: 0.5 mm) having a polarization inversion periodic structure. The wavelength converting element 93 has an AR coating for solid-state laser light and converted wavelength light on the end surface 93a on the side of the pumping LD 14, and an HR coating for solid-state laser light and an AR coating for converted wavelength light on the other end surface 93b. The end surface 93b serves as a cavity mirror as well as an output surface for converted wavelength light. The wavelength converting element 93 is in the form of a parallel plate and is arranged in parallel with the laser crystal 34.

As shown in FIG. 23, a cylindrical lens 83 is a plano-convex lens having a curvature in the horizontal direction (direction of the paper surface of FIG. 23), and a convex surface 83a is located on the side of the laser crystal 34. The cylindrical lens 83 has an AR coating for the 1064 nm band and an HR coating for the 532 nm band.

The laser crystal 34 carries out multi-longitudinal mode oscillation in the 1063.2 to 1064.4 nm band range. Use of the mixed crystal as described above enables the laser crystal 34 to have a broad oscillation band in comparison with the use of a single crystal material of YVO$_4$ or GdVO$_4$ only. A cavity is composed by the end surface 34a of the laser crystal 34 and the end surface 93b of the wavelength converting element 93, longitudinally long beams having a small beam diameter in the horizontal direction are resonated by the lens power of the cylindrical lens 83. In addition, resonance in the direction perpendicular to the cavity is maintained by thermal lens effects.

As shown in FIGS. 22 and 23, output from the pumping LD 14 has a remarkably large divergence angle in the direction of thickness relative to the direction of width, and becomes a longitudinally long beam in the laser crystal 34. In the wavelength conversion laser 115, by forming the solid-state laser light into a longitudinally long, elliptical beam using the cylindrical lens 83, the coupling efficiency of pumping light and solid-state laser light is enhanced, thereby enabling highly efficient laser oscillation. Due to the cylindrical lens 83, the configuration of the solid-state laser light is such that the beam diameter in the horizontal direction is narrow in the wavelength converting element 93 and wide in the laser crystal 34. Due to the wide beam diameter in the horizontal direction in the laser crystal 34, high coupling efficiency can be obtained between the pumping light and the solid-state laser light even if the wide-stripe pumping LD 14 is used.

In addition, as shown in FIG. 23, the cylindrical lens 83 is inclined in the horizontal direction with respect to the optical axis of the solid-state laser light, and the reflected converted wavelength light S2 is emitted while shifted in the horizontal direction. At this time, the horizontal direction is the axial direction in which the cylindrical lens 83 is curved.

The wavelength converting element 93 broadens the wavelength band over which wavelength conversion is able to be carried out by using an extremely thin microchip wavelength converting element. In the wavelength conversion laser 115, although the use of a mixed crystal of GdVO$_4$ and YVO$_4$ makes it possible to broaden the oscillation band, second harmonic waves and sum-frequency wave can be generated by the microchip wavelength converting element for all oscillation bands of the 1064 nm band. Consequently, converted wavelength light having a broad oscillation bandwidth can be output by wavelength conversion laser 115. In addition, by narrowing the beam diameter in the wavelength converting element 93 with the cylindrical lens 83, the intensity of the solid-state laser light per unit surface area is enhanced, thereby realizing highly efficient wavelength conversion.

In the wavelength conversion laser 115, the laser crystal 34 is preferably composed of an Nd-doped Gd$_x$Y$_{1-x}$YVO$_4$ crystal (where, 0<X<1) that carries out multi-longitudinal mode oscillation within the cavity, and the wavelength converting element 93 preferably carries out wavelength conversion that generates second harmonic waves and sum-frequency wave of multi-longitudinal mode oscillation. In this manner, the use of a mixed crystal host material of GdVO$_4$ and NdVO$_4$ for the laser crystal 34 allows the obtaining of multi-longitudinal mode oscillation having a broadened spectral distribution.

Generation of second harmonic waves and sum-frequency wave from this solid-state laser light enables output of converted wavelength light having a broad spectral distribution. As a result of broadening the spectral distribution, the coherency of the output converted wavelength light decreases resulting in a reduction in interference noise. Although interference noise in the form of speckle noise causes serious problems when using converted wavelength light particularly in an image display apparatus, the wavelength conversion laser 115 is able to reduce this speckle noise. In addition, the wavelength conversion laser 115 enhances wavelength conversion efficiency by simultaneously generating second harmonic waves and sum-frequency wave, thereby enhancing the electro-optical conversion of the laser.

In addition, the wavelength conversion laser 115 preferably uses the cylindrical lens 83, and the converted wavelength light S2 reflected by the cylindrical lens 83 is preferably emitted while inclined in the axial direction of the curvature of the cylindrical lens 83 with respect to the converted wavelength light S1 that is output without being reflected by the cylindrical lens 83, or in other words, is emitted with an angle within the horizontal plane in which the cylindrical lens 83 demonstrates lens power.

As has been described above, use of the cylindrical lens 83 results in resonance of an elliptical beam, thereby creating the optimum coupling state for pumping light from the pumping LD 14 that is the elliptical beam output. As a result, in the wavelength conversion laser 115, high coupling efficiency can be obtained between the pumping light and solid-state laser light even if focusing optics between the pumping LD 14 and the laser crystal 34 is excluded.

Figure 24:
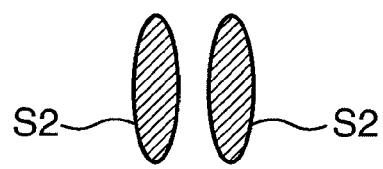
FIG. 24 is a schematic diagram showing the cross-sections of two beams of laser converted light.

In addition, in the wavelength conversion laser 115, since converted wavelength light S2 is shifted in the direction of the lens curvature with respect to the converted wavelength light S1 by the cylindrical lens 83, as shown in FIG. 24, output light from the two beams of the converted wavelength light S1 and the converted wavelength light S2 is in the form of two elliptical beams arranged side by side. Although the two beams are output as described above in the present embodiment, by arranging the beams in the direction of the short axis of the elliptical beams, the distance between the two beams can be shortened. As a result of shortening the distance between beams, the two beams can be handled easily with the same optics, thereby making it possible to reduce the size of the optics for the output beams.

In addition, the present embodiment makes it possible to simultaneously control coupling with a pumping LD and coupling with outside the output beams by using the cylindrical lens 83. In addition, use of the cylindrical lens 83, which is free of eccentricity in the vertical direction, makes it possible to reduces the adjustment axes, and as shown in FIGS. 22 and 23, enables the laser crystal 34, the cylindrical lens 83 and the wavelength converting element 93 to be arranged in a row on the same base BA, thereby realizing a compact form for the wavelength conversion laser 115.

Embodiment 16

Figure 25:
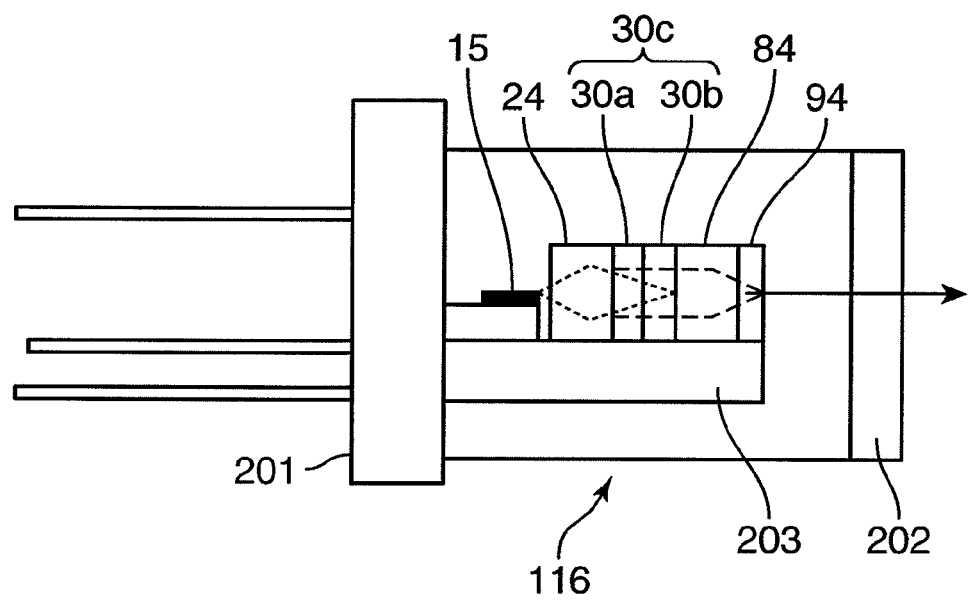
FIG. 25 is a schematic block diagram of a wavelength conversion laser in an Embodiment 16 of the present invention.

FIG. 25 is a schematic block diagram of a wavelength conversion laser 116 in an Embodiment 16 of the present invention. Furthermore, in FIG. 25, the same reference symbols are used to indicate those components that are the same as those of previously described embodiments, and detailed explanations thereof are omitted.

The wavelength conversion laser 116 shown in FIG. 25 is a compact wavelength conversion laser capable of being housed in a package having a diameter of 9 mm. Each laser component of the wavelength conversion laser 116 is housed in a 9 mm diameter can-type package 201, and a sealing window 202 prevents entrance of dust from the outside while also functioning as an infrared light cutoff filter.

A pumping LD 15 is an internal wavelength locking-type wide-stripe semiconductor laser that emits light at a wavelength of 880 nm. Pumping light emitted by the pumping LD 15 is focused by a gradient index (GRIN) lens 24 at the laser crystal 30c composed of the lowly-doped laser crystal 30a and the highly-doped laser crystal 30b. The laser crystal 30a and the laser crystal 30b carry out laser oscillation by absorbing pumping light.

A gradient index (GRIN) lens 84 is inserted between the laser crystal 30b and a wavelength converting element 94. The GRIN lenses 24 and 84 are in the shape of a rectangular prism, and demonstrate lens effects due to their internal refractive index distribution. Refractive index distribution is carried out by glass ion exchange. In the wavelength conversion laser 116, the laser crystal 30a, laser crystal 30b, GRIN lens 84 and wavelength converting element 94 are laminated to form an integral unit. In addition, focusing optics in the form of the GRIN lens 24 is also laminated with the laser crystal 30a to form an integral unit. These integrated optical members in the shape of rectangular prisms are fixed a base 203 that also serves as a heat sink.

The GRIN lens 24 has an AR coating for pumping light on the side of the pumping LD, and an HR coating for solid-state laser light and an AR coating for pumping light are formed at the interface of the GRIN lens 24 and the laser crystal 30a. The laser crystal 30a and the laser crystal 30a are bonded directly to each other. An AR coating for solid-state laser light is formed between the GRIN lens 84 and the laser crystal 30b. In addition, an AR coating for solid-state laser light and an HR coating for converted wavelength light are formed between the GRIN lens 84 and the wavelength converting element 94. Converted wavelength light is reflected at the GRIN lens 84 by this HR coating for converted wavelength light. The output surface of the wavelength converting element 94 has an HR coating for solid-state laser light and an AR coating for converted wavelength light, thereby enabling output of converted wavelength light.

The interface of the laser crystal 30a on the side of the pumping LD and the output surface of the wavelength converting element 94 compose a cavity, and solid-state laser light (wavelength: 1064 nm) is oscillated in the form of multi-longitudinal mode oscillation. The solid-state laser light is focused at the wavelength converting element 94 by the GRIN lens 84. As a result of decreasing the beam diameter in the wavelength converting element 94, light intensity is increased and wavelength conversion can be carried out at high efficiency in the wavelength converting element 94. In addition, since the resonant beam diameter within the laser crystal 30c is made to be wider than that within the wavelength converting element 94 by the GRIN lens 84, pumping light and solid-state laser light can be coupled efficiently.

In the wavelength conversion laser 116, the lens is preferably composed of the gradient index lens 84, and the gradient index lens 84 is preferably bonded to at least one of the laser crystal 30c and the wavelength converting element 94. By bonding the gradient index lens 84 to the laser crystal 30c or the wavelength converting element 94 to integrate into a single unit, optical adjustment during fabrication of the wavelength conversion laser 116 is no longer required while also making it possible to reduce size and costs. In particular, the reliability of the cavity is improved by integrating the laser crystal 30c, the GRIN lens 84 and the wavelength converting element 94. In addition, a configuration in which the focusing optics in the form of the GRIN lens 24 is also laminated with the laser crystal 30c and the like, adjustment costs can be reduced and reliability can be improved for the entire wavelength conversion laser 116. Although handling during production presents a problem due to the use of microchip crystals in particular, as a result of using GRIN lenses and integrating optical members, the present embodiment is able to solve problems such as those relating to handling and adjustments during production.

Here, an explanation is provided of a preferable output method of the wavelength conversion lasers of each of the above-mentioned embodiments. The multi-longitudinal modes of solid-state laser light within the cavity of a wavelength conversion laser change over time due to modulation of the drive current of the pumping LD. By modulating of the pumping LD at a period on the order of milliseconds to microseconds, the temperature of the laser crystal repeatedly rises during emission of pumping light by the pumping LD and falls during stoppage of the pumping LD, or in other words, the temperature changes over time.

The longitudinal mode of oscillated solid-state laser light changes according to temperature conditions and becomes multiple modes. In this manner, when the solid-state laser light is integrated over time, the spectral width of the solid-state laser light increases. In the wavelength conversion lasers of each of the above-mentioned embodiments, since second harmonic waves and sum-frequency wave can be generated over a broad bandwidth, even in the case the spectral width of solid-state laser light oscillated from the laser crystal has increased, conversion is carried out over the entire broad spectral width, and the spectral width of converted wavelength light composed of converted second harmonic waves and sum-frequency wave increases. In particular, since second harmonic waves and sum-frequency wave are generated simultaneously, when this converted wavelength light is integrated over time, spectral overlapping of the converted wavelength light occurs, thereby making it possible to realize flattening of the spectral distribution. By broadening and flattening the spectral distribution in this manner, coherency of the output converted wavelength light is reduced, thereby making it possible to reduce speckle noise and other interference noise.

Embodiment 17

Figure 26:
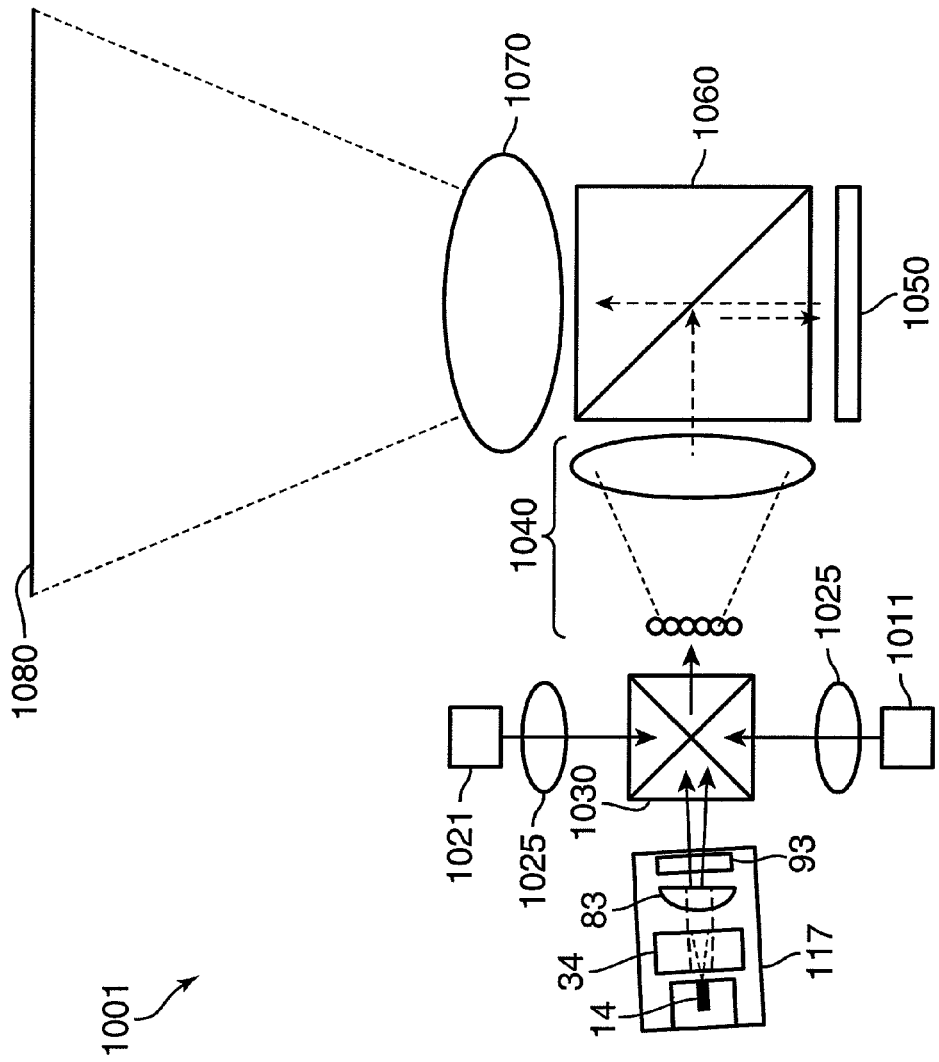
FIG. 26 is a schematic diagram of an image display apparatus in an Embodiment 17 of the present invention that uses the wavelength conversion laser of an Embodiment 15 as a green wavelength conversion laser.

FIG. 26 is a schematic diagram of an image display apparatus 1001 in an Embodiment 17 of the present invention that uses the wavelength conversion laser 115 of Embodiment 15 as a green wavelength conversion laser 117. Furthermore, in FIG. 26, the same reference symbols are used to indicate those components that are the same as those of previously described embodiments, and detailed explanations thereof are omitted.

The image display apparatus 1001 is a laser projector having the green wavelength conversion laser 117 that emits green laser light, a red LD 1011 that emits red laser light, and a blue LD 1021 that emits blue laser light. A wide-stripe multi-mode LD is used for the red LD 1011 and the blue LD 1021, and the wavelength conversion laser 115 of Embodiment 15 is used for the green wavelength conversion laser 117. Furthermore, a wavelength conversion laser of another embodiment may also be used for the green wavelength conversion laser 117.

Light emitted by the red LD 1011 and the blue LD 1021 is collimated by a collimator 1025 and combined with two beams emitted from the green wavelength conversion laser 117 with a combining prism 1030. The combined light is shaped into a rectangular beam having uniform intensity by the illumination optics 1040.

The illumination optics 1040 is composed of a cross renticular lens and a divergence angle compensating lens. The shaped beam illuminates the spatial light modulating element 1050 after passing through a polarizing beam splitter in the form of the PBS 1060. The spatial light modulating element 1050 is composed of reflective LCOS, and represents gradation by rotating polarized light. Modulated light that has been reflected by the spatial light modulating element 1050 and passed through the PBS 1060 is enlarged and projected onto the display screen 1080 by the projection lens 1070.

The image display apparatus 1001 preferably has the wavelength conversion laser of the above-mentioned Embodiment 15 and an element that modulates output converted wavelength light. Use of the compact and highly efficient wavelength conversion laser of the above-mentioned Embodiment 15 enables the image display apparatus 1001 to have a compact size and save on electrical power. Although size and efficiency in particular present problems when using a wavelength conversion laser in an image display apparatus, these problems can be solved with the image display apparatus 1001.

The spatial light modulating element 1050 modulates red, green and blue laser light by time division. Red, green and blue laser light is sequentially emitted from each color of laser light source 1011, 1021 and 117, and the green wavelength conversion laser 117 also repeatedly emits converted wavelength light and interrupts the emission of converted wavelength light. At this time, as a result of the pumping LD 14 repeatedly emitting pumping light and interrupting the emission of pumping light, temperature shifts occur during output in the laser crystal 34. In response to the temperature shifts, the oscillation wavelength of the solid-state laser changes during output in the green wavelength conversion laser 117. Due to these changes in the oscillation wavelength of the solid-state laser, spectral distribution broadens during time integration of the output second harmonic waves and sum-frequency wave. As a result, coherency during time integration of the converted wavelength light decreases and speckle noise of the image display apparatus 1001 is removed.

As has been described above, the image display apparatus 1001 preferably broadens the spectral width of the green wavelength conversion laser 117 by having laser light sources that oscillate at wavelengths of the red, blue and green light, sequentially emitting laser light for each color from the laser light sources by at least using the green wavelength conversion laser 117 for the green light source, and having the green wavelength conversion laser 117 repeatedly emit the beams and interrupt the emission of the beams, thereby causing the green wavelength conversion laser 117 to be heated by pumping light during emission and cooled when emission is interrupted.

In this manner, by using sequential emission of laser light from laser light sources, easily perceived green speckle noise can be removed. At this time, semiconductor light sources are preferably used for the red and blue light. Temperature shifts also occur in the laser chips during emission in the red and blue light sources as well, thereby making it possible to broaden spectral distribution when integrated over time due to the change in oscillation wavelength. Thus, speckle noise can be removed from all red, green and blue laser light that are used to display color images. In addition, by using laser light sources for all the light sources, the image display apparatus 1001 can be made to be more compact, have reduced thickness and save on electrical power.

Furthermore, a spatial light modulating element such as a transmissive liquid crystal or DMD can be used for the spatial light modulating element of converted wavelength light of the image display apparatus 1001. In addition, the transmissive liquid crystal may be of a form that uses a liquid crystal surface for the display surface without using a projection lens. In addition, the modulating element may be of a form that combines intensity modulation of converted wavelength light and scanning optics in addition to a spatial light modulating element. In addition, although a renticular lens is used for the illumination optics 1040 in the present embodiment, the illumination optics is not limited to this example in particular, but rather a rod integrator or fly eye lens can also be used.

Furthermore, the number of laser crystals able to be applied in the present invention is not limited to the numbers indicated in each of the embodiments, but rather a single laser crystal or three or more laser crystals may be used. In addition, a configuration may also be employed in which a plurality of numbers each of two types of laser crystals are arranged within the cavity. In addition, the configuration of the solid-state laser may consist only of two or more types of laser crystals and a wavelength converting element, or a configuration may be employed in which other optical components are added as necessary.

In addition, the laser crystals are not necessarily required to be single crystals, but rather ceramic or mixed crystals may also be used. Furthermore, although Nd was used for the doping ion of the laser crystals in each of the above-mentioned embodiments, the laser crystals may also be doped with an active element other than Nd. In addition, doping may also be in the form of compound doping using a plurality of ions. For example, light absorbed by Cr by compound doping with Nd and Cr shifts to Nd by quantum transition enabling pumping to occur in absorption wavelength band of Cr. In this manner, by additionally doping an Nd-doped laser crystal with Cr and the like to broaden the absorption wavelength band, a semiconductor laser can be used that does not have wavelength locking and the like, thereby enabling a wavelength conversion laser to be produced inexpensively.

In addition, although LN or LT having a polarization inversion periodic structure was used for the wavelength converting element in the above-mentioned embodiments, other non-linear optical crystals can also be used. In addition, a configuration may be employed that enables changes to be added to the period of the polarization inversion periodic structure according to a design. In addition, although a configuration in which green converted wavelength light is output is indicated in the above-mentioned embodiments, there are no limitations on the output wavelength, and a configuration may be employed in which blue, yellow or red laser light, for example, is output. In addition, the shape of the lens is not limited to a spherical or flat lens, but rather the shape of the lens may be altered, such as to that having an aspheric shape, within a range that does not deviate from the gist of the present invention.

A summary of the present invention based on each of the above-mentioned embodiments is provided as follows. Namely, the wavelength conversion laser as claimed in the present invention is provided with a solid-state laser having a cavity, and a wavelength converting element arranged within the cavity, the solid-state laser includes two or more types of laser crystals and oscillates solid-state laser light of multiple wavelengths, and the wavelength converting element converts the solid-state laser light of multiple wavelengths into light of second harmonic waves and sum-frequency wave of multiple wavelengths, and simultaneously generates the second harmonic waves and sum-frequency wave of multiple wavelengths.

In this wavelength conversion laser, since the solid-state laser includes two or more types of laser crystals and oscillates solid-state laser light of multiple wavelengths, and since the wavelength converting element converts the solid-state laser light of multiple wavelengths into light of second harmonic waves and sum-frequency wave of multiple wavelengths and simultaneously generates the second harmonic waves and sum-frequency wave of multiple wavelengths, second harmonic waves and sum-frequency wave are generated from solid-state laser light of different wavelengths that oscillates in the cavity of the solid-state laser, thereby enabling stable output of wavelength converted laser light of low coherency composed of multiple wavelengths. As a result, a compact wavelength conversion laser can be realized that has high wavelength conversion efficiency, broad spectral width and low coherency. In addition, since a compact light source can be obtained that demonstrates stable, high-output oscillation and high efficiency, a high-output, compact wavelength conversion laser can be obtained that has a broad spectral width and high efficiency. Moreover, since laser light can be used for which interference noise, which causes problems in imaging and illumination fields, has been reduced, W class, low-coherency wavelength converted laser light capable of being applied in imaging and illumination fields and the like can be stably output with high efficiency, while also enabling apparatus size to be reduced.

Converted wavelength light composed of second harmonic waves and sum-frequency wave as described above is preferably output outside the cavity without re-entering the wavelength converting element coincidentally with the solid-state laser light.

In this case, since the converted wavelength light composed of second harmonic waves and sum-frequency wave can be output outside the cavity without re-entering the wavelength converting element coincidentally with the solid-state laser light, the phenomenon of the converted wavelength light being reverse-converted causing oscillation noise in the solid-state laser is prevented, thereby allowing the obtaining of stable, high-output oscillation characteristics.

The two or more types of laser crystals are preferably pumped by the same pumping light source.

In this case, the number of pumping light sources can be reduced, thereby making it possible to reduce apparatus costs and size.

The spot diameter of pumping light of the pumping light source within the two or more types of laser crystals becomes preferably smaller as the oscillation wavelength of the laser crystals becomes longer.

In this case, as a result of the spot diameter of the pumping light becoming smaller as the oscillation wavelength of the laser crystals becomes longer, since the optical absorption density of laser crystals having a long oscillation wavelength is enhanced, the temperature at the site where oscillation of the laser crystals occurs becomes higher, and the oscillation wavelength of laser crystals having a long oscillation wavelength can be preferentially made longer, the wavelengths of laser crystals having a long oscillation wavelength can be shifted in the direction of a longer wavelength relative to laser crystals having a short oscillation wavelength, thereby making it possible to further broaden the spectral width of the wavelength conversion laser.

Among multiple oscillation wavelengths of the solid-state laser, when the central wavelength of the shortest oscillation wavelength is taken to be $\lambda s$, the central wavelength of the longest oscillation wavelength is taken to be $\lambda l$, the wavelength of the sum-frequency wave of $\lambda s$ and $\lambda l$ is taken to be $\lambda sfg$, the average wavelength of $\lambda s$ and $\lambda l$ is taken to be $\lambda ave$, the thickness of the wavelength converting element is taken to be t, the refractive index of the wavelength converting element at $\lambda sfg$ is taken to be nsfg, and the refractive index of the wavelength converting element at $\lambda ave$ is taken to be nave, the wavelength converting element preferably has a polarization inversion periodic structure, and the thickness t of the wavelength converting element preferably satisfies the relationship of $0 < t < \lambda ave^2/(8 \times -\lambda s) \times (nsfg - nave))$.

In this case, since sufficient wavelength conversion efficiency can be obtained during conversion of second harmonic waves and sum-frequency wave, converted wavelength light can be obtained that has a broad spectral width corresponding to the oscillation wavelength width of the solid-state laser.

Among multiple oscillation wavelengths of the solid-state laser, the central wavelength $\lambda s$ of the shortest oscillation wavelength and the central wavelength $\lambda l$ of the longest oscillation wavelength preferably satisfy the relationship of 0.5 nm<$\lambda l - \lambda s$<5 nm.

In this case, converted wavelength light of low coherency can be obtained with high efficiency.

When the number of the two or more types of laser crystals is taken to be N, the laser crystal having the shortest oscillation wavelength among the two or more types of laser crystals preferably absorbs 1/2N to 1/N of pumping light that enters the cavity, and all of the two or more types of laser crystals preferably absorb 95% or more of pumping light that enters the cavity.

In this case, since heat generation by laser crystals having a short oscillation wavelength is inhibited and shifts in the oscillation wavelength toward a longer wavelength are prevented, together with being able to prevent spectral width of the converted wavelength light from becoming narrower, mode competition caused by close proximity of the oscillation wavelengths of the solid-state laser can be avoided. In addition, the intensity of the shortest oscillation wavelength of the solid-state laser can be maintained, and the occurrence of spectral bias in converted wavelength light can be prevented. Moreover, the pumping efficiency of the solid-state laser can be enhanced and generation of converted wavelength light can be carried out with high efficiency.

The two or more types of laser crystals are preferably crystals in which the same active ion material has been added to different host materials, and the amount of active ion added in the laser crystal having a long oscillation wavelength among the two or more types of laser crystals is preferably greater than the amount added in the laser crystal having a short oscillation wavelength.

In this case, since the oscillation wavelengths can be prevented from being excessively close, in addition to being able to prevent mode competition of the solid-state laser, the spectral width of converted wavelength light can be broadened.

The two or more types of laser crystals are preferably composed of two types $Nd:GdVO_4$ and $Nd:YVO_4$.

In this case, since the laser crystals can be pumped with a single pumping light source and since vanadate crystals have a large induced emission surface area and can be used in the form of microchips, they enable the focusing optics and cavity to be reduced in size, thereby making it possible to make the wavelength conversion laser more compact.

The two or more types of laser crystals and the wavelength converting element are preferably composed of microchip crystals, and are preferably spatially arranged apart from each other on an optical path.

In this case, by spatially separating heat generating bodies in the form of the laser crystals on an optical path, mutual thermal interference is eliminated enabling the crystals to cool, since heat generating sites can be divided among multiple locations, thermally superior oscillation can be carried out that is stable during high output, and as a result of separating the wavelength converting element from the laser crystals on the optical path of the solid-state laser light, thermal interference from the laser crystals with respect to the wavelength converting element can be prevented.

The wavelength distribution of the converted wavelength light is preferably controlled by the wavelength of a pumping light source that pumps the solid-state laser.

In this case, since the wavelength distribution of the converted wavelength light can be controlled by changing the wavelength of the pumping light source, the application range of the wavelength conversion laser can be expanded to include applications in analytical fields and the like.

Among the two or more types of laser crystals, the temperature of a region where solid-state laser light oscillates in the laser crystal having a long oscillation wavelength is preferably controlled to a temperature that is higher than the temperature of a region where solid-state laser oscillates in the laser crystal having a short oscillation wavelength.

In this case, since the oscillation wavelength of the laser crystal having a long oscillation wavelength can be preferentially made to be longer, the wavelength of the laser crystal having a long oscillation wavelength can be shifted in the direction of a long wavelength, which together with enabling the spectral width of the wavelength conversion laser to be made even broader, enables stable oscillation of the solid-state laser.

A lens is preferably further provided in the cavity, the lens preferably makes the beam diameter of solid-state laser light within the wavelength converting element smaller than the beam diameter of solid-state laser light within the laser crystal, and a coating that reflects the converted wavelength light is preferably formed on the lens.

In this case, since the light intensity of solid-state laser light within the wavelength converting element can be increased and wavelength conversion efficiency can be enhanced by making the beam diameter of the solid-state laser light smaller within the wavelength converting element, the efficiency of the wavelength conversion laser can be enhanced. In addition, since light intensity of pumping light within the laser crystal can be reduced and generation of heat by the laser crystal can be inhibited by increasing the beam diameter of solid-state laser light within the laser crystal, high output characteristics of the wavelength conversion laser can be improved. Moreover, since converted wavelength light can be reflected by the coating that reflects converted wavelength light, converted wavelength light can be prevented from re-entering the wavelength converting element coincidentally with solid-state laser light, thereby making it possible to remove mode competition noise.

An end surface of the wavelength converting element preferably serves as an output mirror of the cavity, the lens preferably reflects the converted wavelength light, and the converted wavelength light is preferably output outside the cavity without re-entering the wavelength converting element coincidentally with the solid-state laser light.

In this case, since a beam focal point of solid-state laser light is formed within the wavelength converting element by using an end surface of the wavelength converting element as a cavity mirror, together with beam diameter being able to be ideally focused, a compact configuration can be realized, and since converted wavelength light is reflected and prevented from re-entering the wavelength converting element coincidentally with solid-state laser light, mode competition noise can be removed.

The cavity preferably resonates different wavelengths having polarizations perpendicular to each other, and the wavelength converting element preferably has an optical axis that is inclined with respect to the perpendicular polarization components of the wavelengths, and preferably simultaneously outputs second harmonic waves and sum-frequency wave of multiple wavelengths by phase-matching oscillation wavelengths having different wavelengths and polarizations to second harmonic waves and sum-frequency wave.

In this case, by resonating wavelengths having polarizations perpendicular to each other, mode competition occurring between multiple wavelengths oscillating within the cavity can be avoided, multiple wavelengths can be stably resonated, and since second harmonic waves and sum-frequency wave of multiple wavelengths are output simultaneously, the converted wavelength light that is output after wavelength conversion is composed of a plurality of spectra, and thereby spectral width increases and interference decreases.

Furthermore, another wavelength conversion laser as claimed in the present invention may be provided with a solid-state laser having a cavity and a wavelength converting element arranged within the cavity, the resonator may resonate different wavelengths having polarizations perpendicular to each other, and the wavelength converting element may have an optical axis that is inclined with respect to the perpendicular polarization components of the wavelengths, and may simultaneously output second harmonic waves and sum-frequency wave of multiple wavelengths by phase-matching oscillation wavelengths having different wavelengths and polarizations to second harmonic waves and sum-frequency wave.

The two or more types of laser crystals preferably are laminated so that the laser crystal having the smallest pumping light absorption coefficient is located on the side of the pumping light source, and are pumped by a single pumping light source.

In this case, laminating the laser crystals eliminates the need for providing coatings between the laser crystals and enables loss to be reduced within the cavity, and as a result of lowering the pumping light absorption coefficient of the laser crystal on the side of the pumping light source, heat generation within the laser crystal on the side of the pumping light source can be inhibited while allowing pumping light to be absorbed by the laser crystal located far from the pumping light source during oscillation, thereby allowing the obtaining of oscillation of different wavelengths from multiple solid-state lasers. Moreover, since a single pumping light source is used together with laminating the laser crystals, the number of adjustment components can be reduced while also making it possible to realize a compact configuration.

A cooling member is preferably further provided that is arranged in a region, of a pumping light incident surface of the laser crystal having the smallest pumping light absorption coefficient, where pumping light does not enter, and the temperature of the laser crystal having the smallest pumping light absorption coefficient is preferably adjusted by the cooling member so as to be lower than the temperature of other laser crystal.

In this case, since the temperature difference of the pumping light incident surface where the largest temperature difference occurs on the optical path of the solid-state laser light can be reduced and strain attributable to heat can be alleviated, in addition to enabling high-power operation, separation of oscillation wavelengths of the laser crystals due to temperature shifts can be increased, thereby making it possible to broaden the spectral width of output converted wavelength light.

A pumping light source that pumps the laser crystals is preferably further provided, and the pumping light source preferably causes the temperature of the laser crystals to change over time by modulating the pumping light, thereby broadening the spectral width of wavelengths oscillated from the laser crystals and increasing overlapping of the spectra of second harmonic waves and sum-frequency wave.

In this case, since spectral distribution can be flattened, coherency can be further decreased thereby making it possible to further reduced speckle noise and other interference noise.

The wavelength converting element preferably includes a multiple period wavelength converting element having a plurality of polarization inversion periodic structures, the periods of the plurality of polarization inversion periodic structures preferably at least include a period corresponding to the generation of second harmonic waves of the multiple wavelengths of the solid-state laser light, and the multiple period wavelength converting element preferably generates second harmonic waves and sum-frequency wave at wavelengths of the solid-state laser light of multiple wavelengths.

In this case, since wavelength conversion efficiency for multiple second harmonic waves can be increased and wavelength conversion efficiency for sum-frequency wave can be decreased enabling a relative decrease in the intensity of sum-frequency wave, the spectral distribution of converted wavelength light can be flattened, thereby promoting reduction of coherency and enabling a further reduction in speckle noise and other interference noise.

The solid-state laser preferably carries out multi-longitudinal mode oscillation, the wavelength converting element is preferably composed of a microchip having a polarization inversion periodic structure and carries out wavelength conversion that generates second harmonic waves and sum-frequency wave of the multi-longitudinal mode oscillation, the wavelength conversion laser is preferably further provided with a lens that is arranged between the laser crystal and the wavelength converting element, makes the beam diameter of solid-state laser light smaller in the wavelength converting element than in the laser crystal, and reflects converted wavelength light, and end surfaces of the laser crystal and the wavelength converting element preferably serve as reflecting surfaces of the cavity of the solid-state laser.

In this case, in addition to being able to obtain a compact multi-mode wavelength conversion laser having high conversion efficiency, stable high-output oscillation can be carried out with an air cooling mechanism only, thereby making it possible to reduce the size of an apparatus that contains the air cooling mechanism. As a result, a multi-mode wavelength conversion laser can be provided that has compact size, high conversion efficiency and is capable of stable, high-output oscillation despite the absence of the need for temperature control. In addition, converted wavelength light capable of being applied to imaging and illumination fields can be output stably and with high efficiency, while also enabling the size of the apparatus to be reduced.

Furthermore, another wavelength conversion laser as claimed in the present invention may be a wavelength conversion laser having a wavelength converting element within the cavity of a semiconductor laser-pumped solid-state laser, the solid-state laser may carry out multi-longitudinal mode oscillation, the wavelength converting element may be composed of a microchip having a polarization inversion periodic structure and carries out wavelength conversion that generates second harmonic waves and sum-frequency wave of the multi-longitudinal mode oscillation, the wavelength conversion laser may be further provided with a lens that is arranged between the laser crystal of the solid-state laser and the wavelength converting element, makes the beam diameter of the solid-state laser light smaller within the wavelength converting element than in the laser crystal and reflects converted wavelength light, and the end surfaces of the laser crystal and the wavelength converting element may serve as reflecting surfaces of the cavity of the solid-state laser.

At least one of lens surfaces of the lens is preferably inclined with respect to solid-state laser light at an angle larger than a divergence angle of the solid-state laser light, and converted wavelength light reflected by the lens surface is preferably output outside the cavity after being separated from the solid-state laser light within the cavity.

In this case, since converted wavelength light is output outside the cavity after being separated from the solid-state laser light within the cavity, mode competition can be prevented and stable, high-output oscillation can be carried out.

The lens is preferably composed of a plano-convex lens, and the surface of the plano-convex lens on the side of the wavelength converting element is preferably a flat surface.

In this case, as a result of using a flat surface for the surface that reflects converted wavelength light, the direction of reflected converted wavelength light can be easily adjusted, and aberration of the solid-state laser within the cavity can be reduced.

A distance $L1$ between the laser crystal and a principal point of the lens, a distance $L2$ between the wavelength converting element and the principal point of the lens, and the focal distance $f$ of the lens preferably satisfy the following relationships:

$$f<L2<L1$$

$$L2<2\times f$$

$$L1+f>2\times L2$$

$$L1-f<20 \text{ mm}.$$

In this case, even if the beam diameter of solid-state laser light is focused within the wavelength converting element to enhance wavelength conversion efficiency and a thermal lens effect has occurred in the laser crystal, oscillation can be continued and a compact configuration can be realized.

The lens is preferably composed of a meniscus lens, and the surface of the meniscus lens on the side of the wavelength converting element is preferably a concave surface.

In this case, by making the surface of the meniscus lens on the side of the wavelength converting element to be a concave surface, the divergence angle of reflected converted wavelength light is decreased, and the beam diameter of the reflected converted wavelength light can be kept small.

The laser crystals are preferably composed of two or more laser crystals having different pumping light absorption rates, and the laser crystals are preferably arranged in series so that the absorption rates increase in order starting from the side of a pumping light source that pumps the laser crystals.

In this case, since the range over which pumping light is absorbed can be expanded in the direction of the optical axis of the solid-state laser, thermal lens effects and heat strain are inhibited, thereby enabling high-output oscillation.

Synthesizing optics is preferably further provided that has an optical axis aligned with a position of the lens where converted wavelength light is reflected, and the synthesizing optics preferably synthesizes two converted wavelength light beams comprising converted wavelength light reflected by the lens and converted wavelength light that does not enter the lens into a single beam.

In this case, since two converted wavelength light beams are synthesized in the form of a single beam, output is treated as a single beam, and beam shaping can be carried out corresponding to each application.

The laser crystals preferably include an Nd-doped $Gd_x Y_{1-x}YVO_4$ crystal (where, $0<X<1$), the solid-state laser preferably carries out multi-longitudinal mode oscillation within the cavity, and the wavelength converting element preferably carries out wavelength conversion that generates second harmonic waves and sum-frequency wave of multi-longitudinal mode oscillation.

In this case, since a mixed crystal host material of GdVO$_4$ and NdVO$_4$ is used for the laser crystals, multi-longitudinal mode oscillation can be obtained that has a broadened spectral distribution.

The lens is preferably composed of a gradient index lens, and the gradient index lens is preferably bonded to at least one of the laser crystals and the wavelength converting element.

In this case, by integrally bonding the gradient index lens with the laser crystals or the wavelength converting element, optical adjustment of the wavelength conversion laser at the time of production is not required, thereby making it possible to reduce size and cost while also improving the reliability of the cavity.

The lens is preferably composed of a cylindrical lens, and converted wavelength light reflected by the cylindrical lens is preferably emitted with an angle with respect to converted wavelength light output without being reflected by the cylindrical lens.

In this case, since output light composed of two beams comprising converted wavelength light reflected by the cylindrical lens and converted wavelength light output without being reflected by the cylindrical lens is output arranged in the direction of the short axis of elliptical beams, and the distance between the two beams can be shortened, the two beams are easily handled with the same optics, thereby making it possible to reduce the size of output light optics.

The image display apparatus as claimed in the present invention is provided with any of the wavelength conversion lasers described above and an element that modulates the converted wavelength light.

In this image display apparatus, since converted wavelength light can be used that has a broadened spectral distribution and low coherency, speckle noise that causes image noise can be reduced enabling high-quality image display.

The image display apparatus is preferably provided with a red laser light source that oscillates a red wavelength, a green laser light source that oscillates a green wavelength, and a blue laser light source that oscillates a blue wavelength, the green laser light source preferably includes any of the wavelength conversion lasers described above, the red laser light source, the green laser light source and the blue laser light source preferably sequentially emit laser light for each color, and the wavelength conversion laser preferably broadens the spectral width of the converted wavelength light by repeatedly emitting the pumping light and interrupting the emission of the pumping light.

In this case, by sequentially emitting laser light from the laser light sources, easily perceived green speckle noise can be removed, and since a temperature change occurs during emission of red and blue laser light resulting in a change in oscillation wavelength, together with being able to broaden spectral distribution when integrated over time, as a result of the pumping light source repeatedly emitting the pumping light and interrupting the emission of the pumping light, a temperature change occurs in the laser crystals and the wavelength converting element and the oscillation wavelength of the wavelength conversion laser changes, thereby further broadening the spectral distribution of the wavelength conversion laser and further lowering coherency when the converted wavelength light is integrated over time.

INDUSTRIAL APPLICABILITY

Since the wavelength conversion laser of the present invention can be used for various wavelength conversion lasers requiring low interference, it is particularly suitable for use as a low-coherency, high-efficiency compact laser in imaging and illumination fields. In addition, since the wavelength conversion laser of the present invention can be used as a multi-mode wavelength conversion laser requiring compact size, it is particularly suitable for use as a compact laser in imaging and illumination fields.

The invention claimed is:

1. A wavelength conversion laser, comprising:
   a solid-state laser having a cavity; and
   a single wavelength converting element arranged within the cavity,
   wherein the solid-state laser includes two or more types of laser crystals and oscillates solid-state laser light of multiple wavelengths, and
   the single wavelength converting element converts the solid-state laser light of multiple wavelengths into light of second harmonic waves and sum-frequency wave of multiple wavelengths, and simultaneously generates the second harmonic waves and sum-frequency wave of multiple wavelengths.

2. The wavelength conversion laser according to claim 1, wherein converted wavelength light composed of second harmonic waves and sum-frequency wave is output outside the cavity without re-entering the wavelength converting element coincidentally with the solid-state laser light.

3. The wavelength conversion laser according to claim 1, wherein the two or more types of laser crystals are pumped by the same pumping light source.

4. The wavelength conversion laser according to claim 3, wherein by making the spot diameter of pumping light of the pumping light source within the two or more types of laser crystals to be smaller as the oscillation wavelength of the laser crystals becomes longer, the temperature of the laser crystal having a long oscillation wavelength is raised, and the wavelength of the laser crystal having a long oscillation wavelength is shifted.

5. The wavelength conversion laser according to claim 1, wherein among multiple oscillation wavelengths of the solid-state laser, when the central wavelength of the shortest oscillation wavelength is taken to be $\lambda s$, the central wavelength of the longest oscillation wavelength is taken to be $\lambda l$, the wavelength of the sum-frequency wave of $\lambda s$ and $\lambda l$ is taken to be $\lambda sfg$, the average wavelength of $\lambda s$ and $\lambda l$ is taken to be $\lambda ave$, the thickness of the wavelength converting element is taken to be t, the refractive index of the wavelength converting element at $\lambda sfg$ is taken to be nsfg, and the refractive index of the wavelength converting element at $\lambda ave$ is taken to be nave,
   the wavelength converting element has a polarization inversion periodic structure, and the thickness t of the wavelength converting element satisfies the relationship of $0 < t < \lambda ave^2/(8 \times (\lambda l - \lambda s) \times (nsfg - nave))$, and
   the single wavelength converting element simultaneously generates second harmonic waves and sum-frequency wave of the multiple wavelengths of the solid-state laser light.

6. The wavelength conversion laser according to claim 1, wherein among multiple oscillation wavelengths of the solid-state laser, the central wavelength $\lambda s$ of the shortest oscillation wavelength and the central wavelength $\lambda l$ of the longest oscillation wavelength satisfy the relationship of $0.5 \text{ nm} < \lambda l - \lambda s < 5 \text{ nm}$, and
   the single wavelength converting element generates second harmonic waves corresponding to $\lambda l$ and $\lambda s$.

7. The wavelength conversion laser according to claim 1, wherein when the number of the two or more types of laser crystals is taken to be N, the laser crystal having the shortest oscillation wavelength among the two or more types of laser crystals absorbs $1/2N$ to $1/N$ of pumping light that enters the cavity, and
   all of the two or more types of laser crystals absorb 95% or more of pumping light that enters the cavity.

8. The wavelength conversion laser according to claim 1, wherein the two or more types of laser crystals are crystals in which the same active ion material has been added to different host materials, and
the amount of active ion added in the laser crystal having a long oscillation wavelength among the two or more types of laser crystals is greater than the amount added in the laser crystal having a short oscillation wavelength.

9. The wavelength conversion laser according to claim 1, wherein the two or more types of laser crystals are composed of two types of Nd:GdVO$_4$ and Nd:YVO$_4$.

10. The wavelength conversion laser according to claim 1, wherein the two or more types of laser crystals and the wavelength converting element are composed of microchip crystals, and are spatially arranged apart from each other on an optical path.

11. The wavelength conversion laser according to claim 1, wherein the wavelength distribution of the converted wavelength light composed of second harmonic waves and sum-frequency wave of the multiple wavelengths of the solid-state laser light is controlled by the wavelength of a pumping light source that pumps the solid-state laser.

12. The wavelength conversion laser according to claim 1, wherein among the two or more types of laser crystals, the temperature of a region where solid-state laser light oscillates in the laser crystal having a long oscillation wavelength is controlled to a temperature that is higher than the temperature of a region where solid-state laser oscillates in the laser crystal having a short oscillation wavelength.

13. The wavelength conversion laser according to claim 1, further comprising a lens that is arranged within the cavity,
wherein the lens makes the beam diameter of solid-state laser light within the wavelength converting element smaller than the beam diameter of solid-state laser light within the laser crystal, and
a coating that reflects the converted wavelength light is formed on the lens.

14. The wavelength conversion laser according to claim 13, wherein an end surface of the wavelength converting element serves as an output mirror of the cavity,
the lens reflects the converted wavelength light, and
the converted wavelength light is output outside the cavity without re-entering the wavelength converting element coincidentally with the solid-state laser light.

15. The wavelength conversion laser according to claim 1, wherein the cavity resonates different wavelengths having polarizations perpendicular to each other, and
the wavelength converting element has an optical axis that is inclined with respect to the perpendicular polarization components of the wavelengths, and simultaneously outputs second harmonic waves and sum-frequency wave of multiple wavelengths by phase-matching oscillation wavelengths having different wavelengths and polarizations to second harmonic waves and sum-frequency wave.

16. The wavelength conversion laser according to claim 1, wherein the two or more types of laser crystals are laminated so that the laser crystal having the smallest pumping light absorption coefficient is located on the side of the pumping light source, and are pumped by a single pumping light source.

17. The wavelength conversion laser according to claim 16, further comprising a cooling member that is arranged in a region, of a pumping light incident surface of the laser crystal having the smallest pumping light absorption coefficient, where pumping light does not enter,
wherein the temperature of the laser crystal having the smallest pumping light absorption coefficient is adjusted by the cooling member so as to be lower than the temperature of other laser crystal.

18. The wavelength conversion laser according to claim 1, further comprising a pumping light source that pumps the laser crystals,
wherein the pumping light source causes the temperature of the laser crystals to change over time by modulating the pumping light, broadens the spectral width of wavelengths oscillated from the laser crystals, and increases overlapping of the spectra of second harmonic waves and sum-frequency wave.

19. The wavelength conversion laser according to claim 1, wherein the wavelength converting element includes a multiple period wavelength converting element having a plurality of polarization inversion periodic structures,
the periods of the plurality of polarization inversion periodic structures at least include a period corresponding to the generation of second harmonic waves of the multiple wavelengths of the solid-state laser light, and
the multiple period wavelength converting element generates second harmonic waves and sum-frequency wave at wavelengths of the solid-state laser light of multiple wavelengths.

20. The wavelength conversion laser according to claim 1, wherein the solid-state laser carries out multi-longitudinal mode oscillation,
the wavelength converting element is composed of a microchip having a polarization inversion periodic structure and carries out wavelength conversion that generates second harmonic waves and sum-frequency wave of the multi-longitudinal mode oscillation,
a lens is further provided that is arranged between the laser crystal and the wavelength converting element, makes the beam diameter of solid-state laser light smaller in the wavelength converting element than in the laser crystal, and reflects converted wavelength light, and
end surfaces of the laser crystal and the wavelength converting element serve as reflecting surfaces of the cavity of the solid-state laser.

21. The wavelength conversion laser according to claim 20, wherein at least one of lens surfaces of the lens is inclined with respect to solid-state laser light at an angle larger than a divergence angle of the solid-state laser light, and
converted wavelength light reflected by the lens surface is output outside the cavity after being separated from the solid-state laser light within the cavity.

22. The wavelength conversion laser according to claim 20, wherein the lens is composed of a plano-convex lens, and
the surface of the plano-convex lens on the side of the wavelength converting element is a flat surface.

23. The wavelength conversion laser according to claim 20, wherein a distance L1 between the laser crystal and a principal point of the lens, a distance L2 between the wavelength converting element and the principal point of the lens, and the focal distance f of the lens satisfy the following relationships:

$$f<L2<L1$$

$$L2<2\times f$$

$$L1+f>2\times L2$$

$$L1-f<20 \text{ mm.}$$

24. The wavelength conversion laser according to claim 20, wherein the lens is composed of a meniscus lens, and the surface of the meniscus lens on the side of the wavelength converting element is a concave surface.

25. The wavelength conversion laser according to claim 20, wherein the laser crystals are composed of two or more crystals having different pumping light absorption rates, and the laser crystals are arranged in series so that the absorption rates increase in order starting from the side of a pumping light source that pumps the laser crystals.

26. The wavelength conversion laser according to claim 20, further comprising a synthesizing optics that has an optical axis aligned with a position of the lens where converted wavelength light is reflected,
wherein the synthesizing optics synthesizes two converted wavelength light beams comprising converted wavelength light reflected by the lens and converted wavelength light that does not enter the lens into a single beam.

27. The wavelength conversion laser according to claim 20, wherein the laser crystals include an Nd-doped $Gd_x Y_{1-x}YVO_4$ crystal (where, $0<X<1$),
the solid-state laser carries out multi-longitudinal mode oscillation within the cavity, and
the wavelength converting element carries out wavelength conversion that generates second harmonic waves and sum-frequency wave of multi-longitudinal mode oscillation.

28. The wavelength conversion laser according to claim 20, wherein the lens is composed of a gradient index lens, and the gradient index lens is bonded to at least one of the laser crystals and the wavelength converting element.

29. The wavelength conversion laser according to claim 20, wherein the lens is composed of a cylindrical lens, and
converted wavelength light reflected by the cylindrical lens is emitted with an angle with respect to converted wavelength light output without being reflected by the cylindrical lens.

30. An image display apparatus, comprising:
the wavelength conversion laser according to claim 1; and
an element that modulates the converted wavelength light.

31. The image display apparatus according to claim 30, further comprising:
a red laser light source that oscillates a red wavelength;
a green laser light source that oscillates a green wavelength; and
a blue laser light source that oscillates a blue wavelength,
wherein the green laser light source includes the wavelength conversion laser,
the red laser light source, the green laser light source and the blue laser light source sequentially emit laser light for each color, and
the wavelength conversion laser broadens the spectral width of the converted wavelength light by repeatedly emitting the pumping light and interrupting the emission of the pumping light.

* * * * *